US007165305B2

(12) United States Patent
Kenney et al.

(10) Patent No.: US 7,165,305 B2
(45) Date of Patent: Jan. 23, 2007

(54) ACTIVATION ARM ASSEMBLY METHOD

(75) Inventors: James J. Kenney, Baltimore, MD (US); Craig A. Schell, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 49 days.

(21) Appl. No.: 11/095,730

(22) Filed: Mar. 31, 2005

(65) Prior Publication Data

US 2005/0217876 A1 Oct. 6, 2005

Related U.S. Application Data

(60) Provisional application No. 60/559,344, filed on Apr. 2, 2004.

(51) Int. Cl.
*B23P 11/00* (2006.01)
*B25C 5/16* (2006.01)

(52) U.S. Cl. .............................. 29/434; 29/469; 173/1; 227/129

(58) Field of Classification Search .................. 29/434, 29/469, 798, 243.5, 243.53; 227/129, 138, 227/156, 133, 120, 131, 146; 173/13, 15, 173/124, 122, 216, 217, 1
See application file for complete search history.

(56) References Cited

U.S. PATENT DOCUMENTS 997,638 A 7/1911 Rynearson
1,482,464 A 2/1924 Flegel
1,517,101 A 11/1924 Borger
1,600,266 A 9/1926 Armstrong
1,611,814 A 12/1926 Butler
1,629,189 A 5/1927 Weaver et al.
1,647,493 A 11/1927 Young
1,715,866 A 6/1929 Rother
2,320,450 A 6/1943 Valenzuela
2,379,784 A 7/1945 Brand
2,697,179 A 12/1954 Wendel
2,714,209 A 8/1955 Lindstrom
2,737,941 A 3/1956 Carrau
2,786,672 A 3/1957 Humphner
2,869,824 A 1/1959 Hazak
3,018,584 A 1/1962 Passariello
3,074,347 A 1/1963 Clymer
3,172,124 A 3/1965 Kremiller
3,194,324 A 7/1965 Langas
3,215,324 A 11/1965 Dorney
3,273,777 A 9/1966 Julifs et al.
3,293,462 A 12/1966 Wright (Continued)

FOREIGN PATENT DOCUMENTS

CH 626 434 11/1981

(Continued)

*Primary Examiner*—Essama Omgba
(74) *Attorney, Agent, or Firm*—Harness, Dickey & Pierce, P.L.C.

(57) ABSTRACT

A method for assembling an activation arm assembly for a power tool, such as a fastening tool or nailer. The method includes the mounting of various components of the activation arm assembly on pivot pins and positioning of a pair of arm members to load a spring that biases one of the arm members relative to another of the arm members.

15 Claims, 44 Drawing Sheets

U.S. PATENT DOCUMENTS

| | | | | |
|---|---|---|---|---|
| 3,408,887 | A | | 11/1968 | Villo |
| 3,500,940 | A | | 3/1970 | Guest |
| 3,535,906 | A | | 10/1970 | Swick et al. |
| 3,553,506 | A | | 1/1971 | Fresard |
| 3,672,555 | A | | 6/1972 | Korth |
| 3,688,138 | A | | 8/1972 | Jacyno et al. |
| 3,694,680 | A | | 9/1972 | Jacyno |
| 3,700,987 | A | | 10/1972 | Deering |
| 3,774,293 | A | | 11/1973 | Golsch |
| 3,817,091 | A | | 6/1974 | Frederick |
| 3,848,309 | A | | 11/1974 | Nuss |
| 3,853,257 | A | | 12/1974 | Perkins |
| 3,858,780 | A | | 1/1975 | Perkins et al. |
| 3,934,778 | A | | 1/1976 | Males |
| 3,937,286 | A | | 2/1976 | Wagner |
| 3,946,486 | A | | 3/1976 | Locke et al. |
| 3,957,192 | A | | 5/1976 | Fehrs |
| 3,983,429 | A | | 9/1976 | Allardice, Jr. |
| 4,042,036 | A | | 8/1977 | Smith et al. |
| 4,083,481 | A | | 4/1978 | Selinko |
| 4,121,745 | A | | 10/1978 | Smith et al. |
| 4,129,240 | A | | 12/1978 | Geist |
| 4,189,080 | A | | 2/1980 | Smith et al. |
| 4,197,974 | A | * | 4/1980 | Morton et al. ................. 227/8 |
| 4,204,622 | A | | 5/1980 | Smith et al. |
| 4,206,697 | A | | 6/1980 | Meissner |
| 4,215,808 | A | | 8/1980 | Sollberger et al. |
| 4,290,493 | A | | 9/1981 | Smith et al. |
| 4,292,574 | A | | 9/1981 | Sipin et al. |
| 4,298,072 | A | | 11/1981 | Baker et al. |
| 4,323,127 | A | | 4/1982 | Cunningham |
| 4,389,012 | A | * | 6/1983 | Grikis et al. ................ 227/120 |
| 4,403,722 | A | | 9/1983 | Nikolich |
| 4,436,236 | A | | 3/1984 | Jobe |
| 4,441,644 | A | | 4/1984 | Farian |
| 4,449,681 | A | | 5/1984 | Gratzer et al. |
| 4,457,462 | A | | 7/1984 | Taormina |
| 4,467,952 | A | | 8/1984 | Morrell, Jr. |
| 4,480,513 | A | | 11/1984 | McCauley et al. |
| 4,483,474 | A | | 11/1984 | Nikolich |
| 4,509,669 | A | | 4/1985 | Elliesen |
| 4,511,074 | A | | 4/1985 | Kille et al. |
| 4,519,535 | A | | 5/1985 | Crutcher |
| 4,544,090 | A | | 10/1985 | Warman et al. |
| 4,558,747 | A | | 12/1985 | Cunningham |
| 4,566,619 | A | | 1/1986 | Kleinholz |
| 4,572,053 | A | | 2/1986 | Sosnowski et al. |
| 4,585,747 | A | | 4/1986 | Valyocsik |
| 4,609,135 | A | | 9/1986 | Elliesen |
| 4,612,463 | A | | 9/1986 | Kikuchi |
| 4,622,500 | A | | 11/1986 | Budelman, Jr. |
| 4,625,903 | A | | 12/1986 | Becht |
| 4,635,836 | A | | 1/1987 | Monney et al. |
| 4,700,876 | A | | 10/1987 | Wingert |
| 4,721,170 | A | | 1/1988 | Rees |
| 4,747,455 | A | | 5/1988 | Cunningham |
| 4,763,347 | A | | 8/1988 | Erdman |
| 4,828,153 | A | | 5/1989 | Guzik |
| 4,836,755 | A | | 6/1989 | Nitsche et al. |
| 4,854,492 | A | | 8/1989 | Houck et al. |
| 4,858,813 | A | | 8/1989 | Wingert |
| 4,928,868 | A | | 5/1990 | Kerrigan |
| 4,932,480 | A | | 6/1990 | Golsch |
| 4,946,087 | A | | 8/1990 | Wingert |
| 4,964,558 | A | | 10/1990 | Crutcher et al. |
| 4,982,705 | A | | 1/1991 | Hudson |
| 4,988,069 | A | | 1/1991 | D'Silva |
| 4,991,763 | A | | 2/1991 | Storace |
| 5,025,971 | A | | 6/1991 | Schafer et al. |
| 5,069,379 | A | | 12/1991 | Kerrigan |
| 5,098,004 | A | | 3/1992 | Kerrigan |
| 5,114,065 | A | | 5/1992 | Storace |
| 5,184,941 | A | | 2/1993 | King et al. |
| 5,197,647 | A | | 3/1993 | Howell |
| 5,201,445 | A | | 4/1993 | Axelman |
| 5,238,168 | A | | 8/1993 | Oda |
| 5,265,312 | A | | 11/1993 | Okumura |
| 5,291,578 | A | | 3/1994 | Kalami |
| 5,320,270 | A | | 6/1994 | Crutcher |
| 5,366,132 | A | | 11/1994 | Simonelli |
| 5,443,196 | A | | 8/1995 | Burlington |
| 5,445,227 | A | | 8/1995 | Heppner |
| 5,495,161 | A | | 2/1996 | Hunter |
| 5,511,715 | A | | 4/1996 | Crutcher et al. |
| 5,537,025 | A | | 7/1996 | Kern et al. |
| 5,558,264 | A | | 9/1996 | Weinstein |
| 5,605,268 | A | | 2/1997 | Hayashi et al. |
| 5,642,848 | A | | 7/1997 | Ludwig et al. |
| 5,722,785 | A | | 3/1998 | Diener |
| 5,732,870 | A | | 3/1998 | Moorman et al. |
| 5,772,096 | A | | 6/1998 | Osuka et al. |
| 5,810,225 | A | | 9/1998 | Andrew |
| 5,810,232 | A | | 9/1998 | Meurer et al. |
| 5,839,638 | A | | 11/1998 | Ronn |
| 5,855,067 | A | | 1/1999 | Taomo et al. |
| 5,865,473 | A | | 2/1999 | Semchuck et al. |
| 5,918,788 | A | | 7/1999 | Moorman et al. |
| 5,923,145 | A | | 7/1999 | Reichard et al. |
| 5,927,585 | A | | 7/1999 | Moorman et al. |
| 5,969,508 | A | | 10/1999 | Patino et al. |
| 5,996,874 | A | * | 12/1999 | Fukushima et al. ............ 227/8 |
| 6,000,477 | A | | 12/1999 | Campling et al. |
| 6,168,287 | B1 | | 1/2001 | Liu |
| 6,176,412 | B1 | | 1/2001 | Weinger et al. |
| 6,206,538 | B1 | | 3/2001 | Lemoine |
| 6,209,770 | B1 | | 4/2001 | Perra |
| 6,296,065 | B1 | | 10/2001 | Carrier |
| 6,318,874 | B1 | | 11/2001 | Matsunaga |
| 6,321,622 | B1 | | 11/2001 | Tsuge et al. |
| 6,422,447 | B1 | | 7/2002 | White et al. |
| 6,431,430 | B1 | | 8/2002 | Jalbert et al. |
| 6,499,643 | B1 | | 12/2002 | Hewitt |
| 6,511,200 | B1 | | 1/2003 | Matsunaga |
| 6,626,344 | B1 | | 9/2003 | Shkolnikov et al. |
| 6,669,072 | B1 | * | 12/2003 | Burke et al. ................ 227/131 |
| 6,672,498 | B1 | | 1/2004 | White et al. |
| 6,679,406 | B1 | | 1/2004 | Sakai |
| 6,796,478 | B1 | | 9/2004 | Shkolnikov |
| 6,997,365 | B1 | * | 2/2006 | Miller et al. ................... 227/8 |
| 2002/0179659 | A1 | | 12/2002 | Shaw |
| 2002/0185514 | A1 | | 12/2002 | Adams et al. |
| 2005/0218174 | A1 | * | 10/2005 | Kenney et al. ................ 227/2 |
| 2005/0218185 | A1 | * | 10/2005 | Kenney et al. ............. 227/133 |

FOREIGN PATENT DOCUMENTS

| | | |
|---|---|---|
| DE | 2504094 | 3/1985 |
| DE | 35 06 421 | 9/1986 |
| DE | 25 10 858 | 1/1987 |
| DE | 40 19 894 | 6/1990 |
| DE | 39 24 621 | 1/1991 |
| DE | 39 42 083 | 6/1991 |
| DE | 44 14 006 | 7/1995 |
| DE | 195 21 425 | 12/1996 |
| DE | 198 05 577 | 9/1998 |
| DE | 298 12 622 | 11/1998 |
| DE | 197 21 449 | 4/2002 |
| DE | 100 55 003 | 6/2002 |
| EP | 0 009 020 | 10/1982 |
| EP | 0 209 914 | 1/1987 |
| EP | 0 209 915 | 1/1987 |
| EP | 0 209 916 | 1/1987 |
| EP | 0 306 793 | 11/1992 |
| EP | 0 808 018 | 11/1997 |

| | | |
|---|---|---|
| EP | 0 927 610 | 7/1999 |
| EP | 0 928 667 | 7/1999 |
| EP | 1 033 207 | 1/2000 |
| JP | 53-127025 | 11/1978 |
| JP | 54-11577 | 1/1979 |
| JP | 54-115485 | 9/1979 |
| JP | 56-39881 | 4/1981 |
| JP | 50-77969 | 3/1993 |
| JP | 2000117659 | 4/2000 |
| WO | WO 83/02082 | 6/1983 |
| WO | WO 87/02611 | 5/1987 |
| WO | WO 99/30873 | 6/1999 |
| WO | WO 02/014026 | 2/2002 |
| WO | WO 02/051593 | 7/2002 |
| WO | WO 02/051594 | 7/2002 |
| WO | WO 02/051595 | 7/2002 |

* cited by examiner

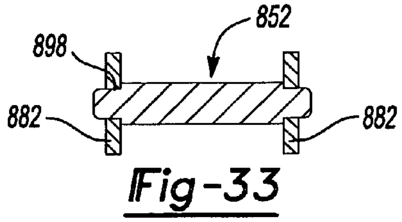
Fig-33
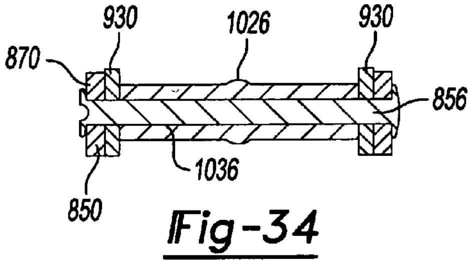
Fig-34
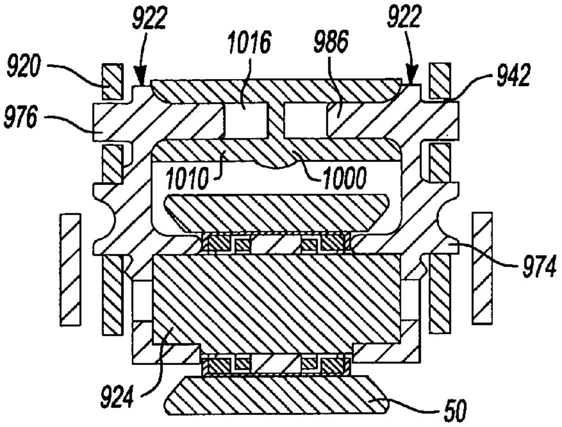
Fig-35
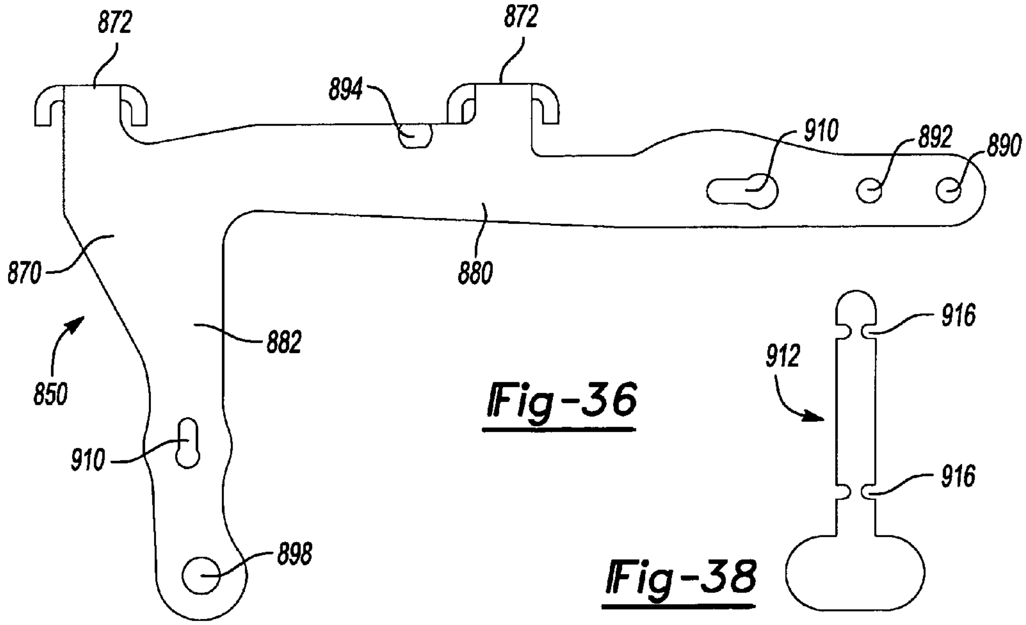
Fig-36
Fig-38

ACTIVATION ARM ASSEMBLY METHOD

CROSS-REFERENCE TO RELATED APPLICATIONS

This application claims priority to U.S. Provisional Patent Application Ser. No. 60/559,344 filed Apr. 2, 2004 entitled “Fastening Tool”.

INTRODUCTION

The present invention generally relates to a power tool, such as a fastening tool, and more particularly to a method for assembling an activation arm assembly for a power tool.

Fastening tools, such as power nailers and staplers, are relatively common place in the construction trades. Often times, however, the fastening tools that are available may not provide the user with a desired degree of flexibility and freedom due to the presence of hoses and such that couple the fastening tool to a source of pneumatic power.

Recently, several types of cordless nailers have been introduced to the market in an effort to satisfy the demands of modern consumers. Some of these nailers, however, are relatively large in size and/or weight, which renders them relatively cumbersome to work with. Others require relatively expensive fuel cartridges that are not re-fillable by the user so that when the supply of fuel cartridges has been exhausted, the user must leave the work site to purchase additional fuel cartridges. Yet other cordless nailers are relatively complex in their design and operation so that they are relatively expensive to manufacture and do not operate in a robust manner that reliably sets fasteners into a workpiece in a consistent manner.

Accordingly, there remains a need in the art for an improved fastening tool.

SUMMARY

In one form, the present teachings provide a method for assembling an activation arm assembly for a power tool. The method can include: providing a first arm, a second arm and a third arm, each of the first and second arms having a pair of laterally spaced apart arm members, the third arm including a first eccentric and a second eccentric, each of the first and second eccentrics including a pin portion; coupling a follower to the first eccentric; providing a yoke with a cross-bar portion; coupling the cross-bar portion to the pin portion of the first eccentric such that the yoke is rotatable about the pin portion of the first eccentric; coupling the second eccentric to the cross-bar portion and the follower to form a subassembly; pivotally coupling the subassembly to the second arm; placing a spring proximate the yoke; engaging a spacer to the arm members of the second arm, the spacer abutting and compressing the spring such that the spring biases the cross-bar portion away from the spacer; installing a pivot pin through the first and second arms; loading a second spring to the first arm; and rotating the second arm about the pivot pin to load the second spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 33 is a sectional view taken along the line 33—33 of FIG. 32;

FIG. 34 is a sectional view taken along the line 34—34 of FIG. 31;

FIG. 35 is a sectional view taken along the line 35—35 of FIG. 31;

FIG. 36 is a right side view of a portion of the follower assembly illustrating the activation arm in greater detail;

FIG. 38 is a plan view of a key for coupling the arm members of the activation arm to one another during the manufacture of the activation arm;

DETAILED DESCRIPTION OF THE VARIOUS EMBODIMENTS

Figure 1:
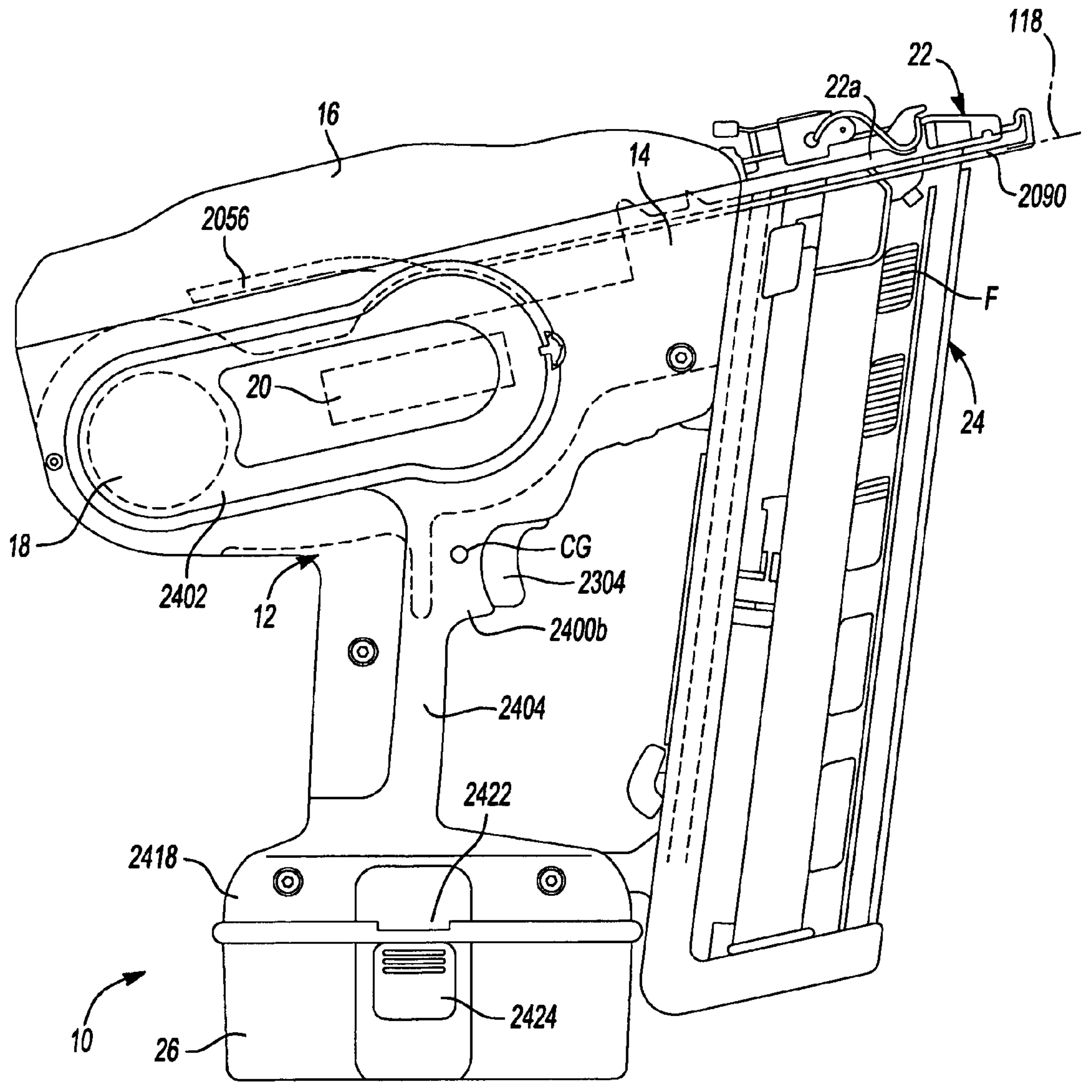
FIG. 1 is a right side elevation view of a fastening tool constructed in accordance with the teachings of the present invention.

With reference to FIG. 1 of the drawings, a fastening tool constructed in accordance with the teachings of the present invention is generally indicated by reference numeral 10. The fastening tool 10 may include a housing assembly 12, a backbone 14, a backbone cover 16, an drive motor assembly 18, a control unit 20, a nosepiece assembly 22, a magazine assembly 24 and a battery pack 26. While the fastening tool 10 is illustrated as being electrically powered by a suitable power source, such as the battery pack 26, those skilled in the art will appreciate that the invention, in its broader aspects, may be constructed somewhat differently and that aspects of the present invention may have applicability to pneumatically powered fastening tools. Furthermore, while aspects of the present invention are described herein and illustrated in the accompanying drawings in the context of a nailer, those of ordinary skill in the art will appreciate that the invention, in its broadest aspects, has further applicability. For example, the drive motor assembly 18 may also be employed in various other mechanisms that utilize reciprocating motion, including rotary hammers, hole forming tools, such as punches, and riveting tools, such as those that install deformation rivets.

Aspects of the control unit 20, the magazine assembly 24 and the nosepiece assembly 22 of the particular fastening tool illustrated are described in further detail in copending U.S. patent application Ser. No. 11/095,723 filed Mar. 31, 2005, entitled “Method For Controlling A Power Driver”, U.S. patent application Ser. No. 11/068,344, filed Feb. 28, 2005, entitled “Contact Trip Mechanism For Nailer”, and U.S. patent application Ser. No. 11/050,280 filed Feb. 3, 2005, entitled “Magazine Assembly For Nailer”, all of which being incorporated by reference in their entirety as if fully set forth herein. The battery pack 26 may be of any desired type and may be rechargeable, removable and/or disposable. In the particular example provided, the battery pack 26 is rechargeable and removable and may be a battery pack that is commercially available and marketed by the DeWalt Industrial Tool Company of Baltimore, Md.

Figure 2:
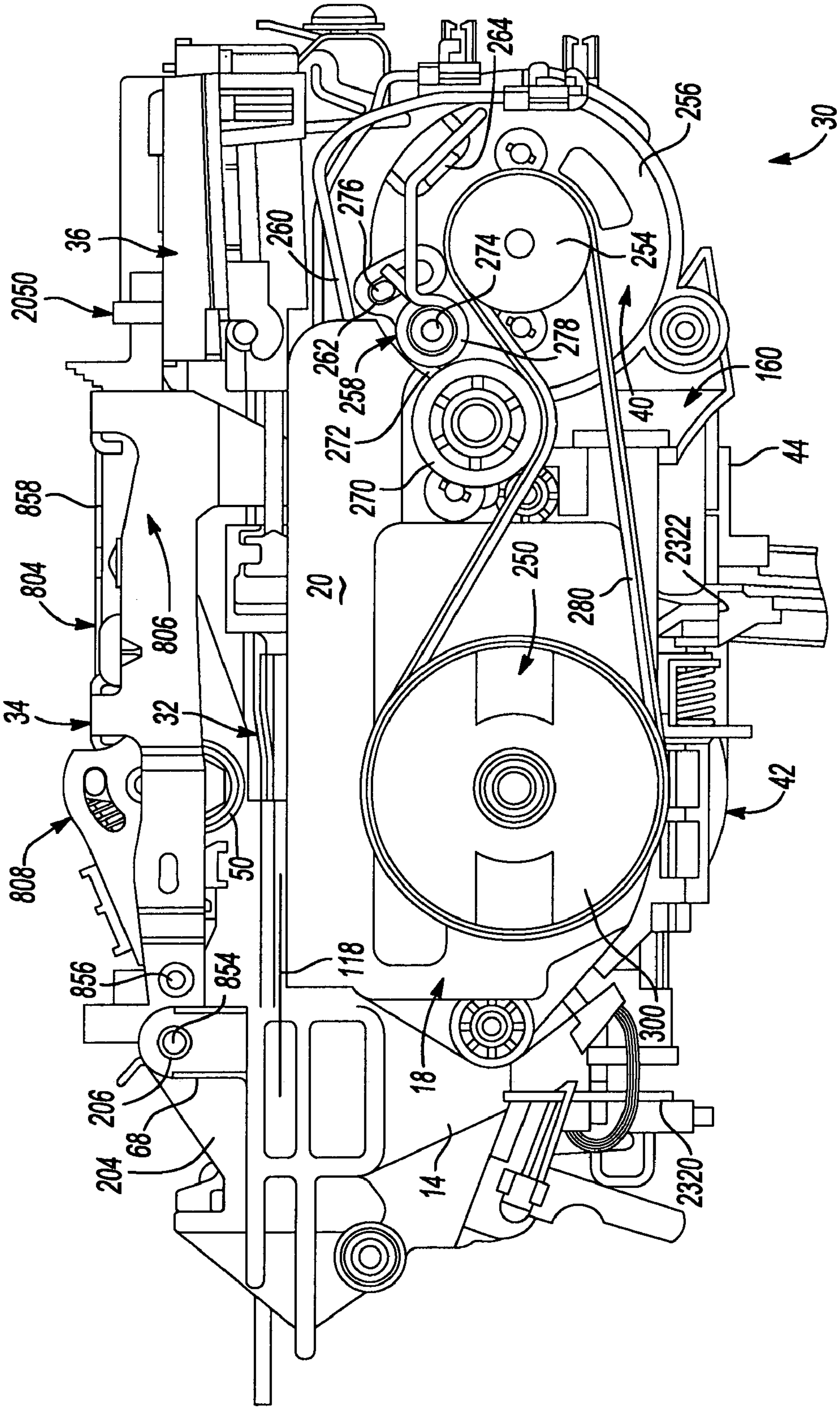
FIG. 2 is a left side view of a portion of the fastening tool of FIG. 1 illustrating the backbone, the drive motor assembly and the control unit in greater detail.
Figure 3:
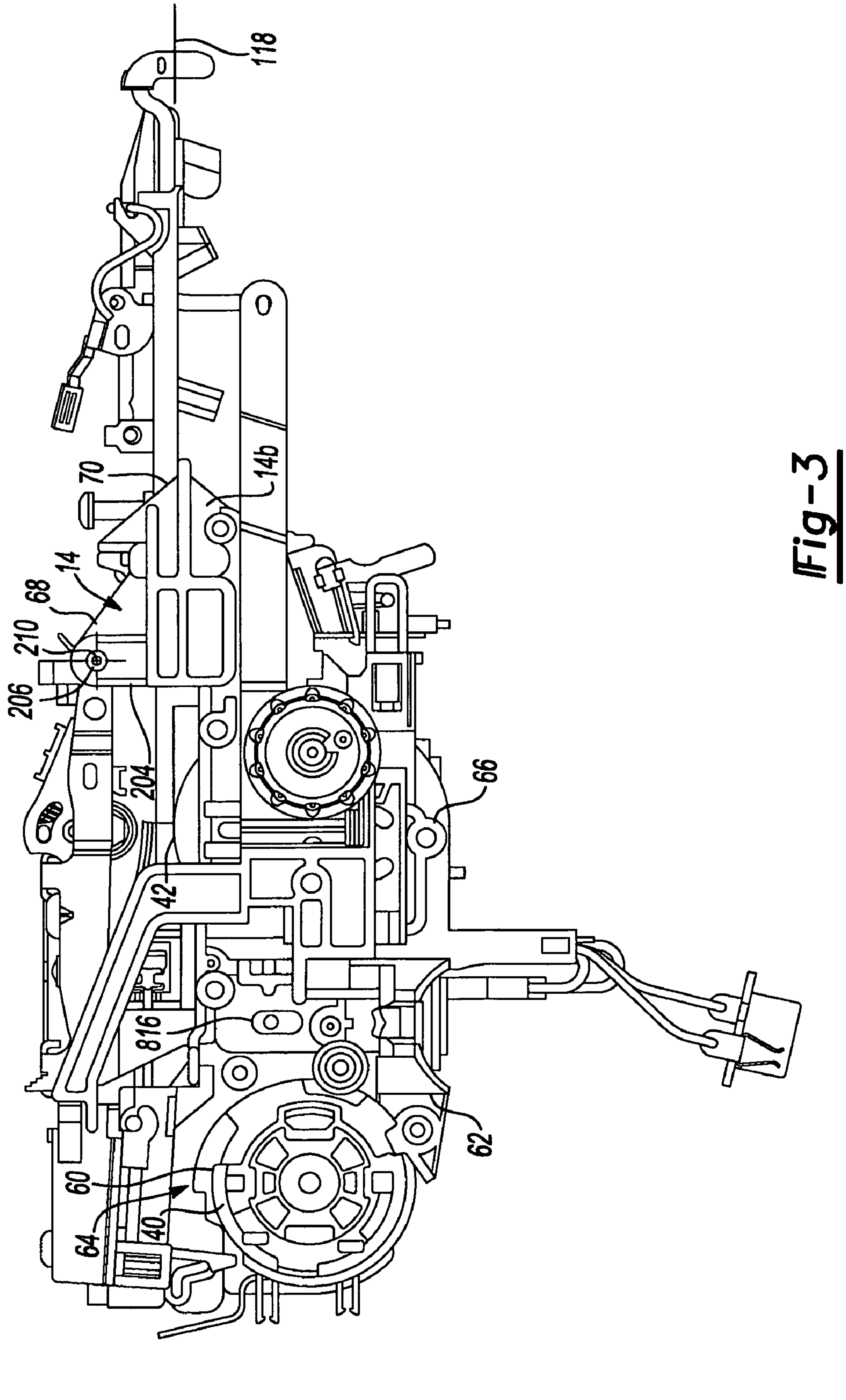
FIG. 3 is a right side view of a portion of the fastening tool of FIG. 1 illustrating the backbone, depth adjustment mechanism and contact trip mechanism in greater detail.

With additional reference to FIGS. 2 and 3, the backbone 14 may be a structural element upon which the drive motor assembly 18, the control unit 20, the nosepiece assembly 22, and/or the magazine assembly 24 may be fully or partially mounted. The drive motor assembly 18 may be of any desired configuration, but in the example provided, includes a power source 30, a driver 32, a follower assembly 34, and a return mechanism 36. In the particular example provided, the power source 30 includes a motor 40, a flywheel 42, and an actuator 44.

In operation, fasteners F are stored in the magazine assembly 24, which sequentially feeds the fasteners F into the nosepiece assembly 22. The drive motor assembly 18 may be actuated by the control unit 20 to cause the driver 32 to translate and impact a fastener F in the nosepiece assembly 22 so that the fastener F may be driven into a workpiece (not shown). Actuation of the power source may utilize electrical energy from the battery pack 26 to operate the motor 40 and the actuator 44. The motor 40 is employed to drive the flywheel 42, while the actuator 44 is employed to move a follower 50 that is associated with the follower assembly 34, which squeezes the driver 32 into engagement with the flywheel 42 so that energy may be transferred from the flywheel 42 to the driver 32 to cause the driver 32 to translate. The nosepiece assembly 22 guides the fastener F as it is being driven into the workpiece. The return mechanism 36 biases the driver 32 into a returned position.

Backbone

Figure 4:
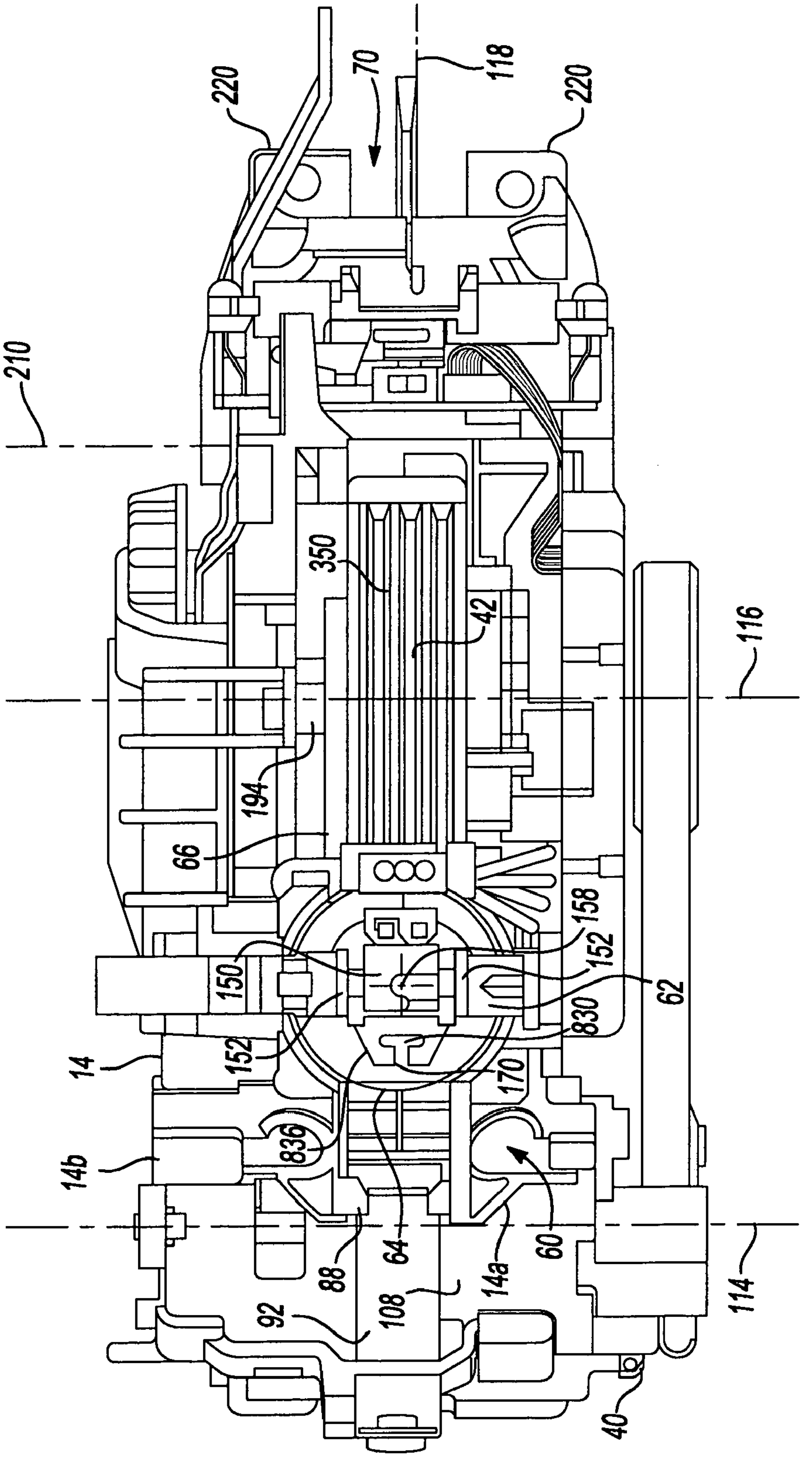
FIG. 4 is a rear view of the a portion of the fastening tool of FIG. 1 illustrating the backbone, the drive motor assembly and the control unit in greater detail.

With reference to FIGS. 3 and 4, the backbone 14 may include first and second backbone portions 14*a* and 14*b*, respectively, that may be die cast from a suitable structural material, such as magnesium or aluminum. The first and second backbone portions 14*a* and 14*b* may cooperate to define a motor mount 60, an actuator mount 62, a clutch mount 64, a flywheel mount 66, a follower pivot 68 and a nosepiece mount 70.

Figure 5:
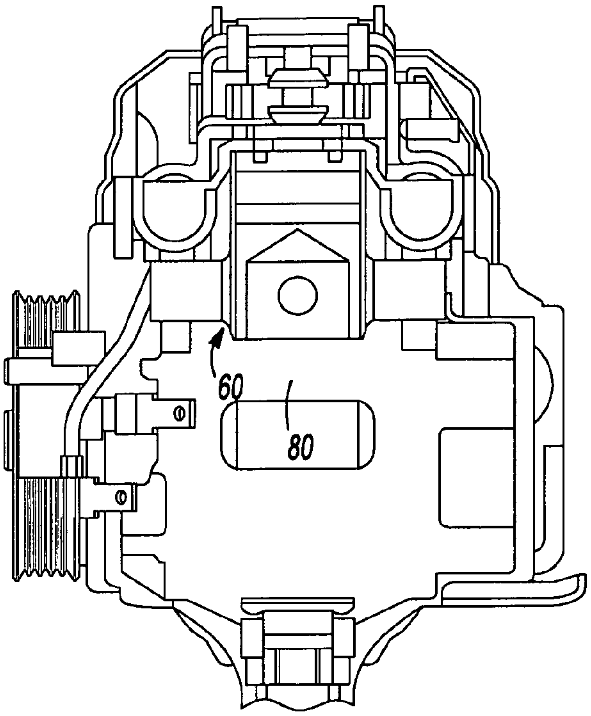
FIG. 5 is a top plan view of a portion of the backbone illustrating the motor mount in greater detail.
Figure 5A:
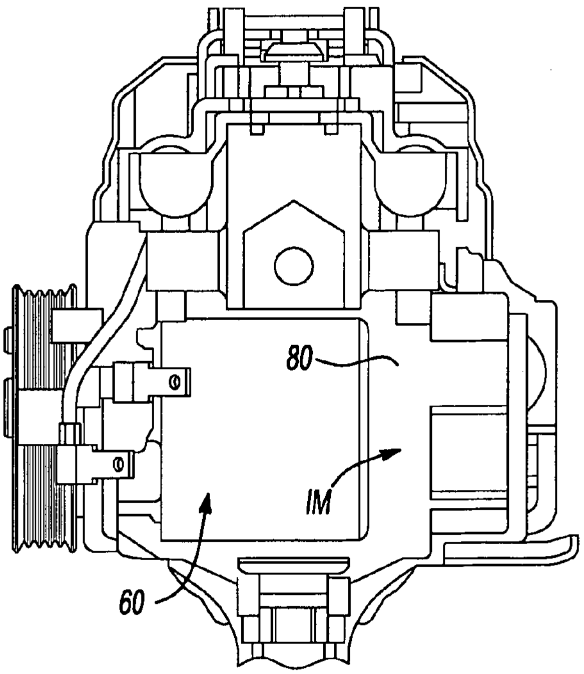
FIG. 5A is a view similar to that of FIG. 5 but illustrating an optional isolator member as installed to the motor mount.
Figure 6:
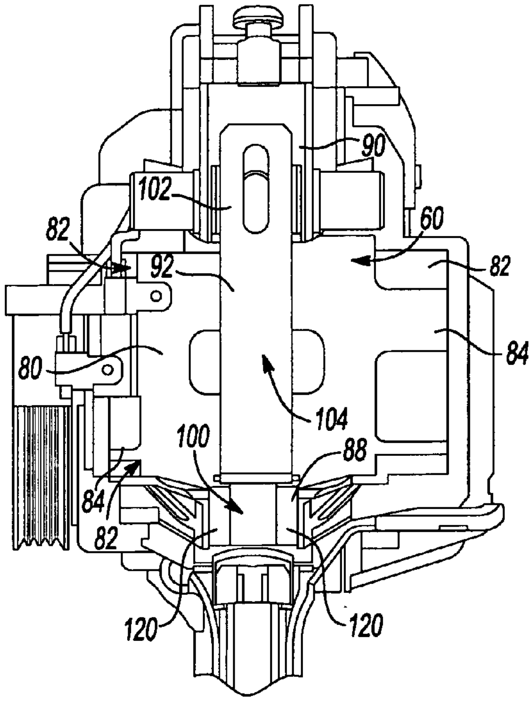
FIG. 6 is another top plan view of the motor mount with a motor strap attached thereto.
Figure 8:
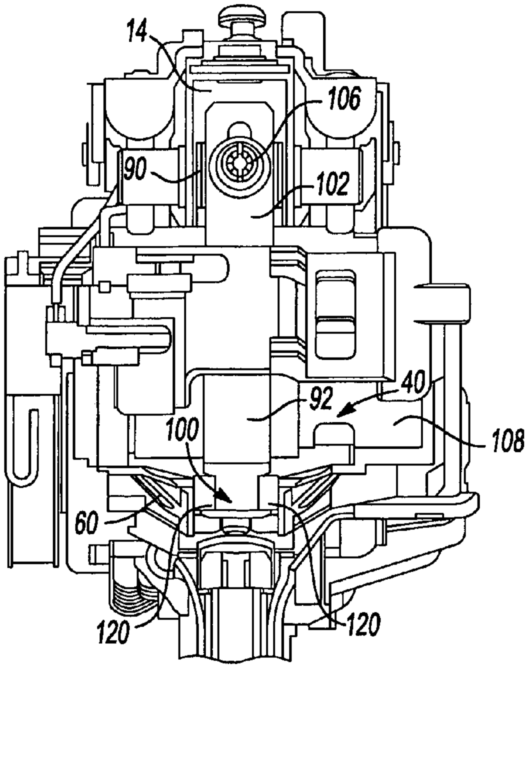
FIG. 8 is a top plan view of the motor mount with the motor operatively attached thereto.
Figure 7:
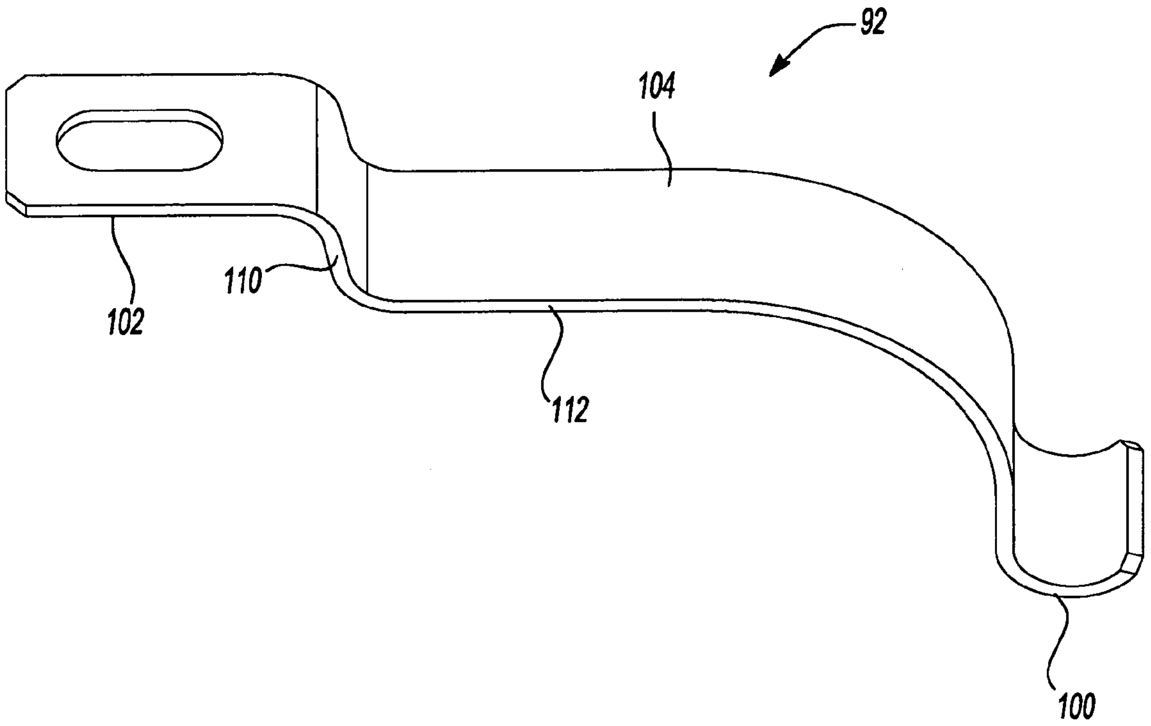
FIG. 7 is a perspective view of the motor strap.

With reference to FIGS. 4 through 6, the motor mount 60 may include an arcuate surface 80 having features, such as a plurality of tabs 82, that abut the motor 40. In the particular example provided, the tabs 82 support the opposite longitudinal ends of the motor 40 and serve to space a flux ring that is disposed about the middle of the motor 40 apart from the motor mount 60. In another example, the motor mount 60 may be configured such that a continuous full sweeping arc of material is disposed at both ends of the motor 40 for support, while the flux ring is elevated above the motor mount 60. As motion of motor 40 against the backbone 14 may cause wear, rotational constraint of the motor 40 relative to the backbone 14 may be obtained through the abutment of the transmission plate 256 against a feature on the backbone 14. Additionally, an optional isolator member IM (FIG. 5A) may be disposed between the motor 40 and the backbone 14. The motor mount 60 may also include first and second engagements 88 and 90, respectively, that cooperate with another structural element to secure the motor 40 in the motor mount 60 against the arcuate surface 80. In the particular example provided, the other structural element is a motor strap 92 which is illustrated in detail in FIGS. 6 and 7. The motor strap 92 may include a hook portion 100, an attachment portion 102 and an intermediate portion 104 that interconnects the hook portion 100 and the attachment portion 102. The hook portion 100 may be pivotally coupled to the first engagement 88 so that the motor strap 92 may pivot relative to the backbone 14 between a first position, which permits the motor 40 to be installed to the motor mount 60, and a second position in which the attachment portion 102 may be abutted against the second engagement 90, which is a flange that is formed on the backbone 14 in the example provided. A threaded fastener 106 (FIG. 8) may be employed to secure the attachment portion 102 to the second engagement 90.

With reference to FIGS. 4 and 6 through 8, the motor strap 92 may be configured to apply a force against the body 108 of the motor 40 that tends to seat the motor 40 against the tabs 82 of the motor mount 60. Accordingly, the intermediate portion 104 may be appropriately shaped so as to apply a load to one or more desired areas on the body 108 of the motor 40, for example to counteract a force, which is applied by the belt 280, that tends to pivot the motor 40 out of the motor mount 60 when the flywheel 42 stalls. In the example provided, the intermediate portion 104 is configured with a gooseneck 110 and a sloped section 112 that cooperate to apply a force to the motor 40 over a relatively small circular segment of the body 108 that may be in-line with the rotational axis 114 of the motor 40 and the rotational axis 116 of the flywheel 42 and which is generally perpendicular to an axis 118 about which the driver 32 is translated.

In the particular example illustrated, the first engagement 88 includes a pair of bosses 120 that are formed onto the backbone 14. Those of ordinary skill in the art will appreciate in light of this disclosure that the motor mount 60 and/or the motor strap 92 may be otherwise configured. For example, a pin, a threaded fastener, or a shoulder screw may be substituted for the bosses 120, and/or the hook portion 100 may be formed as a yoke, or that another attachment portion, which is similar to the attachment portion 102, may be substituted for the hook portion 100. In this latter case, the first engagements 88 may be configured in a manner that is similar to that of the second engagements 90, or may include a slotted aperture into which or pair of rails between which the attachment portion may be received.

Figure 9:
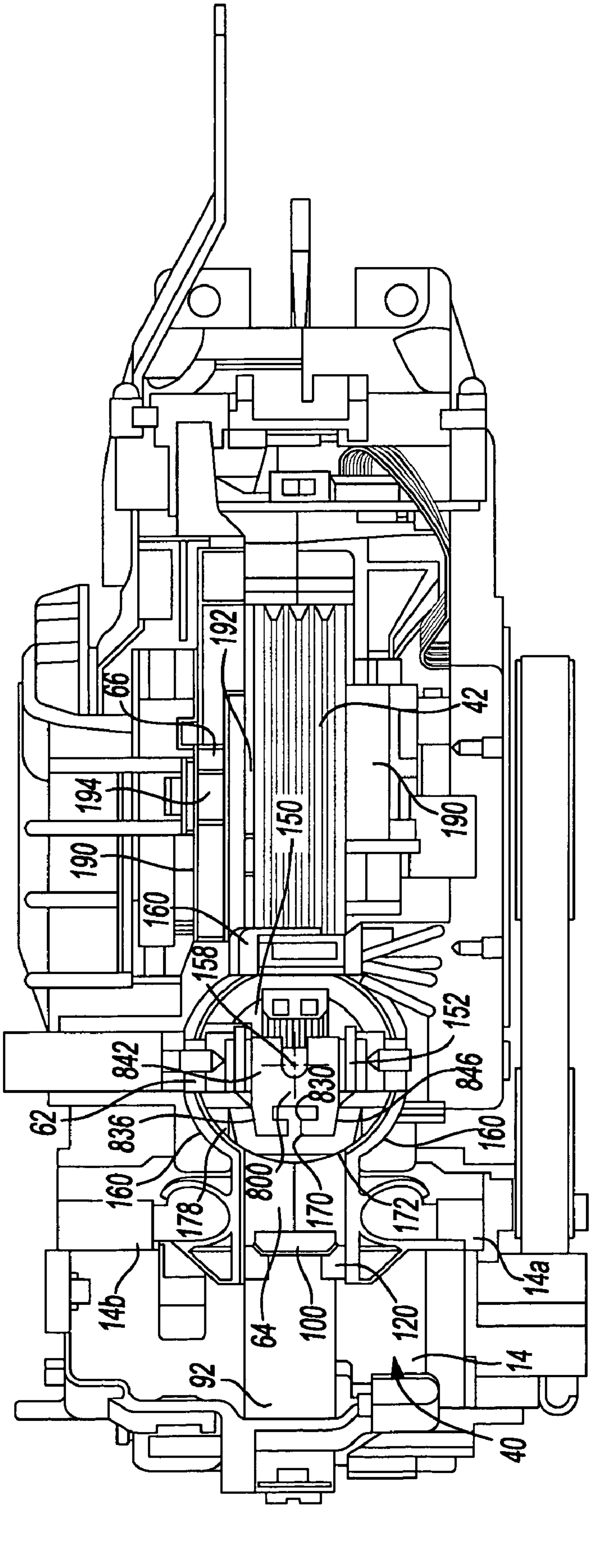
FIG. 9 is a view similar to that of FIG. 4 but illustrating the cam in operative association with the clutch.
Figure 10:
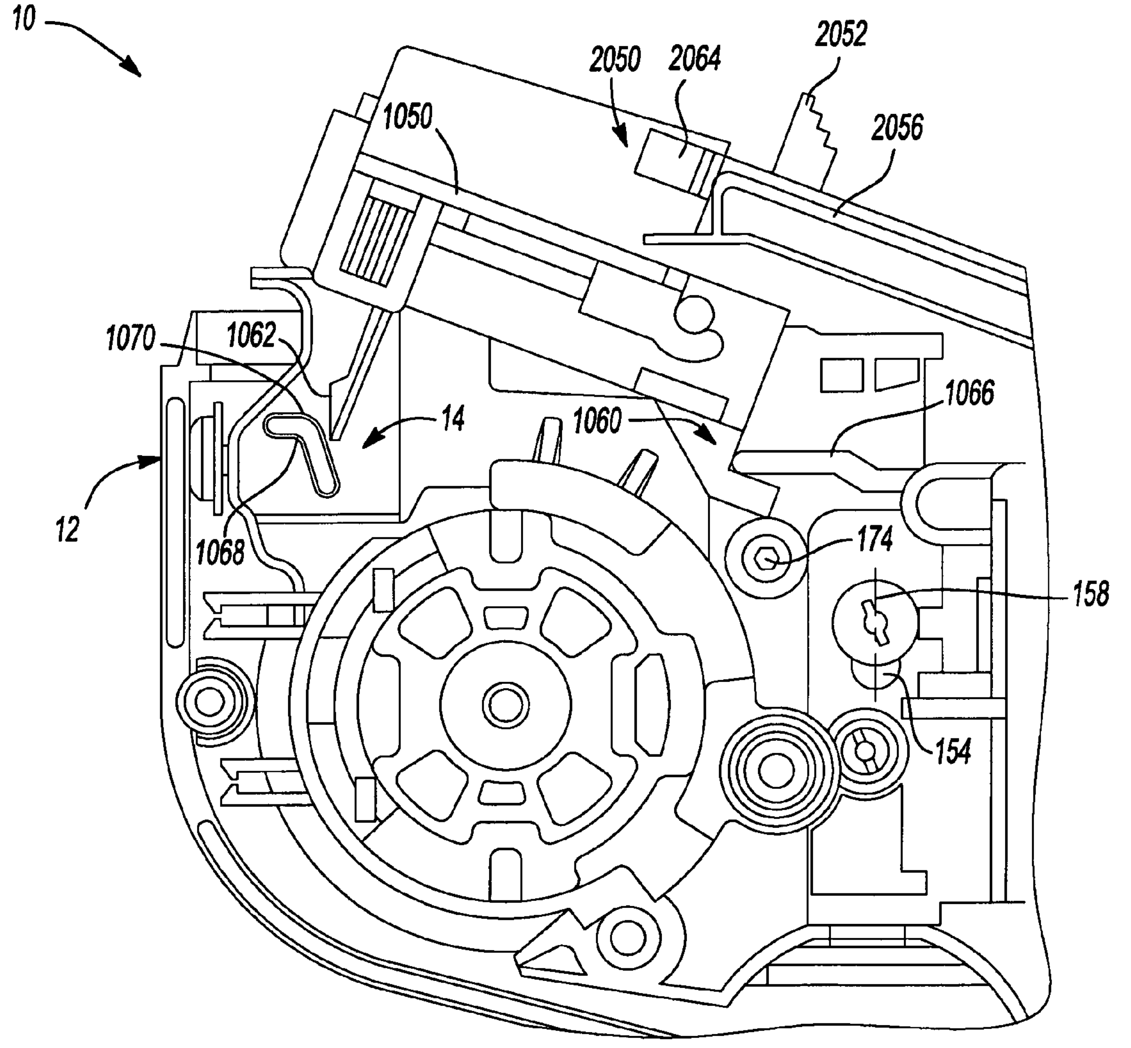
FIG. 10 is a right side view of a portion of the fastening tool of FIG. 1 illustrating the motor mount and the actuator mount and the return mechanism in greater detail.

With reference to FIGS. 9 and 10, the actuator mount 62 may include a bore 150, a pair of channels 152 and a pair of slotted apertures 154. The bore 150 may be formed through the backbone 14 about an axis 158 that is generally perpendicular to the rotational axis 116 of the flywheel 42. A plurality of stand-offs 160 may be formed about the bore 150 which cooperate to shroud the actuator 44 (FIG. 2) so to protect it from deleterious contact with other components (e.g., the housing assembly 12) if the fastening tool 10 should be dropped or otherwise roughly handled. The channels 152 may be formed in the first and second backbone portions **14*a* and 14*b* so as to extend in a direction that is generally parallel the axis 158. The slotted apertures 154 are disposed generally perpendicular to the channels 152** and extend therethrough.

The clutch mount 64 is configured to receive a wear or ground plate 170, which is described in greater detail, below. The clutch mount 64 may be formed in the backbone 14 so as to intersect the bore 150. In the example provided, the clutch mount 64 includes retaining features 172 that capture the opposite ends of the ground plate 170 to inhibit translation of the ground plate 170 along a direction that is generally parallel to the axis 158, as well as to limit movement of the ground plate 170 toward the bore 150. Threaded fasteners, such as cone point set screws 174, may be driven against side of the ground plate 170 to fix the ground plate 170 to the backbone 14 in a substantially stationary position. The ground plate 170 may include outwardly projecting end walls 178, which when contacted by the set screws 174, distribute the clamp force that is generated by the set screws 174 such that the ground plate 170 is both pinched between the two set screws 174 and driven in a predetermined direction, such as toward the bore 150.

The flywheel mount 66 includes a pair of trunnions 190 that cooperate to define a flywheel cavity 192 and a flywheel bore 194. The flywheel cavity 192 is configured to receive the flywheel 42 therein, while the flywheel bore 194 is configured to receive a flywheel shaft 200 (FIG. 13) to which the flywheel 42 is coupled for rotation.

With reference to FIG. 3, the follower pivot 68 may be formed in a pair of arms 204 that extend from the first and second backbone portions **14*a* and 14*b*. In the example provided, the follower pivot 68 is disposed above the flywheel cavity 192 and includes a pair of bushings 206 that are received into the arms 204. The bushings 206 define an axis 210 that is generally perpendicular to the axis 118 and generally parallel to the axis 116 as shown in FIG. 4**.

Figure 11:
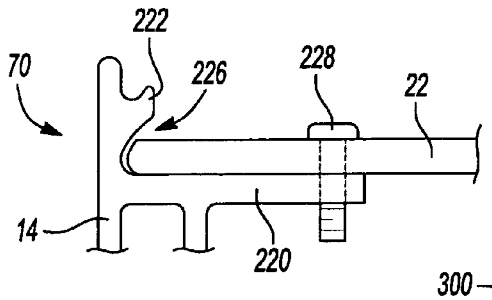
FIG. 11 is a partial longitudinal sectional view of the backbone illustrating the nosepiece mount in operative association with the nosepiece assembly.

With reference to FIGS. 4 and 11, the nosepiece mount 70 may include a pair of flanges 220 and a pair of projections 222. The flanges 220 may extend outwardly from the backbone 14 along a direction that is generally parallel to the axis 118 about which the driver 32 (FIG. 2) translates, whereas the projections 222 may be angled relative to an associated one of the flanges 220 to define a V-shaped pocket 226 therebetween. The nosepiece assembly 22 may be inserted into the V-shaped pocket 226 such that the nosepiece assembly 22 is abutted against the flanges 220 on a first side and wedged against the projections 222 on a second side. Threaded fasteners 228 may be employed to fixedly but removably couple the nosepiece assembly 22 to the flanges 220.

Drive Motor Assembly

With reference to FIG. 2, the drive motor assembly 18 may include the power source 30, the driver 32, the follower assembly 34, and the return mechanism 36. The power source 30 is operable for propelling the driver 32 in a first direction along the axis 118 and may include the motor 40 and a flywheel assembly 250 that includes the flywheel 42 and is driven by the motor 40.

Drive Motor Assembly: Power Source: Motor & Transmission

In the particular example provided, the motor 40 may be a conventional electric motor having an output shaft (not specifically shown) with a pulley 254 coupled thereto for driving the flywheel assembly 250. The motor 40 may be part of a motor assembly that may include a transmission plate 256 and a belt-tensioning device 258.

With additional reference to FIG. 4, the transmission plate 256 may be removably coupled to an end of the body 108 of the motor 40 via conventional threaded fasteners and may include a structure for mounting the belt-tensioning device 258. In the example provided, the transmission plate includes a pivot hub 260, a foot slot 262 and a reaction arm 264. The pivot hub 260 may extend upwardly from the main portion of transmission plate 256 and may include a hole that is formed therethrough. The foot slot 262 is a slot that may be formed about a portion of the pivot hub 260 concentrically with the hole. The reaction arm 264 also extends upwardly from the main portion of the transmission plate 256 and is spaced apart from the pivot hub 260.

Figure 12:
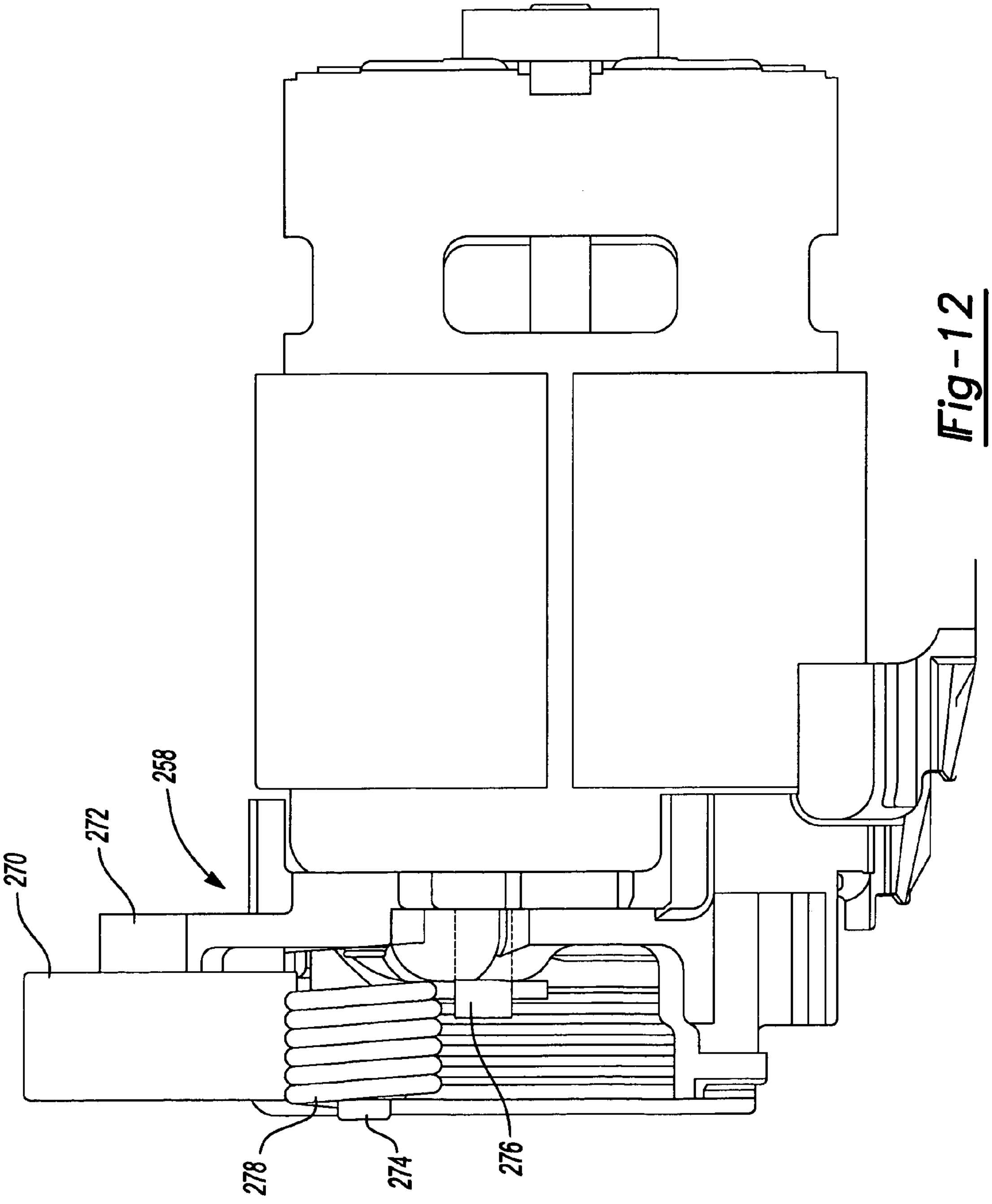
FIG. 12 is a side view of the belt tensioning mechanism.

With additional reference to FIG. 12, the belt-tensioning device 258 has a configuration that is similar to that of a conventional automotive automatically-adjusting belt tensioner. In the example provided, the belt-tensioning device 258 includes an idler wheel 270 that is rotatably mounted to an idler arm 272. The idler arm 272 includes a post 274 that is received into the hole in the pivot hub 260 so that the idler arm 272 (and the idler wheel 270) may pivot about the pivot hub 260. A foot 276 that is formed on the idler arm 272 extends through the foot slot 262; contact between the foot 276 and the opposite ends of the foot slot 262 serves to limit the amount by which the idler arm 272 may be rotated about the pivot hub 260. A torsion spring 278 may be fitted about the pivot hub 260 and engaged to the foot 276 and the reaction arm 264 to thereby bias the idler arm 272 in a desired rotational direction, such as counterclockwise toward the pulley 254.

Drive Motor Assembly: Power Source: Flywheel Assembly

Figure 13:
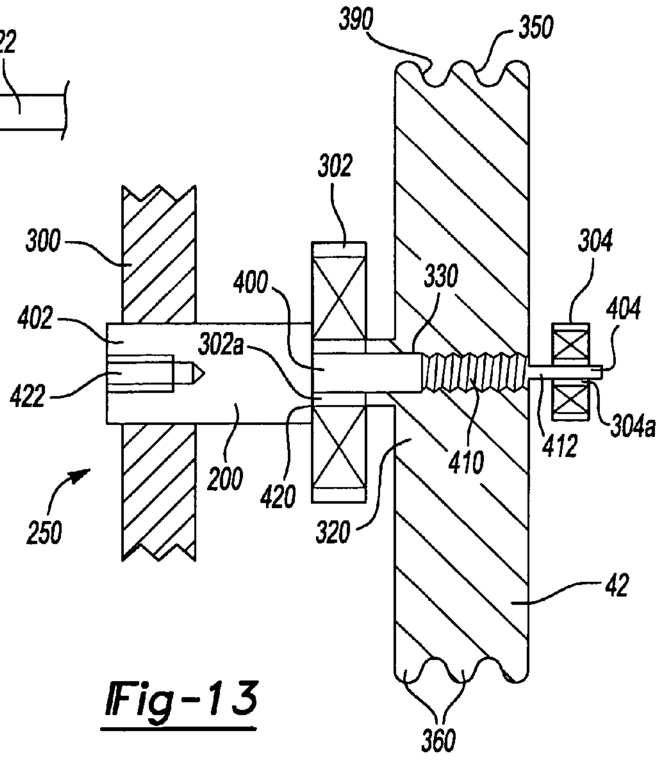
FIG. 13 is a longitudinal section view of the flywheel assembly.

With reference to FIG. 13, the flywheel assembly 250 may include the flywheel 42, the flywheel shaft 200, a flywheel pulley 300, a first support bearing 302 and a second support bearing 304. The flywheel 42 is employed as a kinetic energy storage device and may be configured in any manner that is desired. For example, the flywheel 42 may be unitarily formed in any suitable process and may be cast, forged or formed from a powdered metal material. Alternatively, the flywheel 42 may be formed from two or more components that are fixedly coupled to one another.

Figure 14:
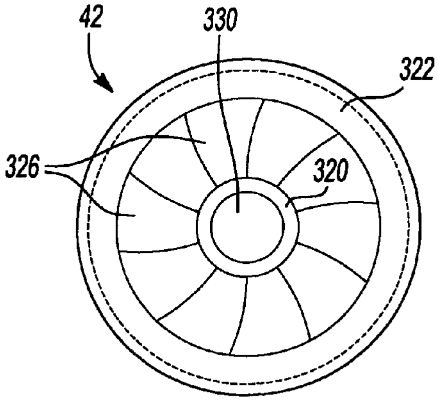
FIG. 14 is a side view of a flywheel constructed in accordance with the teachings of the present invention.
Figure 15:
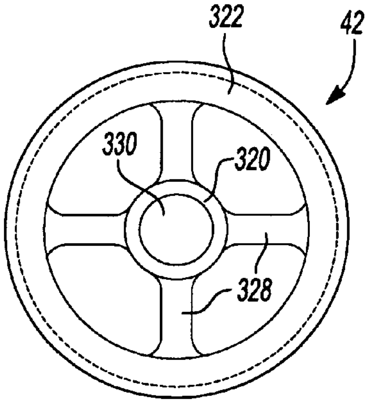
FIG. 15 is a side view of another flywheel constructed in accordance with the teachings of the present invention.

With reference to FIG. 14, the flywheel 42 may include a hub 320, an outer rim 322 and means for coupling the hub 320 and the outer rim 322 to one another. The coupling means may comprise a plurality of blades 326 that may be employed to generate a flow of air when the flywheel 42 rotates; the flow of air may be employed to cool various components of the fastening tool 10 (FIG. 1), such as the motor 40 (FIG. 2), the control unit 20 (FIG. 2) and the flywheel 42 itself. The blades 326 may have any appropriate configuration (e.g., straight, helical). Alternatively, the coupling means may comprise a plurality of spokes 328 (FIG. 15) or any other structure that may be employed to couple the hub 320 and the outer rim 322 to one another.

Returning to FIGS. 13 and 14, the hub 320 may be formed from a hardened material such that the ends of the hub 320 may form wear-resistant thrust surfaces. The hub 320 includes a through-hole 330 that is sized to engage the flywheel shaft 200. In the example illustrated, the through-hole 330 includes a threaded portion and a counterbored portion that is somewhat larger in diameter than the threaded portion.

Figure 16:
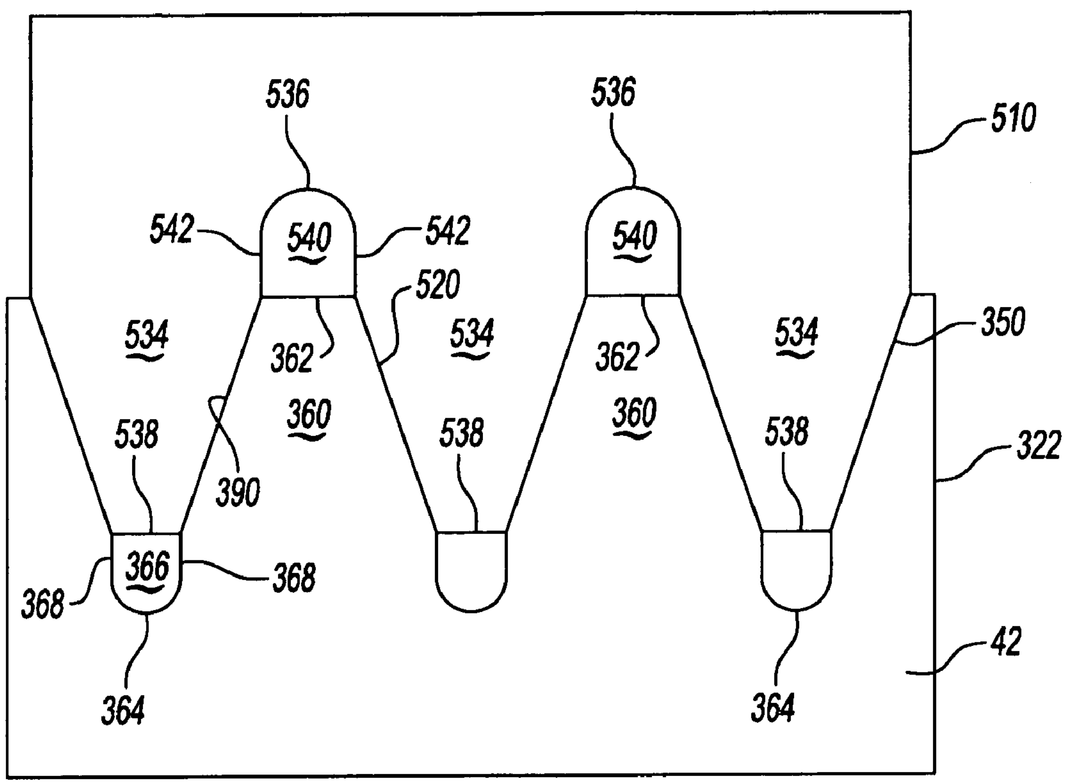
FIG. 16 is a sectional view taken through a portion of the flywheel and the driver.

The outer rim 322 of the flywheel 42 may be configured in any appropriate manner to distribute energy to the driver 32 in a manner that is both efficient and which promotes resistance to wear. In the particular example provided, the outer rim 322 of the flywheel 42 is formed from a hardened steel and includes an exterior surface 350 that is configured with a plurality of circumferentially-extending V-shaped teeth 360 that cooperate to form a plurality of peaks 362 and valleys 364 as shown in FIG. 16. The valleys 364 in the exterior surface 350 of the outer rim 322 may terminate at a slot 366 having spaced apart wall members 368 rather than at a sharp corner. The slot 366 that is formed in the valleys 364 will be discussed in greater detail, below.

Figure 17:
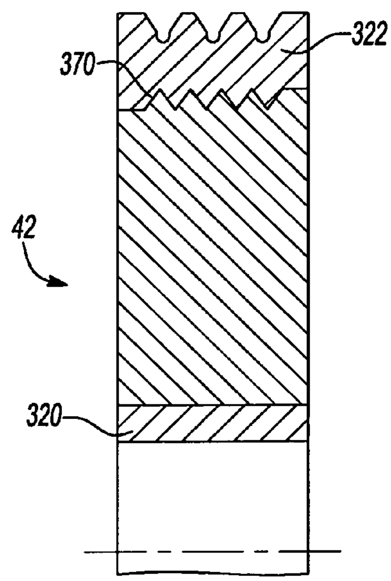
FIG. 17 is a sectional view of yet another flywheel constructed in accordance with the teachings of the present invention.
Figure 18:
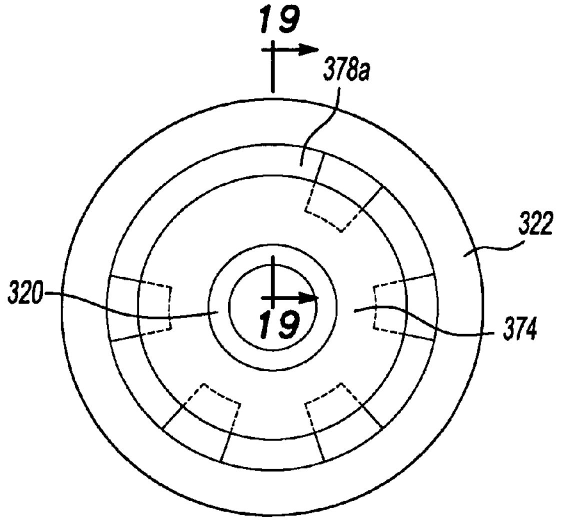
FIG. 18 is a side view of still another flywheel constructed in accordance with the teachings of the present invention.
Figure 19:
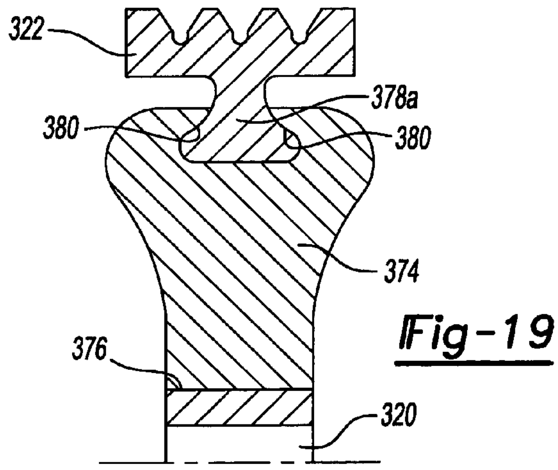
FIG. 19 is a sectional view taken along the line 19—19 of FIG. 18.

Examples of flywheels 42 having a configuration with two or more components are shown in FIGS. 17 through 19, wherein the outer rim 322 has a relatively high mass and is coupled to the remainder of the flywheel 42, the remainder having a relatively low mass. In the example of FIG. 17, the outer rim 322 is threadably engaged to the hub 320 using threads 370 having a "hand" (i.e., right-handed or left-handed) that is opposite the direction with which the flywheel 42 rotates so as to self-tighten when the fastening tool 10 is utilized.

In the example of FIGS. 18 and 19, the hub 320 and the outer rim 322 are discrete components, and the coupling means 374 is a material, such as a thermoplastic, that is cast or molded to the hub 320 and the outer rim 322. The hub 320 may have a flat or contoured outer surface 376, while the outer rim 322 is formed with an interior flange 378. The interior flange 378 may extend about the interior of the outer rim 322 in an intermittent manner (i.e., with portions 378*a* that are circumferentially-spaced apart as shown) and includes a pair of abutting surfaces 380 that are configured to be engaged by the coupling means 374. The coupling means 374 may be molded or cast between the hub 320 and the outer rim 322.

Hoop stresses that are generated when the coupling means 374 cools and shrinks are typically sufficient to secure the coupling means 374 and the hub 320 to one another. Shrinkage of the coupling means 374, however, tends to pull the coupling means 374 away from the outer rim 322, which is why insert molding has not been employed to mold to the interior surface of a part. In this example, however, shrinkage of the coupling means 374 applies a force (i.e., a shrink force) to the abutting surfaces 380 on the interior flange 378, which fixedly couples the coupling means 374 to the outer rim 322.

Figure 20:
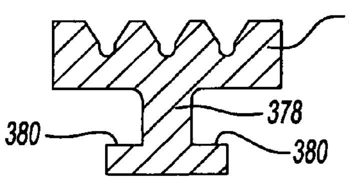
FIG. 20 is a sectional view of an alternately constructed outer rim.
Figure 21:
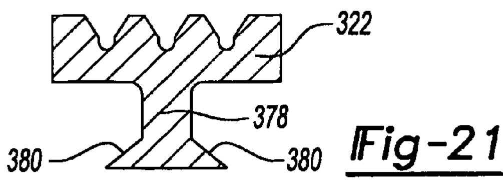
FIG. 21 is a sectional view of another alternately constructed outer rim.

To eliminate or control a cupping effect that may occur when one side of the interior flange 378 is subjected to a higher load than the other side, the abutting surfaces 380 may be configured to divide the shrink force in a predetermined manner. In the example provided, it was desirable that the cupping effect be eliminated and as such, the abutting surfaces 380 were formed as mirror images of one another. Other examples of suitably configured abutting surfaces 380 may include the configurations that are illustrated in FIGS. 20 and 21. Those of ordinary skill in the art will appreciate from this disclosure that although the interior-insert molding technique has been illustrated and described in conjunction with a flywheel for a nailer, the invention in its broadest aspects are not so limited.

Returning to FIGS. 13 and 16, an optional wear-resistant coating 390 may be applied to the outer rim 322 to improve the longevity of the flywheel 42. The wear-resistant coating 390 may comprise any coating having a relatively high hardness, a thickness greater than about 0.001 inch, and a coefficient of friction against steel or iron of about 0.1 or greater. For example, if the outer rim 322 of the flywheel 42 were made of SAE 4140 steel that has been through-hardened to a hardness of about 35 $R_c$ to about 40 $R_c$, or of SAE 8620 steel that has been case-hardened to a hardness of about 35 $R_c$ to about 40 $R_c$, the wear-resistant coating 390 may be formed of a) tungsten carbide and applied via a high-velocity oxy-fuel process, b) tantalum tungsten carbide and applied via an electro-spark alloying process, c) electroless nickel and applied via a chemical bath, or d) industrial hard chrome and applied via electroplating.

Returning to FIG. 13, the flywheel shaft 200 includes a central portion 400, a first end portion 402 and a second end portion 404. The central portion 400 is relatively smaller in diameter than the first end portion 402 but relatively larger in diameter than the second end portion 404. The first end portion 402 may be generally cylindrically shaped and may be sized to engage the flywheel pulley 300 in a press fit or shrink fit manner. The central portion 400 is sized to receive thereon the first support bearing 302 in a slip fit manner. The second end portion 404 includes a threaded portion 410 and a necked-down portion 412 that is adjacent the threaded portion 410 on a side opposite the central portion 400. The threaded portion 410 is sized to threadably engage the flywheel 42, while the necked-down portion 412 is sized to engage the second support bearing 304 in a slip-fit manner.

With additional reference to FIGS. 9 and 14, the first and second support bearings 302 and 304 may be pressed into, adhesively coupled to or otherwise installed to the first and second backbone portions 14*a* and 14*b*, respectively in the flywheel bore 194. The flywheel 42 may be placed into the flywheel cavity 192 in the backbone 14 such that the through-hole 330 in the hub 320 is aligned to the flywheel bore 194. The flywheel shaft 200, with the flywheel pulley 300 coupled thereto as described above, is inserted into the flywheel bore 194 and installed to the flywheel 42 such that the threaded portion 410 is threadably engaged to the threaded portion of the through-hole 330 in the hub 320 of the flywheel 42, the central portion 400 is supported by the first support bearing 302, the portion of the central portion 400 between the first support bearing 302 and the threaded portion 410 of the flywheel shaft 200 is received into the counterbored portion of the hub 320 of the flywheel 42, and the necked-down portion 412 is supported by the second support bearing 304. As noted above, the first and second support bearings 302 and 304 engage the flywheel shaft 200 in a slip fit manner, which permits the flywheel shaft 200 to be slidably inserted into the flywheel bore 194.

The flywheel shaft 200 may be rotated relative to the flywheel 42 to draw the flywheel 42 into abutment with the first support bearing 302 such that the inner race 302*a* of the first support bearing 302 is clamped between the flywheel 42 and a shoulder 420 between the first end portion 402 and the central portion 400. To aid the tightening of the flywheel 42 against the first support bearing 302, an assembly feature 422, such as a non-circular hole (e.g., hex, square, Torx® shaped) or a slot may be formed in or a protrusion may extend from either the flywheel pulley 300 or the first end portion 402. The assembly feature 422 is configured to be engaged by a tool, such as an Allen wrench, an open end wrench or a socket wrench, to permit the flywheel shaft 200 to be rotated relative to the flywheel 42.

Returning to FIGS. 2 and 13, a belt 280, which may have a poly-V configuration that matches that of the pulley 254 and the flywheel pulley 300, may be disposed about the pulley 254 and the flywheel pulley 300 arid engaged by the idler wheel 270 of the belt-tensioning device 258 to tension the belt 280. The load that is applied by the belt 280 to the flywheel assembly 250 places a load onto the flywheel shaft 200 that is sufficient to force the necked-down portion 412 against the inner bearing race 304*a* of the second support bearing 304 to thereby inhibit relative rotation therebetween. In the particular example provided, the motor 40, belt 280, flywheel pulley 300 and flywheel 42 may be configured so that the surface speed of the exterior surface 350 of the flywheel 42 may attain a velocity of about 86 ft/sec to 92 ft/sec.

Figure 22:
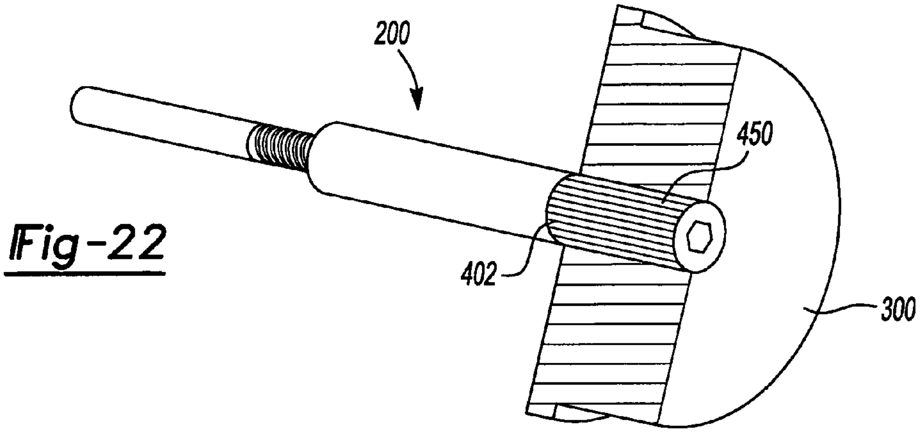
FIG. 22 is a perspective view in partial section of a portion of the flywheel assembly wherein the flywheel pulley is molded directly onto the flywheel shaft.

While the flywheel pulley 300 has been described as being a discrete component, those skilled in the art will appreciate that it may be otherwise formed. For example, the flywheel shaft 200 may be formed such that the first end portion 402 includes a plurality of retaining features 450, such as teeth or splines, that may be formed in a knurling process, for example, as is shown in FIG. 22. The flywheel pulley 300 may be insert molded to the flywheel shaft 200. In this regard, the tooling that is employed to form the flywheel pulley 300 may be configured to locate on the outer diameters of the central portion 400 or the second end portion 404, which may be ground concentrically about the rotational axis of the flywheel shaft 200. Accordingly, the flywheel pulley 300 may be inexpensively attached to the flywheel shaft 200 in a permanent manner without introducing significant runout or other tolerance stack-up.

Drive Motor Assembly: Driver

Figure 23:
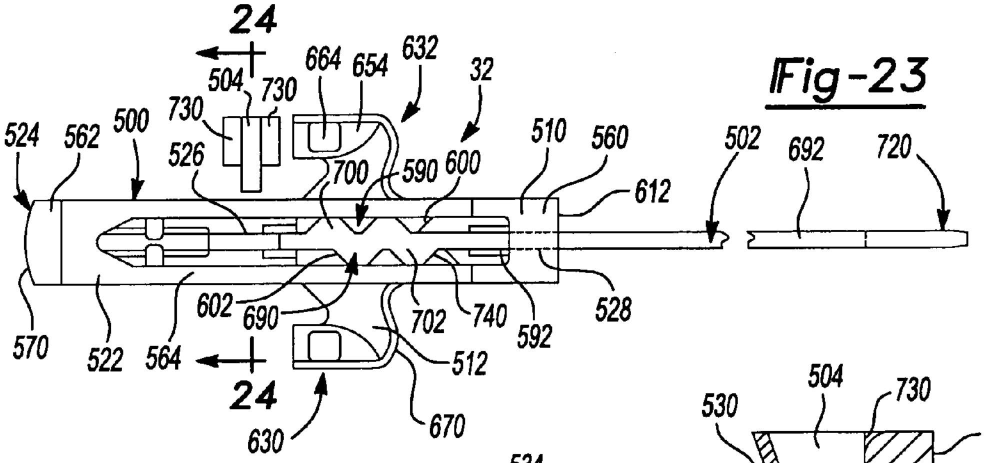
FIG. 23 is a front view of a driver constructed in accordance with the teachings of the present invention, the keeper being shown exploded from the remainder of the driver.
Figure 24:
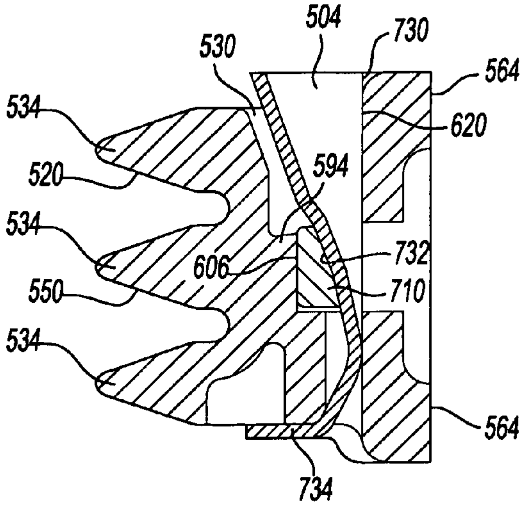
FIG. 24 is a sectional view taken along the line 24—24 of FIG. 23.

With reference to FIGS. 23 and 24, the driver 32 may include an upper driver member 500, a driver blade 502 and a retainer 504. The upper driver member 500 may be unitarily formed in an appropriate process, such as investment casting, from a suitable material. In the particular example provided, the upper driver member 500 was formed of titanium. Titanium typically exhibits relatively poor wear characteristics and as such, those of ordinary skill in the art would likely consider the use of titanium as being unsuitable and hence, unconventional. We realized, however, that as titanium is relatively lightweight, has a relatively high strength-to-weight ratio and has excellent bending and fatigue properties, an upper driver member 500 formed from titanium might provide a relatively lower mass driver 32 that provides improved system efficiency (i.e., the capacity to set more fasteners). In the particular example provided, the use of titanium for the upper driver member 500 provided an approximately 20% increase in capacity as compared with upper driver members 500 that were formed from conventional materials, such as steel. The upper driver member 500 may include a body 510 and a pair of projections 512 that extend from the opposite lateral sides of the body 510. The body 510 may include a driver profile 520, a cam profile 522, an abutment 524, a blade recess 526, a blade aperture 528, and a retainer aperture 530.

With additional reference to FIG. 16, the driver profile 520 is configured in a manner that is complementary to the exterior surface 350 of the outer rim 322 of the flywheel 42. In the particular example provided, the driver profile 520 includes a plurality of longitudinally extending V-shaped teeth 534 that cooperate to form a plurality of valleys 536 and peaks 538. The valleys 536 may terminate at a slot 540 having spaced apart wall members 542 rather than at a sharp corner. The slots 366 and 540 in the outer rim 322 and the body 510, respectively, provide a space into which the V-shaped teeth 534 and 360, respectively, may extend as the exterior surface 350 and/or the driver profile 520 wear to thereby ensure contact between the exterior surface 350 and the driver profile 520 along a substantial portion of the V-shaped teeth 360 and 534, rather than point contact at one or more locations where the peaks 362 and 538 contact the valleys 536 and 364, respectively.

To further control wear, a coating 550 may be applied to the body 510 at one or more locations, such as over the driver profile 520 and the cam profile 522. The coating may be a type of carbide and may be applied via a plasma spray, for example.

Figure 25:
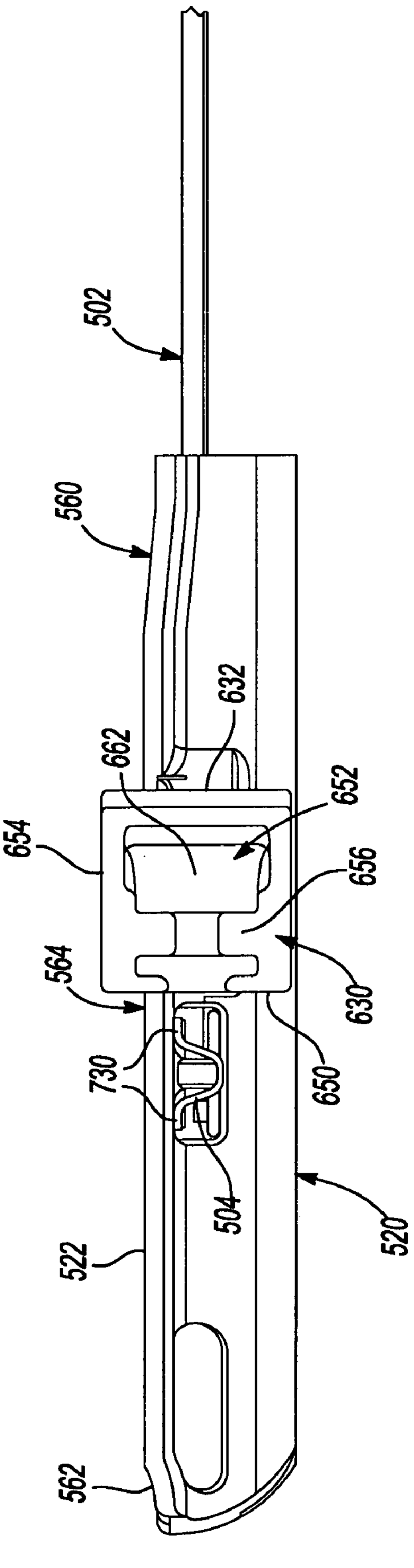
FIG. 25 is a right side view of the driver of FIG. 23.

In FIGS. 23 through FIG. 25, the cam profile 522 may be formed on a side of the body 510 opposite the driver profile 520 and may include a first cam portion 560 and a second cam portion 562 and a pair of rails 564 that may extend between the first and second cam portions 560 and 562. The abutment 524 may be formed on the body 510 on a side opposite the side from which the driver blade 502 extends and may include an arcuate end surface 570 that slopes away from the driver profile 520. The cam profile 522 and the abutment 524 are discussed in greater detail, below.

The blade recess 526 may be a longitudinally extending cavity that may be disposed between the rails 564 of the cam profile 522. The blade recess 526 may define an engagement structure 590 for engaging the driver blade 502 and first and second platforms 592 and 594, that may be located on opposite sides of the engagement structure 590. In the example provided, the engagement structure 590 includes a plurality of teeth 600 that cooperate to define a serpentine-shaped channel 602, having a flat bottom 606 that may be co-planar with the first platform 592. The first platform 592 may begin at a point that is within the blade recess 526 proximate the blade aperture 528 and may extend to the lower surface 612 of the body 510, while the second platform 594 is positioned proximate the retainer aperture 530.

Figure 26:
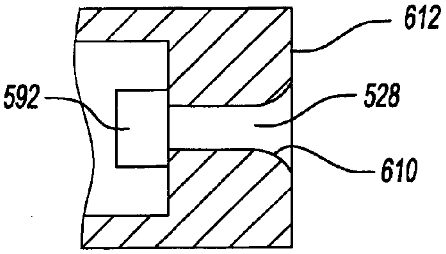
FIG. 26 is a longitudinal section view of a portion of an alternately constructed driver.

The blade aperture 528 is a hole that extends longitudinally through a portion of the body 510 of the driver 32 and intersects the blade recess 526. The blade aperture 528 may include fillet radii 610 (FIG. 26) so that a sharp corner is not formed at the point where the blade aperture 528 meets the exterior lower surface 612 of the body 510.

The retainer aperture 530 may extend through the body 510 of the driver 32 in a direction that may be generally perpendicular to the longitudinal axis of the driver 32. In the example provided, the retainer aperture 530 is a slot having an abutting edge 620 that is generally parallel to the rails 564.

The projections 512 may be employed both as return anchors 630, i.e., points at which the driver 32 is coupled to the return mechanism 36 (FIG. 2), and as bumper tabs 632 that are used to stop downward movement of the driver 32 after a fastener has been installed to a workpiece. Each return anchor 630 may be formed into portions of an associated projection 512 that extends generally parallel to the longitudinal axis of the driver 32. The return anchor 630 may include a top flange 650, a rear wall 652, a pair of opposite side walls 654 and a front flange 656. The top flange 650 may extend between the side walls 654 and defines a cord opening 660. The rear wall 652, which may intersect the top flange 650, cooperates with the top flange 650, the side walls 654 and the front flange 656 to define an anchor cavity 662. In the particular example provided, the rear wall 652 is generally parallel to the longitudinal axis of the driver 32 at a location that is across from the front flange 656 and is arcuately shaped at a location below the front flange 656. The side walls 654 may be coupled to the rear wall 652 and the front flange 656 and may include an anchor recess 664, which may extend completely through the side wall 654.

The bumper tabs 632 define a contact surfaces 670 that may be cylindrically shaped and which may be arranged about axes that are generally perpendicular to the longitudinal axis of the driver 32 and generally parallel one another and disposed on opposite lateral sides of the driver profile 520.

The driver blade 502 may include a retaining portion 690 and a blade portion 692. The retaining portion 690 may include a corresponding engagement structure 700 that is configured to engage the engagement structure 590 in the body 510. In the particular example provided, the corresponding engagement structure 700 includes a plurality of teeth 702 that are received into the serpentine-shaped channel 602 and into engagement with the teeth 600 of the engagement structure 590. Engagement of the teeth 600 and 702 substantially inhibits motion between the driver blade 502 and the body 510. The retaining portion 690 may further include an engagement tab 710 that is configured to be engaged by both the second platform 594 and the retainer 504 as shown in FIG. 24. The engagement tab 710 may have any desired configuration but in the example provided tapers between its opposite lateral sides.

Returning to FIG. 23, the blade portion 692 extends downwardly from the retaining portion 690 and through the blade aperture 528 in the body 510. The opposite end of the driver blade 502 may include an end portion 720 that is tapered in a conventional manner (e.g., on the side against which the fasteners in the magazine assembly 24 are fed) and on its laterally opposite sides.

With additional reference to FIGS. 24 and 25, the retainer 504 may be configured to drive the retaining portion 690 of the driver blade 502 against the second platform 594 and to inhibit movement of the driver blade 502 relative to the body 510 in a direction that is generally transverse to the longitudinal axis of the driver 32. In the example provided, the retainer 504 includes a pair of feet 730, an engagement member 732 and a tab 734. The engagement member 732 is inwardly sloped relative to the feet 730 and disposed on a side of the retainer 504 opposite the tab 734.

To assemble the driver 32, the driver blade 502 is positioned into the blade aperture 528 and slid therethrough so that a substantial portion of the driver blade 502 extends through the blade aperture 528. The corresponding engagement structure 700 is lowered into the engagement structure 590 such that the teeth 702 are engaged to the teeth 600 and the engagement tab 710 is disposed over the second platform 594. The retainer 504 is inserted into the retainer aperture 530 such that the feet 730 are disposed against the abutting edge 620, the engagement tab 710 is in contact with both the engagement member 732 and the second platform 594, and the tab 734 extends out the retainer aperture 530 on an opposite side of the body 510. The sloped surface of the engagement member 732 of the retainer 504 is abutted against the matching sloped surface of the engagement tab 710, which serves to wedge the engagement tab 710 against the second platform 594. The tab 734 may be deformed (e.g., bent over and into contact with the body 510 or twisted) so as to inhibit the retainer 504 from withdrawing from the retainer aperture 530.

Engagement of the teeth 600 and 702 permits axially directed loads to be efficiently transmitted between the driver blade 502 and the driver body 510, while the retainer 504 aids in the transmission of off-axis loads as well as maintains the driver blade 502 and the driver body 510 in a condition where teeth 600 and 702 are engaged to one another.

Optionally, a structural gap filling material 740, such as a metal, a plastic or an epoxy, may be applied to the engagement structure 590 and the corresponding engagement structure 700 to inhibit micro-motion therebetween. In the example provided, the structural gap filling material 740 comprises an epoxy that is disposed between the teeth 600 and 702. Examples of suitable metals for the structural gap filling material 740 include zinc and brass.

In the example provided, the magazine assembly 24 slopes upwardly with increasing distance from the nosepiece assembly 22, but is maintained in a plane that includes the axis 118 as shown in FIG. 1 as well as the centerline of the housing assembly 12. In some situations, however, the slope of the magazine assembly 24 may bring it into contact with another portion of the fastening tool 10, such as the handle of the housing assembly 12. In such situations, it is desirable that the driver blade 502 (FIG. 23) be arranged generally perpendicular to the axis along which fasteners F are fed from the magazine assembly 24. One solution may be to rotate the orientation of drive motor assembly 18 and nosepiece assembly 22 so as to conform to the axis along which fasteners F are fed from the magazine assembly 24. This solution, however, may not be implementable, as it may not be practical to rotate the drive motor assembly 18 and/or the appearance of the fastening tool 10 may not be desirable when its nosepiece assembly 22 has been rotated into a position that is different from that which is illustrated.

Figure 28:
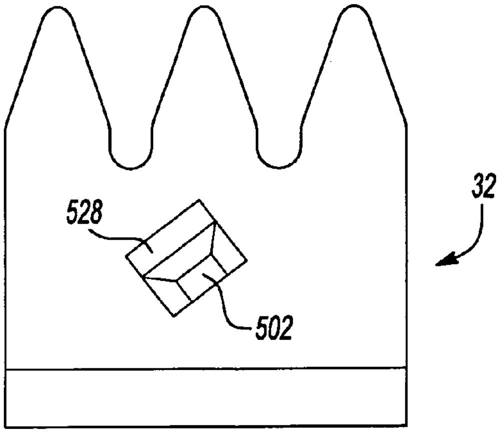
FIG. 28 is a bottom view of an alternately constructed driver having a driver blade that is angled to match a feed direction of fasteners from a magazine assembly that is angled relative to the axis about which the drive motor assembly is oriented.

The two-piece configuration of the driver 32 (FIG. 23) permits the driver blade 502 (FIG. 23) to be rotated about the axis 118 and the centerline of the housing assembly 12 so as to orient the driver blade 502 (FIG. 23) in a desired manner. Accordingly, the driver 32 may be configured as shown in FIG. 28, which permits the drive motor assembly 18 to be maintained in the orientation that is shown in FIGS. 2 and 4.

Figure 29:
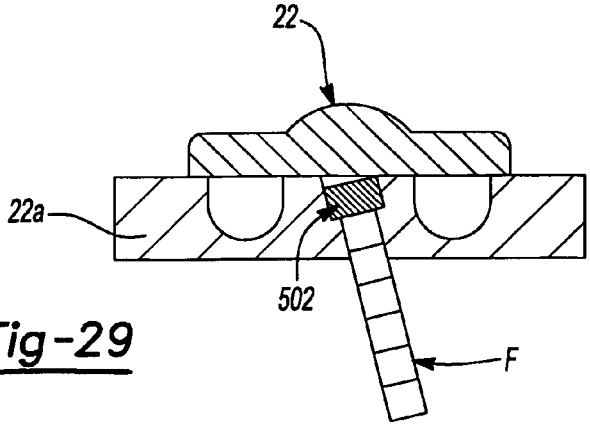
FIG. 29 is a sectional view of an alternately constructed nosepiece assembly wherein the nosepiece is configured to receive fasteners from a magazine assembly that is rotated relative to a plane that extends through the longitudinal center of the fastening tool.

Alternatively, the nosepiece **22*a* of the nosepiece assembly 22 may be coupled to the housing assembly 12 and backbone 14 (FIG. 2) as described herein, but may be configured to receive fasteners F from the magazine assembly 24 along the axis along which the fasteners F are fed. This arrangement is schematically illustrated in FIG. 29. The drive motor assembly 18 (FIG. 1), however, may be rotated about the axis 118 (FIG. 1) and the centerline of the housing assembly 12 to align the driver blade 502 to the nosepiece 22*a***.

Drive Motor Assembly: Skid Plate & Skid Roller

Figure 30:
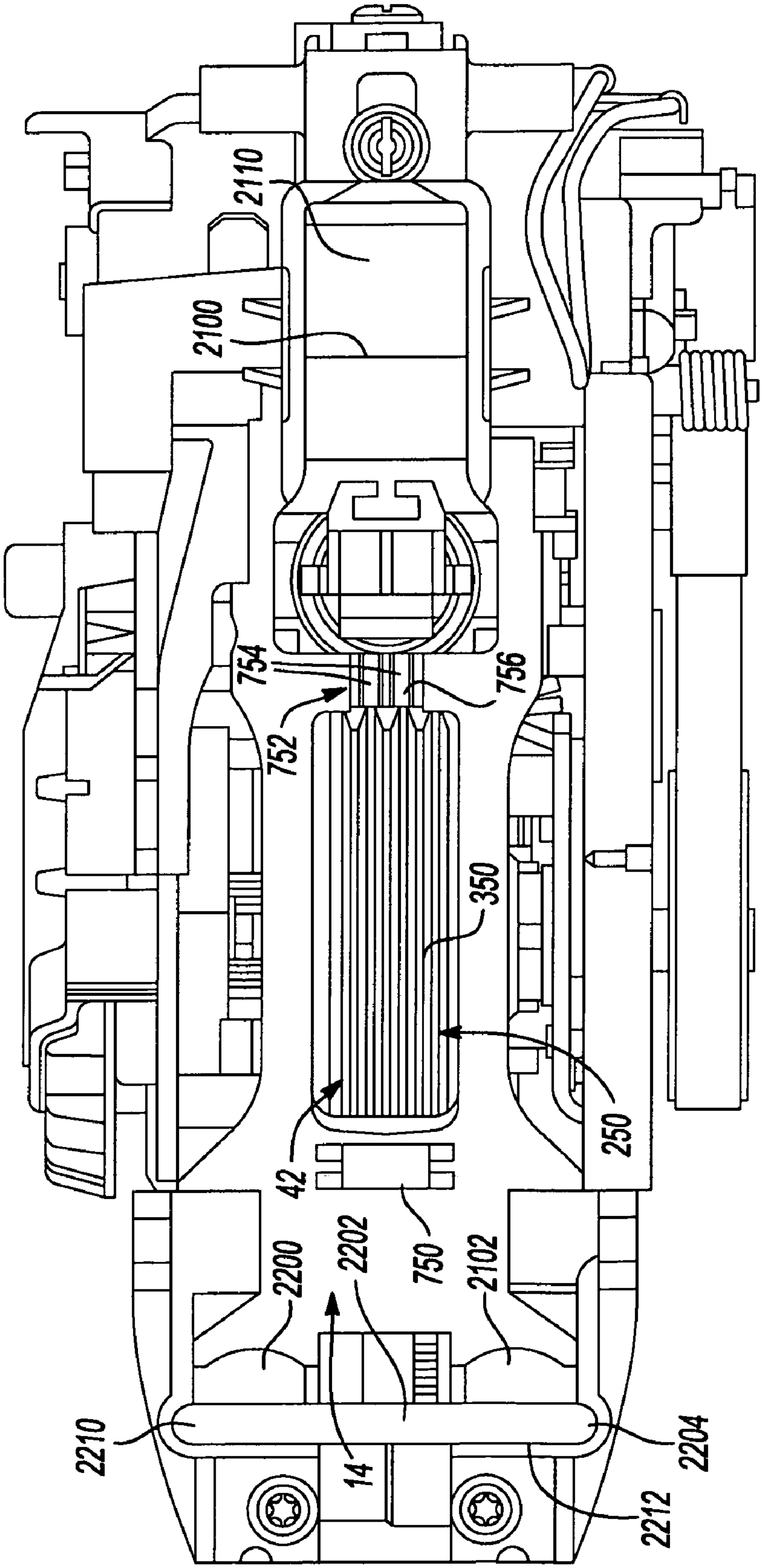
FIG. 30 is a front view of a portion of the fastening tool of FIG. 1 illustrating the backbone, the flywheel, the skid plate, the skid roller, the upper bumper and the lower bumper in greater detail.

With reference to FIG. 30, the backbone 14 may optionally carry a skid plate 750 and/or a skid roller 752. In the example provided, the skid plate 750 is coupled to the backbone 14 on a side of the flywheel assembly 250 opposite the skid roller 752. The skid plate 750 may be formed of a wear resistant material, such as carbide, and is configured to protect the backbone 14 against injurious contact with the body 510 (FIG. 23) of the driver 32 (FIG. 23) at a location between the flywheel 42 and the nosepiece assembly 22 (FIG. 1).

As the interface between the exterior surface 350 of the flywheel 42 and the driver profile 520 (FIG. 23) of the driver 32 (FIG. 23) are not directly in-line with the center of gravity of the driver, the driver may tend to porpoise or undulate as the flywheel 42 accelerates the driver. The skid roller 752 is configured to support the driver 32 (FIG. 23) in a location upwardly of the flywheel 42 so as to inhibit porpoising or undulation of the driver 32 (FIG. 23). The skid roller 752 may have any desired configuration that is compatible with the driver 32, but in the example provided, the skid roller 752 comprises two rollers 754, which are formed from carbide and which have sloped surfaces 756 that are configured to engage the V-shaped teeth 534 (FIG. 23) of the driver profile 520 (FIG. 23). In some situations, an upper skid plate (not shown) may be substituted for the skid roller 752. In the example provided, however, the rollers 754 of the skid roller 752 engage a relatively large surface area of the driver profile 520 (FIG. 23) with relatively lower friction than an upper skid plate.

Drive Motor Assembly: Follower Assembly

With reference to FIGS. 2 and 9, the follower assembly 34 may include the actuator 44, the ground plate 170, a clutch 800, and an activation arm assembly 804 with an activation arm 806 and a roller assembly 808.

Drive Motor Assembly: Follower Assembly: Actuator, Clutch & Cam

Figure 41:
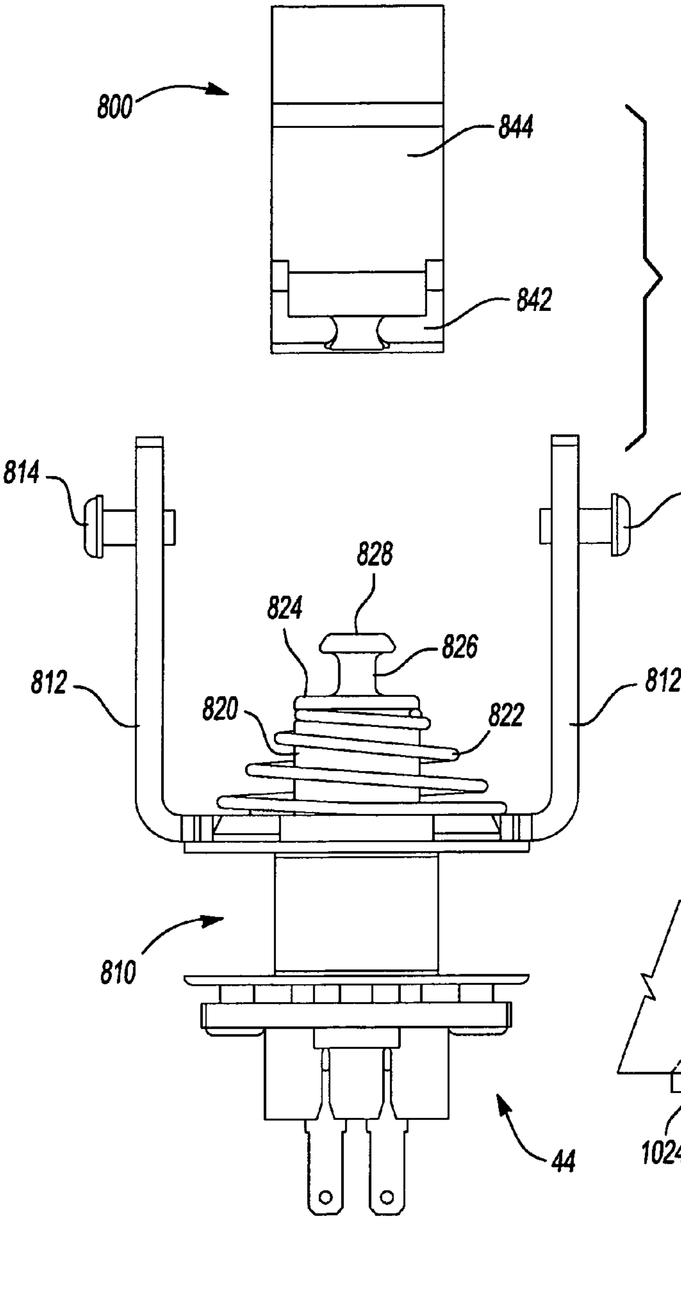
FIG. 41 is a side elevation view of a portion of the drive motor assembly illustrating the actuator and the cam in greater detail.

The actuator 44 may be any appropriate type of actuator and may be configured to selectively provide linear and/or rotary motion. In the example provided, the actuator 44 is a linear actuator and may be a solenoid 810 as shown in FIG. 41. With additional reference to FIG. 4, the solenoid 810 may be housed in the bore 150 of the actuator mount 62 in the backbone 14. The solenoid 810 may include a pair of arms 812 that are received into the channels 152 that are formed in the actuator mount 62. Threaded fasteners 814 may be received through the slotted apertures 816 (FIG. 3) in the actuator mount 62 and threadably engaged to the arms 812 to thereby fixedly but removably and adjustably couple the solenoid 810 to the backbone 14. The solenoid 810 may include a plunger 820 that is biased by a spring 822 into an extended position. The plunger 820 may have a shoulder 824, a neck 826 and a head 828.

In FIG. 4, the ground plate 170 may be disposed in the clutch mount 64 and fixedly coupled to the backbone 14 as described above. The ground plate 170 may include a set of ways 830, which may extend generally parallel to the axis 158 of the bore 150, and a plurality of inwardly tapered engagement surfaces 836 that may be disposed on the opposite sides of the ways 830 and which extend generally parallel to the ways 830.

The clutch 800 may be employed to cooperate with the activation arm 806 (FIG. 2) to convert the motion of the actuator 44 into another type of motion. With reference to FIGS. 9 and 36, the clutch 800 may include a way slot 840, a yoke 842, a cam surface 844 and a pair of engagement surfaces 846. The way slot 840 is configured to receive therein the ways 830 so that the ways 830 may guide the clutch 800 thereon for movement in a direction that is generally parallel to the axis 158 of the bore 150. The yoke 842 is configured to slide around the neck 826 of the plunger 820 between the shoulder 824 and the head 828.

Drive Motor Assembly: Follower Assembly: Activation Arm Assembly

Figure 31:
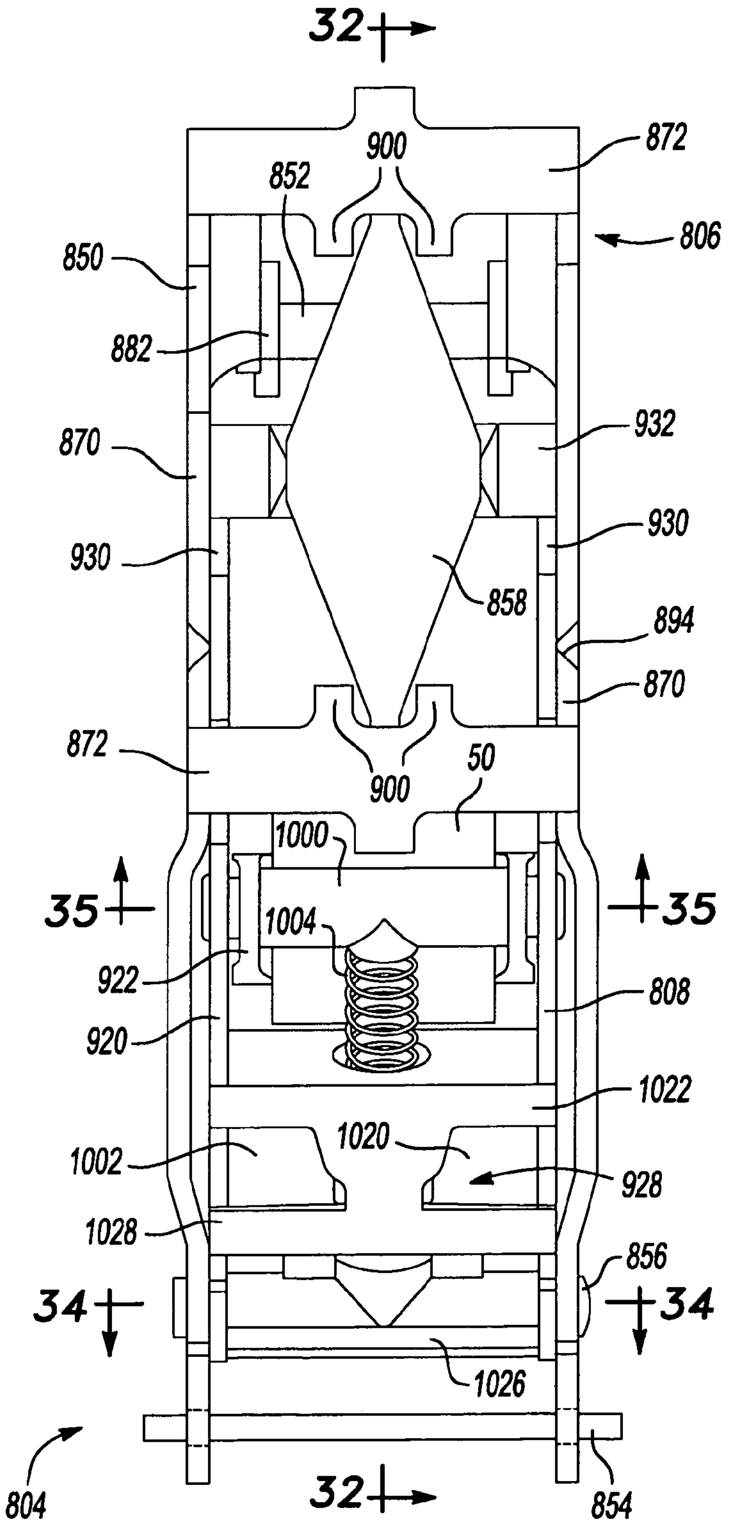
FIG. 31 is a front view of a portion of the drive motor assembly illustrating the follower assembly in greater detail.
Figure 32:
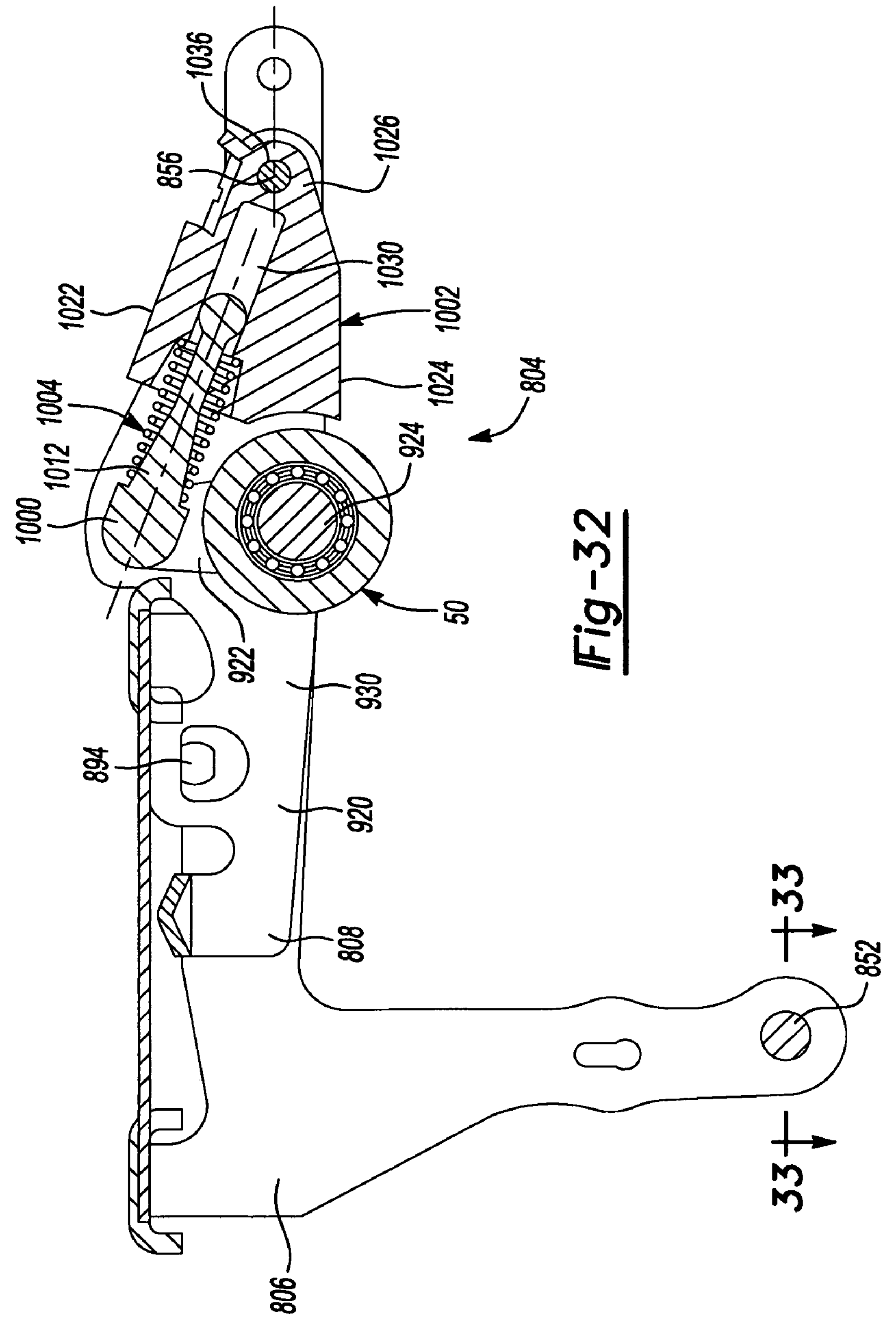
FIG. 32 is a sectional view taken along the line 32—32 of FIG. 31.
Figure 37:
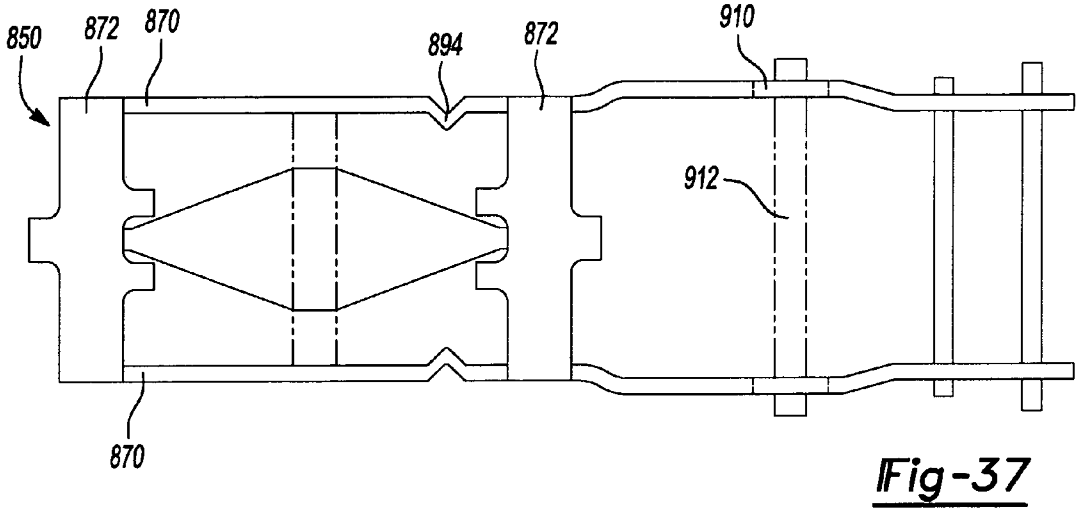
FIG. 37 is a front view of the activation arm.

With reference to FIGS. 31 and 32, the activation arm 806 may include an arm structure 850, a cam follower 852, an arm pivot pin 854, a follower pivot pin 856 and a spring 858. With reference to FIGS. 36 and 37, the arm structure 850 may include a pair of arm members 870 that are spaced apart by a pair of laterally extending central members 872 that is disposed between the arm members 870. Each arm member 870 may be generally L-shaped, having a base 880 and a leg 882 that may be disposed generally perpendicular to the base 880. Each base 880 may define a pivot aperture 890, which is configured to receive the arm pivot pin 854 therethrough, a coupling aperture 892, which is configured to receive the follower pivot pin 856 therethrough, a rotational stop 894, which limits an amount by which the roller assembly 808 may rotate relative to the activation arm 806 in a given rotational direction, while each leg 882 may define a follower aperture 898 that is configured to receive the cam follower 852 therein.

With reference to FIG. 31 and 33, the cam follower 852 may be a pin or roller that is rotatably supported by the legs 882. In the example provided, the cam follower 852 is a roller with ends that are disposed in the follower apertures 898 in a slip-fit manner. In FIGS. 2, 31 and 36, the arm pivot pin 854 may be disposed through the follower pivot 68 and the pivot apertures 890 in the bases 880 to pivotably couple the activation arm 806 to the backbone 14. In the example provided, the activation arm 806 is disposed between the arms 204 that form the follower pivot 68 and the arm pivot pin 854 is inserted through the bushings 206 and the pivot apertures 890.

The follower pivot pin 856 may extend through the coupling apertures 892 and pivotably couple the roller assembly 808 to the activation arm 806. The spring 858 may bias the roller assembly 808 in a predetermined rotational direction. In the example provided, the spring 858 includes a pair of leaf springs, whose ends are abutted against the laterally extending central members 872, which may include features, such as a pair of spaced apart legs 900, that are employed to maintain the leaf springs in a desired position. The leaf springs may be configured in any desired manner, but are approximately diamond-shaped in the example provided so that stress levels within the leaf springs are fairly uniform over their entire length.

The arm structure 850 may be a unitarily formed stamping which may be made in a progressive die, a multislide or a fourslide, for example, and may thereafter heat treated. As the sheet material from which the arm structure 850 may be formed may be relatively thin, residual stresses as well as the heat treating process may distort the configuration of the arm members 870, which would necessitate post-heat treatment secondary processes (e.g., straightening, grinding). To avoid such post-heat treatment secondary processes, one or more slots 910 may be formed in the arm members 870 as shown in FIG. 36 to receive a key 912 (which is shown in FIG. 38) therethrough prior to the heat treatment operation. One or more sets of grooves 916 may be formed in the key 912 so as to permit the key 912 to engage the arm members 870 as is schematically illustrated in FIG. 37. In the example provided, two sets of grooves 916 are employed wherein the grooves 916 are spaced apart on the key 912 by a distance that corresponds to a desired distance between the arm members 870. Rotation of the key 912 in the slots 910 after the grooves 916 have been aligned to the arm members 870 locks the key 912 between the arm members 870. The key 912 thus becomes a structural member that resists deformation of the arm members 870. Accordingly, one or more keys 912 may be installed to the arm members 870 prior to the heat treatment of the activation arm 806 to thereby inhibit deformation of the arm members 870 relative to one another prior to and during the heat treatment of the activation arm 806. Moreover, the keys 912 may be easily removed from the activation arm 806 after heat treatment by rotation of the key 912 in the slot 910 and re-used or discarded as appropriate. Advantageously, the key 912 or keys 912 may be formed by the same tooling that is employed to form the arm structure 850. More specifically, the key 912 or keys 912 may be formed in areas inside or around the blank from which the arm structure 850 is formed that would otherwise be designated as scrap.

Figure 39:
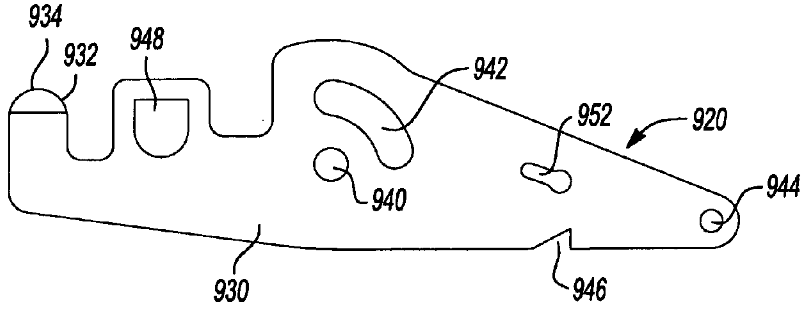
FIG. 39 is a right side view of a portion of the follower assembly illustrating the roller cage in greater detail.

With reference to FIGS. 31 and 35, the roller assembly 808 may include a roller cage 920, a pair of eccentrics 922, an axle 924, a follower 50, and a biasing mechanism 928 for biasing the eccentrics 922 in a predetermined direction. With reference to FIGS. 31 and 39, the roller cage 920 may include a pair of auxiliary arms 930 and a reaction arm 932 that is disposed between the auxiliary arms 930 and which may be configured with an cylindrically-shaped contact surface 934 that is employed to contact the spring 858. Each auxiliary arm 930 may include an axle aperture 940, a range limit slot 942, which is concentric with the axle aperture 940, a pin aperture 944, an assembly notch 946, and a stop aperture 948, which is configured to receive the rotational stops 894 that are formed on the arm members 870. Like the arm structure 850, the roller cage may be unitarily formed stamping which may be made in a progressive die, a multislide or a fourslide, for example, and may thereafter heat treated. Accordingly, one or more slots 952, which are similar to the slots 910 (FIG. 36) that are formed in the arm structure 850, and keys, which that are similar to the keys 912 (FIG. 38) that are described above, may be employed to prevent or resist warping, bending or other deformation of the auxiliary arms 930 relative to one another prior to and during heat treatment of the roller cage 920.

Figure 40:
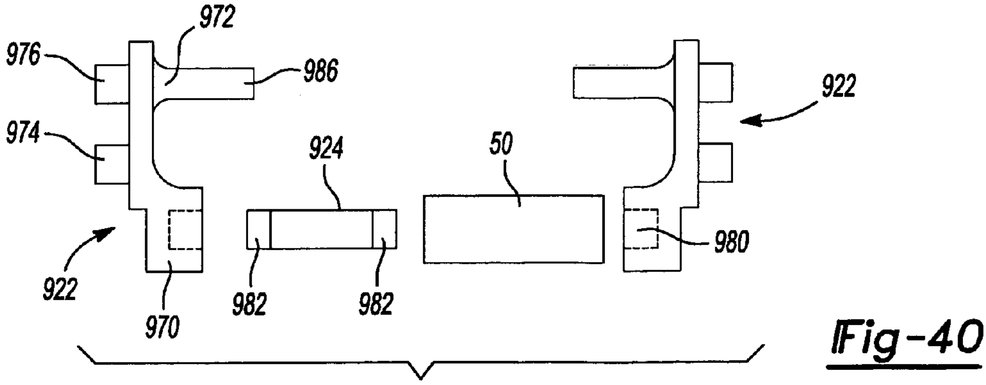
FIG. 40 is an exploded view of a portion of the roller assembly.

With reference to FIGS. 32, 35 and 40, each of the eccentrics 922 may be a plate-like structure that includes first and second bosses 970 and 972, which extend from a first side, and an axle stub 974 and a stop member 976 that are disposed on a side opposite the first and second bosses 970 and 972. The axle stub 974 is configured to extend through the axle aperture 940 (FIG. 39) in a corresponding one of the auxiliary arms 930 and the stop member 976 is configured to extend into the range limit slot 942 to limit an amount by which the eccentric 922 may be rotated about the axle stub 974.

An axle aperture 980 may be formed into the first boss 970 and configured to receive the axle 924 therein. In some situations, it may not be desirable to permit the axle 924 to rotate within the axle aperture 980. In the example provided, a pair of flats 982 are formed on the axle 924, which gives the ends of the axle 924 a cross-section that is somewhat D-shaped. The axle aperture 980 in this example is formed with a corresponding shape (i.e., the axle aperture 980 is also D-shaped), which permits the axle 924 to be slidingly inserted into the axle aperture 980 but which inhibits rotation of the axle 924 within the axle aperture 980. The second boss 972 may be spaced apart from the first boss 970 and may include a pin portion 986. Alternatively, the pin portion 986 may be a discrete member that is fixedly coupled (e.g., press fit) to the eccentric 922. The follower 50, which is a roller in the example provided, is rotatably disposed on the axle 924. In the particular example provided, bearings, such as roller bearings, may be employed to rotatably support the follower 50 on the axle 924.

With reference to FIG. 31, 32 and 35, the biasing mechanism 928 may include a yoke 1000, a spacer 1002 and a spring 1004. The yoke 1000 may include a generally hollow cross-bar portion 1010 and a transverse member 1012 upon which the spring 1004 is mounted. The cross-bar portion 1010 may have an aperture 1016 formed therein for receiving the pin portions 986 of the second boss 972 of each eccentric 922.

Figure 42:
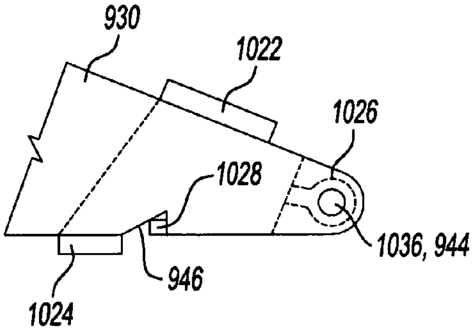
FIG. 42 is a right side view of a portion of the roller assembly.

With additional reference to FIG. 42, the spacer 1002 may include a body 1020 having a pair of flange members 1022 and 1024, a coupling yoke 1026, a cantilevered engagement member 1028. A counterbore 1030 may be formed into the body 1020 for receiving the spring and the transverse member 1012 of the yoke 1000. The flange members 1022 and 1024 extend outwardly from the opposite lateral sides of the body 1020 over the auxiliary arms 930 that abut the body 1020. Accordingly, the flange members 1022 and 1024 cooperate to guide the spacer 1002 on the opposite surfaces of the auxiliary arms 930 when the spacer 1002 is installed to the auxiliary arms 930, as well as inhibit rotation of the spacer 1002 relative to the roller cage 920 about the follower pivot pin 856. The engagement member 1028 may be engaged to the assembly notches 946 (FIG. 39) that are formed in the auxiliary arms 930. The coupling yoke 1026 includes an aperture 1036 formed therethrough which is configured to receive the follower pivot pin 856 to thereby pivotably couple the roller assembly 808 to the activation arm 806 as well as inhibit translation of the spacer 1002 relative to the roller cage 920. With the spacer 1002 in a fixed position relative to the roller cage 920, the spring 1004 exterts a force to the yoke 1000 that is transmitted to the eccentrics 922 via the pin portions 986, causing the eccentrics 922 to rotate in a rotational direction toward such that the stop members 976 are disposed at the upper end of the range limit slots 942. Engagement of the cantilevered engagement member 1028 to the assembly notches 946 (FIG. 39) inhibits the spacer 1002 from moving outwardly from the auxiliary arms 930 during the assembly of the roller assembly 808 in response to the force that is applied by the spring 1004, as well as aligns the aperture 1036 in the coupling yoke 1026 to the pin aperture 944 (FIG. 39) in the auxiliary arms 930.

In view of the above discussion and with reference to FIGS. 31 through 40, those of ordinary skill in the art will appreciate from this disclosure that the roller assembly 808 may be assembled as follows: a) the follower 50 is installed over the axle 924; b) a first one of the eccentrics 922 is installed to the axle 924 such that the axle 924 is disposed in the axle aperture 980; c) the yoke 1000 is installed to the pin portion 986 of the first one of the eccentrics 922; d) the other one of the eccentrics 922 is installed to the axle 924 and the yoke 1000; e) the subassembly (i.e., eccentrics 922, axle 924, follower 50 and yoke 1000) is installed to the roller cage 920 such that the axle stubs 974 are located in the axle apertures 940 and the stop members 976 are disposed in the range limit slots 942; f) the spring 1004 may be fitted over the transverse member 1012; g) the spacer 1002 may be aligned between the auxiliary arms 930 such that the flange members 1022 and 1024 extend over the opposite sides of the auxiliary arms 930 and the transverse member 1012 and spring 1004 are introduced into the counterbore 1030; h) the spacer 1002 may be urged between the auxiliary arms 930 such that the flange members 1022 and 1024 cooperate with the opposite sides of the auxiliary arms to guide the spacer 1002 as the spring 1004 is compressed; i) sliding movement of the spacer 1002 may be stopped when the cantilevered engagement member 1028 engages the assembly notches that are formed in the auxiliary arms 930; j) the roller assembly 808 may be positioned between the arm members 870 of the arm structure 850 and pivotably coupled thereto via the follower pivot pin 856, which extends through the coupling apertures 892, the pin apertures 944 and the aperture 1036 in the coupling yoke 1026; k) optionally, one or both of the ends of the follower pivot pin 856 may be deformed (e.g., peened over) to inhibit the follower pivot pin 856 from being withdrawn; l) the spring 858 may be installed to the arm structure 850; and m) the roller assembly 808 may be rotated about the follower pivot pin 856 to position the rotational stops 894 on the arm members 870 within the stop apertures 948 that are formed on the auxiliary arms 930 and thereby pre-stress the spring 858. In this latter step, the reaction arm 932 of the roller cage 920 engages and loads the leaf springs so as to bias the roller assembly 808 outwardly from the activation arm 806.

Drive Motor Assembly: Return Mechanism

Figure 44:
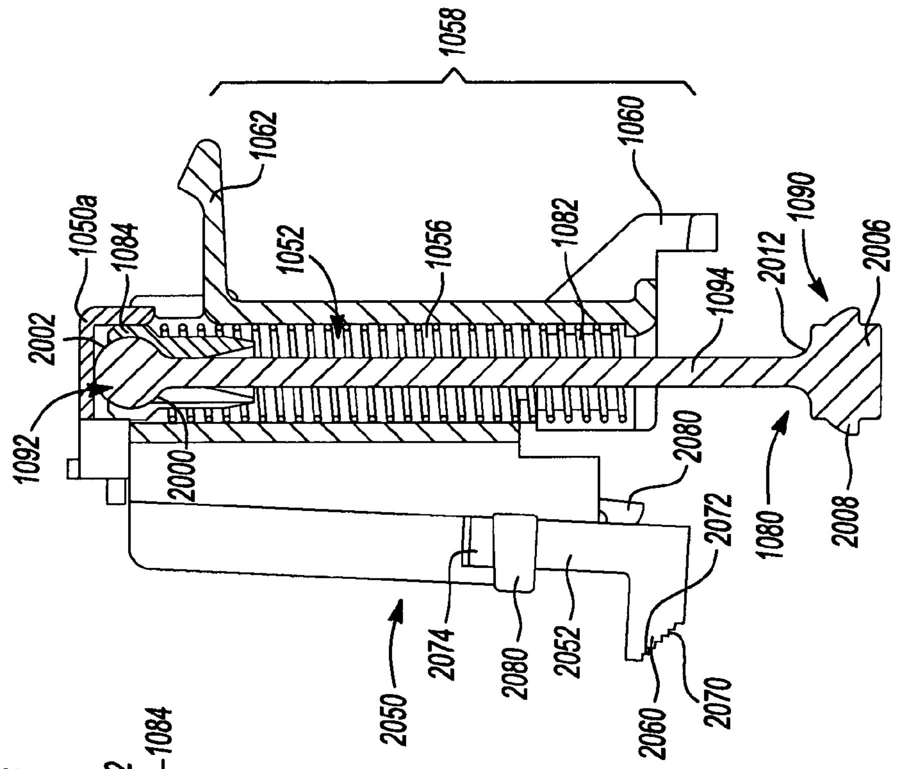
FIG. 44 is a sectional view taken along the line 44—44 of FIG. 43.
Figure 43:
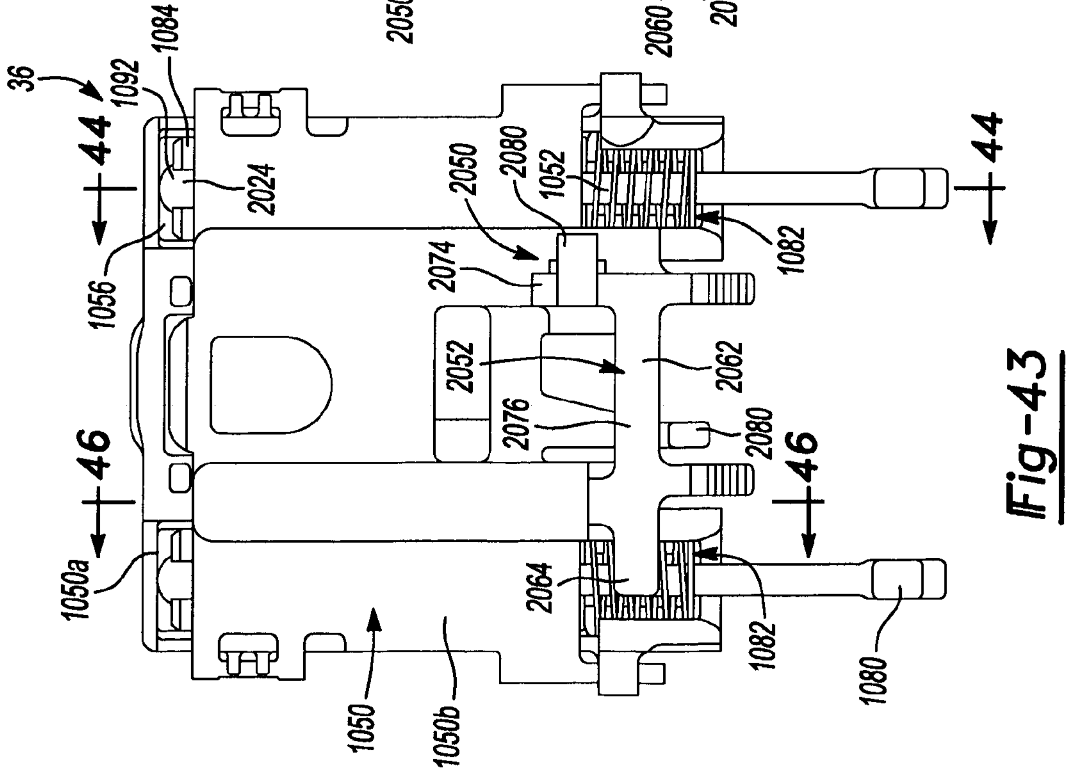
FIG. 43 is a front view of a portion of the drive motor assembly illustrating the return mechanism in greater detail.

With reference to FIGS. 2, 43 and 44, the return mechanism 36 may include a housing 1050 and one or more return cords 1052. The housing 1050 may include a pair of housing shells **1050*a* and 1050*b* that cooperate to define a pair of spring cavities 1056 that are generally parallel one another. The housing shell 1050*a* may include a set of attachment features 1058 that permit the housing shell 1050*a* to be fixedly coupled to the backbone 14. In the example provided, the set of attachment features 1058 include a pair of legs 1060 and a pair of bayonets 1062. The legs 1060 are coupled to a first end of the housing shell 1050*a* and extend outwardly therefrom in a direction that is generally parallel to the spring cavities 1056. The bayonets 1062 are coupled to an end of the housing shell 1050*a* opposite the legs 1060 and extend therefrom in a direction that is generally perpendicular to the legs 1060**.

With additional reference to FIG. 10, the legs 1060 and bayonets 1062 are configured to be received under laterally extending tabs 1066 and 1068, respectively, that are formed on the backbone 14. More specifically, the legs 1060 may be installed to the backbone 14 under the laterally extending tabs 1066 and thereafter the housing 1050 may be rotated to urge the bayonets 1062 into engagement with the laterally extending tabs 1068. Those of ordinary skill in the art will appreciate from this disclosure that as the laterally extending tabs 1068 may include an arcuately shaped surface 1070, which may cooperate with the bayonets 1062 to cause the bayonets 1062 to resiliently deflect toward the legs 1060 as the housing 1050 is being rotated toward the backbone 14.

Returning to FIGS. 43 and 44, each return cord 1052 may include a cord portion 1080, a spring 1082 and a keeper 1084. The cord portion 1080 may be a resilient cord that may be formed of a suitable rubber or thermoplastic elastomer and may include a first retaining member 1090, which may be configured to releasably engage the return anchors 630, a second retaining member 1092, which may be configured to be engaged by the keeper 1084, and a cord member 1094 that is disposed between the first and second retaining members 1090 and 1092. The second retaining member 1092 may include a conical face 2000 and a spherical end 2002.

Figure 27:
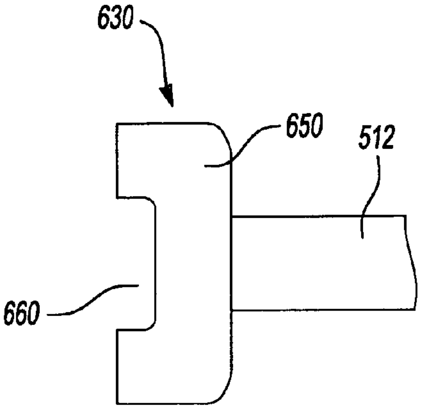
FIG. 27 is a top view of a portion of the driver of FIG. 23.

The first retaining member 1090 may include a body 2006 and a pair of tab members 2008 that extend from the opposite sides of the body 2006. The first retaining member 1090 may be configured to couple the cord portion 1080 to the driver 32 (FIG. 23). In the particular example provided, the body 2006 may be received into the anchor cavity 662 (FIG. 25) such that the tab members 2008 extend into the anchor recesses 664 (FIG. 23) and the cord member 1094 extends outwardly of the cord opening 660 (FIG. 27) in the top flange 650 (FIG. 27). In the example provided, the arcuate portion of the rear wall 652 (FIG. 25) is configured to guide the first retaining member 1090 into the anchor cavity 662 (FIG. 25) and the tab members 2008 extend through the side walls 654 (FIG. 23) when the first retaining member 1090 is engaged to the return anchor 630 (FIG. 23).

The cord member 1094 may have a substantially uniform cross-sectional area over its entire length. In the example provided, the cord member 1094 tapers outwardly (i.e., is bigger in diameter) at its opposite ends where it is coupled to the first and second retaining members 1090 and 1092. Fillet radii 2012 are also employed at the locations at which the cord member 1094 is coupled to the first and second retaining members 1090 and 1092.

Figure 45:
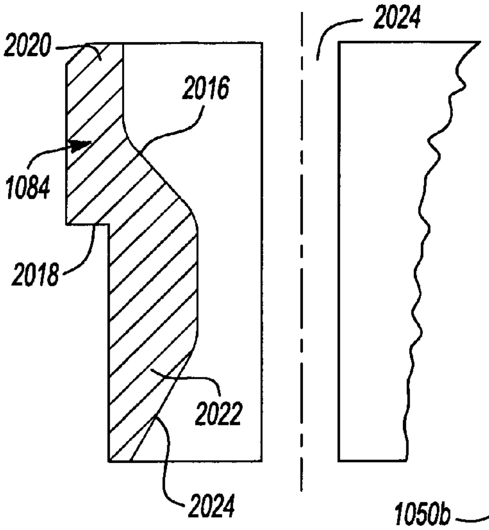
FIG. 45 is a partial longitudinal section view of a portion of the return mechanism illustrating the keeper in greater detail.
Figure 46:
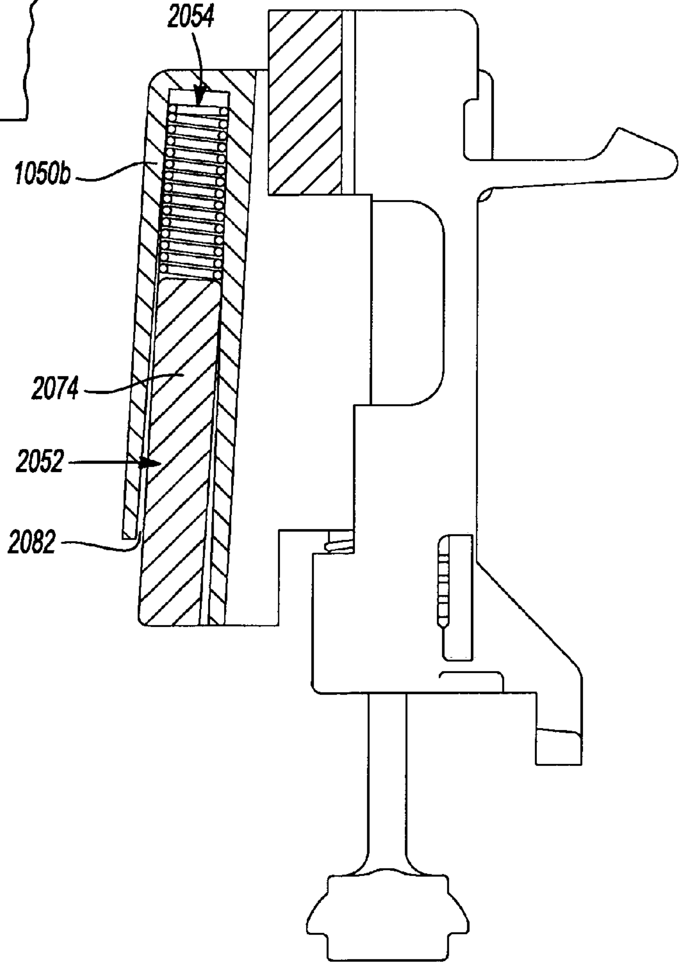
FIG. 46 is a sectional view taken along the line 46—46 of FIG. 43.

The spring 1082 may be a conventional compression spring and may include a plurality of dead coils (not specifically shown) on each of its ends. With additional reference to FIG. 45, the keeper 1084 is employed to transmit loads between the cord member 1094 and the spring 1082 and as such, may include first and second contact surfaces 2016 and 2018, respectively, for engaging the second retaining member 1092 and the spring 1082, respectively. In the particular example provided, the keeper 1084 is a sleeve having a first portion 2020, a smaller diameter second portion 2022 and a longitudinally extending slot 2024 into which the cord member 1094 may be received. The first contact surface 2016 may be formed onto the first portion 2020 and may have a conically-shaped surface that is configured to matingly engage the conical face 2000 of the second retaining member 1092. The second portion 2022 may be formed such that its interior surface 2024 tapers outwardly toward it lower end. A shoulder that is formed at the intersection of the first portion 2020 and the second portion 2022 may define the second contact surface 2018, which is abutted against an end of the spring 1082.

With the spring 1082 disposed over the cord member 1094 and the keeper 1084 positioned between the spring 1082 and the second retaining member 1092, the return cord 1052 is installed to the spring cavity 1056 in the housing 1050. More specifically, the lower end of the spring 1082 is abutted against the housing 1050, while the spherical end 2002 of the second retaining member 1092 abuts an opposite end of the housing 1050. Configuration of the second retaining member 1092 in this manner (i.e., in abutment with the housing 1050) permits the second retaining member 1092 to provide shock resistance so that shock loads that are transmitted to the keeper 1084 and the spring 1082 may be minimized or eliminated. The two-component configuration of the return cord 1052 is highly advantageous in that the strengths of each component offset the weakness of the other. For example, the deceleration that is associated with the downstroke of the driver 32 (i.e., from abut 65 f.p.s. to about 0 f.p.s. in the example provided) can be detrimental to the fatigue life of a coil spring, whereas the relatively long overall length of travel of the driver could be detrimental to the life of a rubber or rubber-like cord. Incorporation of a coil spring 1082 into the return cord 1052 prevents the cord member 1094 from overstretching, whereas the cord member 1094 prevents the coil spring 1082 from being overshocked. Moreover, the return mechanism 36 is relatively small and may be readily packaged into the fastening tool 10.

Drive Motor Assembly: Anti-Hammer Mechanism

Figure 47:
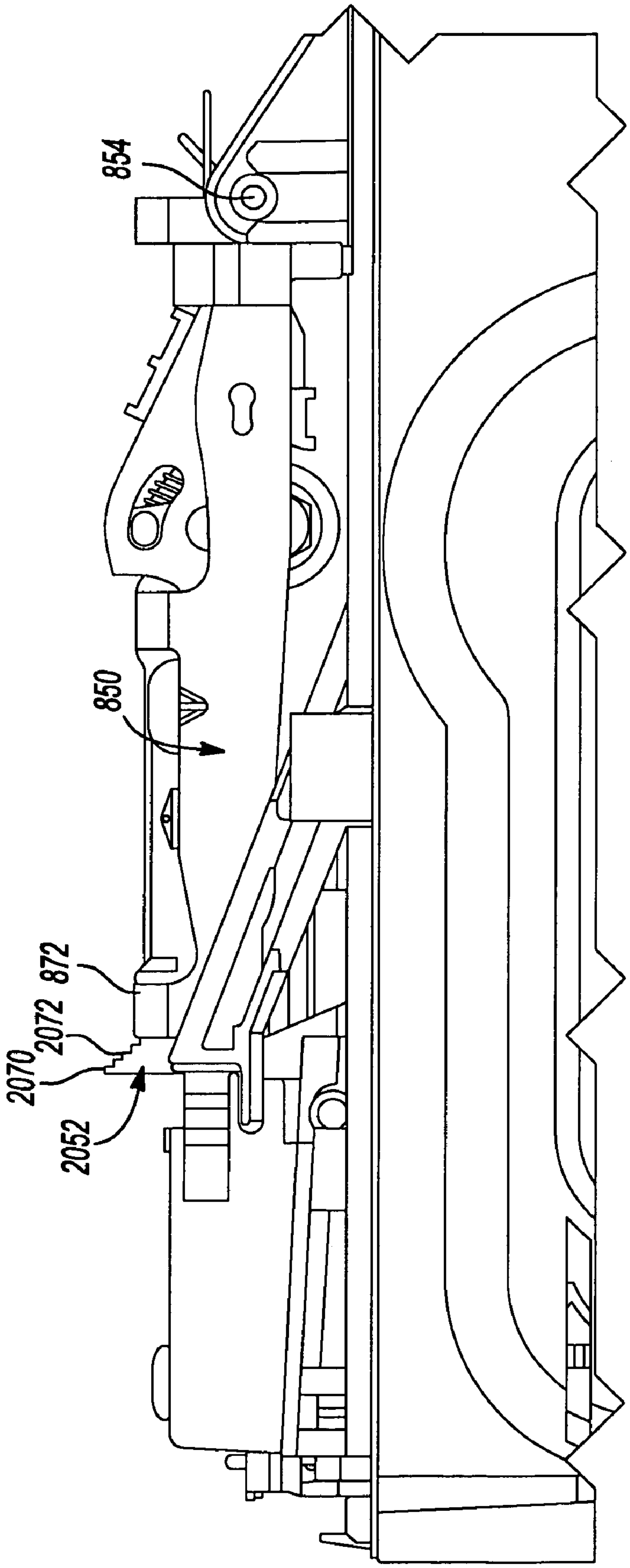
FIG. 47 is a right side view of a portion of the fastening tool of FIG. 1.

Optionally, the fastening tool 10 may further include an stop mechanism 2050 to inhibit the activation arm 806 from engaging the driver 32 to the flywheel 42 as shown in FIG. 2. With reference to FIGS. 10, 43, 44 and 46, the stop mechanism 2050 may include a rack 2052, a spring 2054 and an actuating arm 2056. The rack 2052 may be mounted to the housing shell 1050*b* for translation thereon in a generally vertical direction that may be parallel to the axis 118. The rack 2052 may include one or more rack engagements 2060, a generally H-shaped body 2062 and an arm 2064. The rack engagements 2060 may be coupled to the body 2062 and may have a sloped engagement surface 2070 with teeth 2072 formed thereon. The body 2062 may define one or more guides 2074 and a crossbar 2076, which may be disposed between the guides 2074. The guides 2074 may be received into corresponding structures, such as a guide tab 2080 and a spring cavity 2082, that are formed on the housing shell 1050*b*. The structures on the housing shell 1050*b* and the guides 2074 cooperate so that the rack 2052 may be translated in a predetermined direction between an extended position and a retracted position. Placement of the rack 2052 in the extended position permits the teeth 2072 of the sloped engagement surface 2070 to engage an upper one of the laterally extending central members 872 (FIG. 47) of the arm structure 850 (FIG. 47), while placement of the rack 2052 in the retracted position locates the teeth 2072 of the sloped engagement surface 2070 in a position that does not inhibit movement of the arm structure 850 (FIG. 47) about the pivot arm pin 854.

The spring 2054 may be a conventional compression spring that may be received into a spring cavity 2082 that is formed into the housing shell 1050*b*. In the example provided, the spring 2054 is disposed between the housing shell 1050*b* and one of the guides 2074 and biases the rack 2052 toward the extended position.

A feature, such as a bayonet 2080, may be incorporated into the housing shell 1050*b* to engage the rack 2052 when the rack 2052 is in the extended position so as to inhibit the rack 2052 from disengaging the housing shell 1050*b*. In the example provided, the bayonet 2080 engages the lower end of the crossbar 2076 when the rack 2052 is in the extended position.

The actuating arm 2056 is configured to engage the arm 2064 on the rack 2052 and selectively urge the rack 2052 into the disengaged position. In the example provided, the actuating arm 2056 is mechanically coupled to the mechanical linkage of a contact trip mechanism 2090 (FIG. 1) that is associated with the nosepiece assembly 22 (FIG. 1). A detailed discussion of the contact trip mechanism 2090 is beyond the scope of this disclosure and moreover is not necessary as such mechanisms are well known in the art. In a discussion that is both brief and "general" in nature, contact trip mechanisms are typically employed to identify those situations where the nosepiece of a tool has been brought into a desired proximity with a workpiece. Contact trip mechanisms typically employ a mechanical linkage that interacts with (e.g., pushes, rotates) a trigger, or a valve or, in the example provided, an electrical switch, to permit the fastening tool to be operated.

In the example provided, the actuating arm 2056 is coupled to the mechanical linkage and as the contact trip mechanism 2090 (FIG. 1) biases the mechanical linkage downwardly (so that the contact trip is position in an extended position), the actuating arm 2056 is likewise positioned in a downward position that permits the rack 2052 to be moved into the extended position. Placement of the contact trip mechanism 2090 (FIG. 1) against a workpiece pushes the mechanical linkage upwardly by a sufficient distance, which closes an air gap between the actuating arm 2056 and the arm 2064, to thereby cause the actuating arm 2056 to urge the rack 2052 upwardly into the disengaged position.

Drive Motor Assembly: Upper & Lower Bumpers

Figure 48:
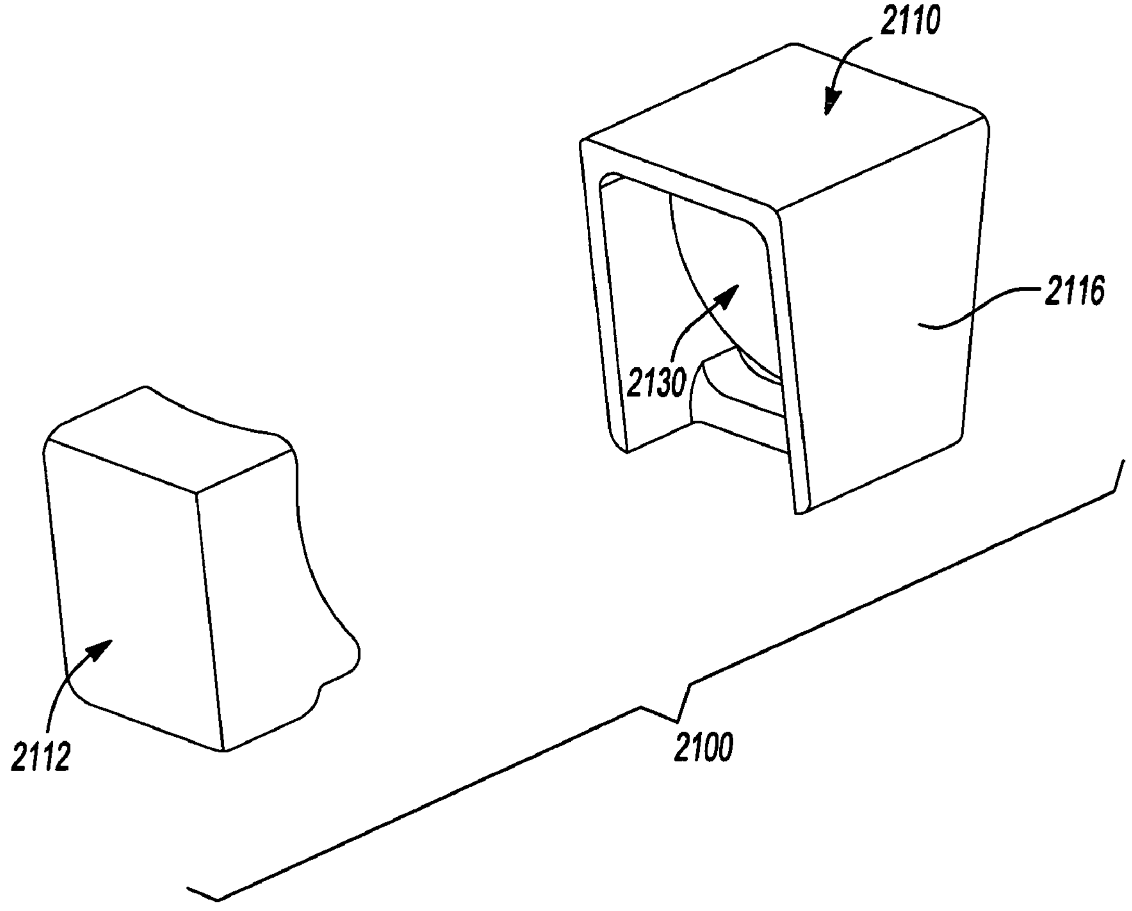
FIG. 48 is an exploded perspective view of the upper bumper.

With reference to FIG. 30, the backbone 14 may carry an upper bumper 2100 and a lower bumper 2102. With additional reference to FIG. 48, the upper bumper 2100 may be coupled to the backbone 14 in any desired manner and may include a beatpiece 2110 and a damper 2112. Formation of the upper bumper 2100 from two pieces permits the materials to be tailored to specific tasks. For example, the beatpiece 2110 may be formed from a relatively tough material, such as glass-filled nylon, while the damper 2112 may be formed from a material that is relatively more resilient than that of the beatpiece 2110, such as chlorobutyl rubber. Accordingly, those of ordinary skill in the art will appreciate from this disclosure that the combination of the beatpiece 2110 and the damper 2112 permit the upper bumper 2100 to be formed with highly effective impact absorbing characteristics and a highly impact resistant interface where the driver 32 (FIG. 49) contacts the upper bumper 2100.

Figure 49:
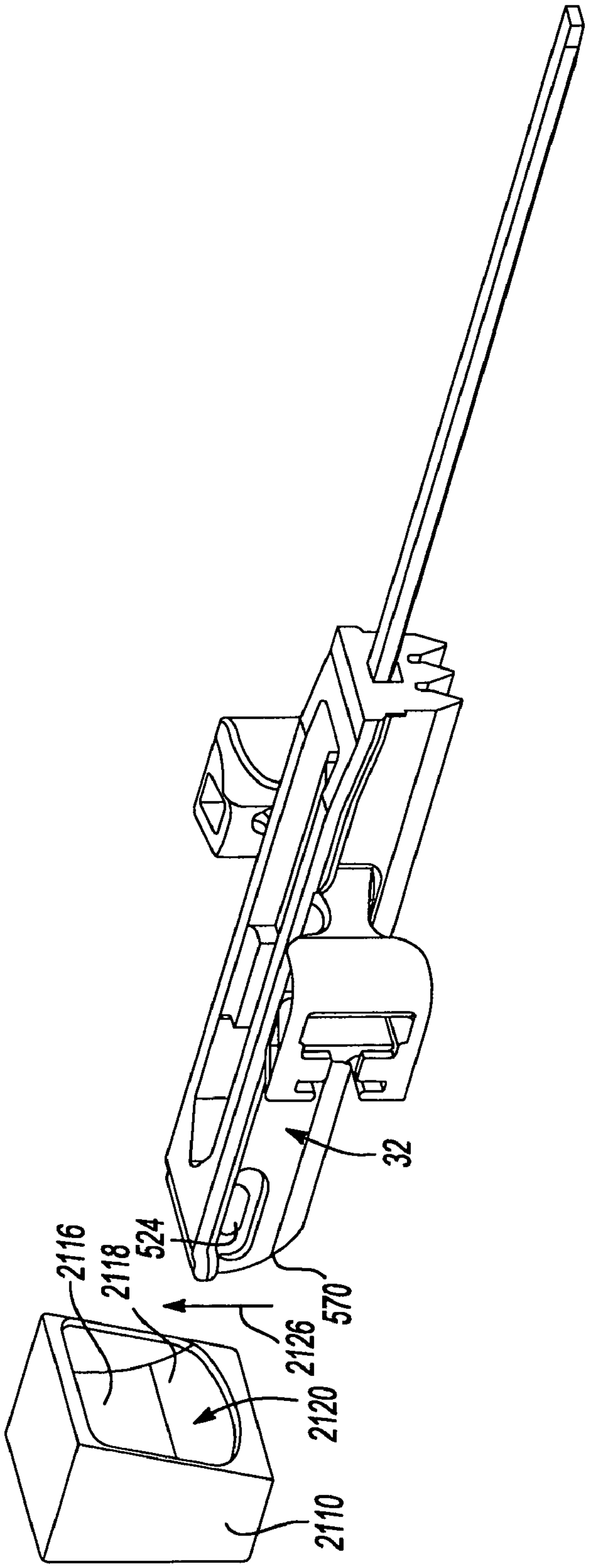
FIG. 49 is a perspective view of the driver and the beatpiece.
Figure 50:
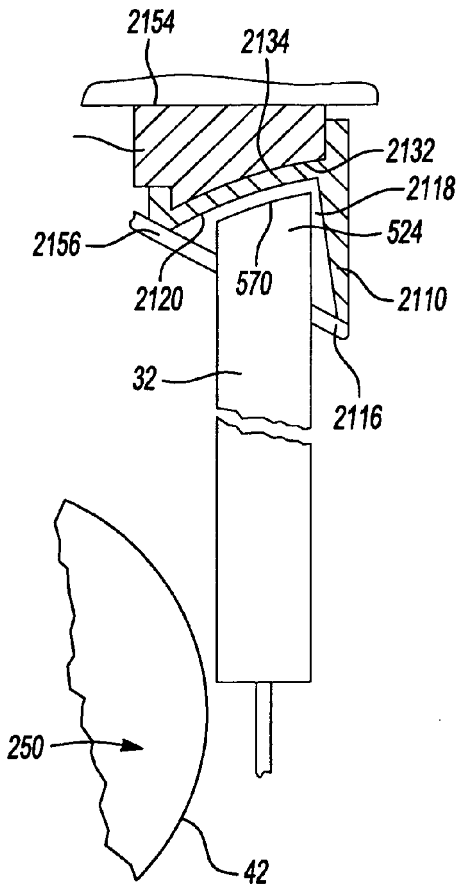
FIG. 50 is a longitudinal section view of a portion of the fastening tool of FIG. 1 illustrating the upper bumper, the driver and portions of the backbone and the flywheel.

With additional reference to FIGS. 49 and 50, the beatpiece 2110 may be trapezoidal in shape, having a sloped lower surface 2116, and may include a cavity 2118 having a ramp 2120 that conforms to the arcuate end surface 570 of the abutment 524 that is formed on the upper end of the driver 32. The arcuate end surface 570 of the abutment 524 and the ramp 2120 of the beatpiece 2110 may be shaped so that contact between the arcuate end surface 570 and the ramp 2120 urges the driver 32 horizontally outward away from the flywheel assembly 250 to thereby ensure that the driver 32 does not contact the flywheel assembly 250 when the driver 32 is being returned or when the driver 32 is at rest. The arcuate end surface 570 and the ramp 2120 may also be shaped so that contact between the arcuate end surface 570 and the ramp 2120 causes the driver to deflect laterally, rather than vertically or toward the fasteners F, so that side-to-side movement (i.e., in the direction of arrow 2126) of the driver 32 within the cavity 2118 is initiated when the driver 32 impacts the upper bumper 2100 and the driver 32 is less apt to travel vertically downwardly toward the flywheel 42.

The damper 2112 may be configured to be fully or partially received into the beatpiece 2110 to render the upper bumper 2100 relatively easier to install to the backbone 14. In the particular example provided, the beatpiece 2110 includes an upper cavity 2130 having an arcuate upper surface 2132 that is generally parallel to the ramp 2120, while the damper 2112 includes a lower surface 2134 that conforms to the arcuate upper surface 2132 when the damper 2112 is installed to the beatpiece 2110.

Figure 51:
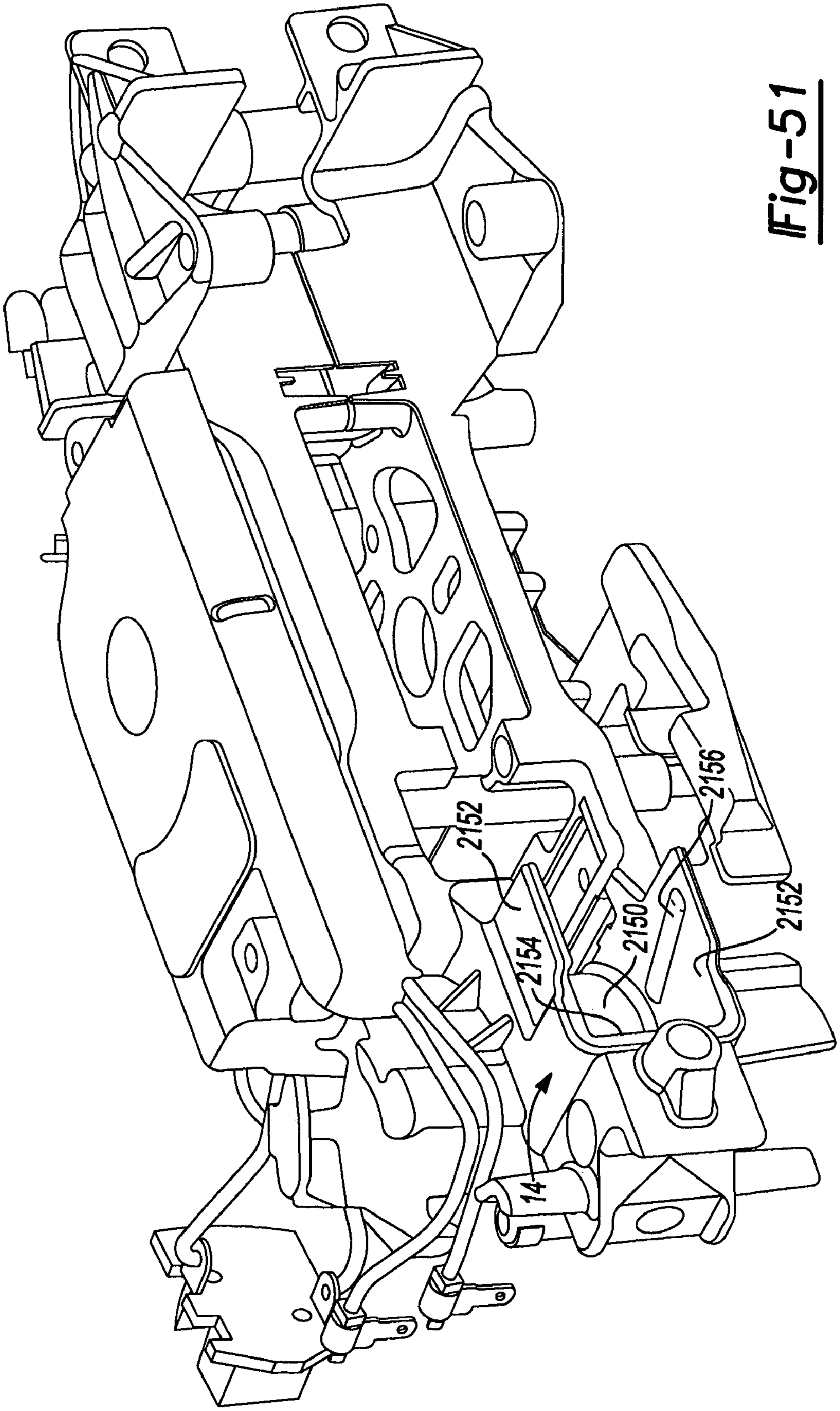
FIG. 51 is a perspective view of the backbone illustrating the cavity into which the upper bumper is disposed.
Figure 54:
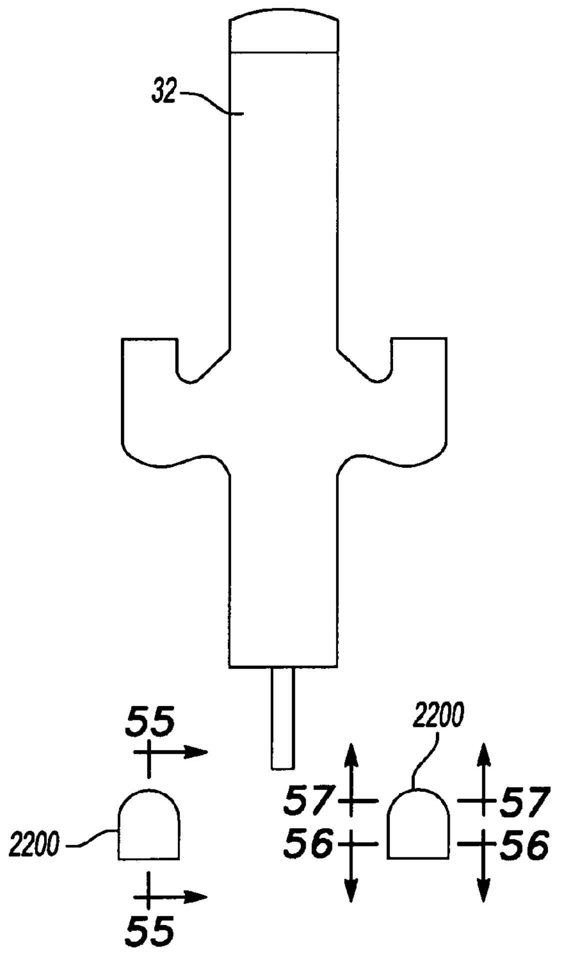
FIG. 54 is a view similar to FIG. 52 but illustrating an alternately constructed lower bumper.
Figure 55:
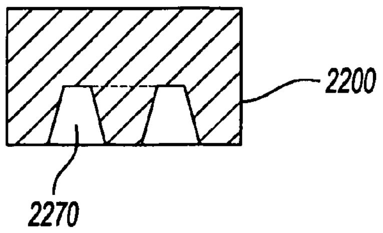
FIG. 55 is a sectional view taken along the line 55—55 of FIG. 54.
Figure 56:
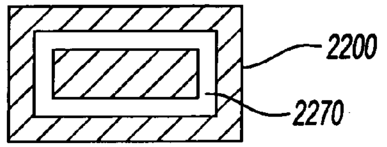
FIG. 56 is a sectional view taken along the line 56—56 of FIG. 54.
Figure 57:
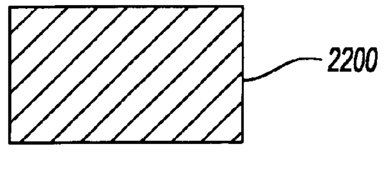
FIG. 57 is a sectional view taken along the line 57—57 of FIG. 54.
Figure 65:
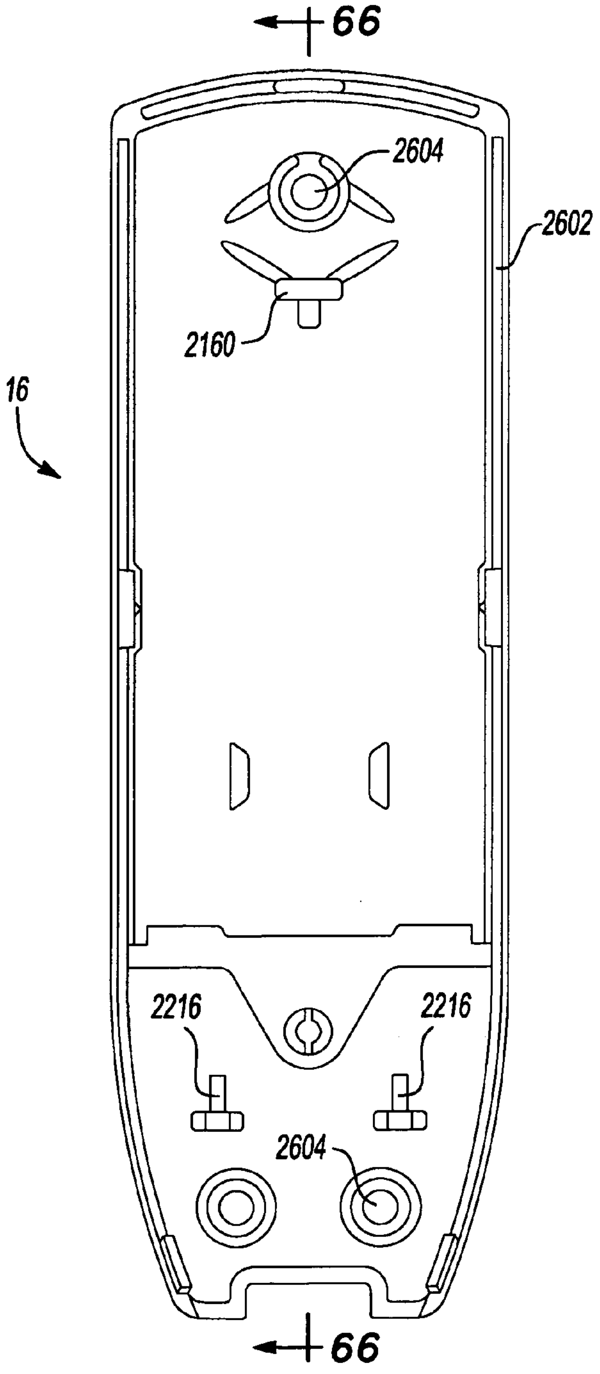
FIG. 65 is a view of the cavity side of the backbone cover.

With reference to FIGS. 50 and 51, the upper bumper 2100 may be inserted into an upper bumper pocket 2150 that is formed in the backbone 14. The upper bumper pocket 2150 may include a pair of side walls 2152, an upper wall 2154 and a pair of lower ribs 2156, each of which being formed on an associated one of the side walls 2152. The side walls 2152 may be generally orthogonally to the upper wall 2154 and the ribs 2156 may be angled to match the sloped lower surface 2116 of the beatpiece 2110. As the material from which the damper 2112 is formed may have a relatively high coefficient of friction, the angled ribs 2156 facilitate installation of the upper bumper 2100 to the backbone 14, since the narrow end of the upper bumper 2100 is readily received into the upper bumper pocket 2150 and the angled ribs 2156 permit the upper bumper 2100 to be slid both into the upper bumper pocket 2150 and upwardly against the upper wall 2154. A feature 2160 (FIG. 65) that is formed onto the backbone cover 16 (FIG. 65) may contact or otherwise restrain the upper bumper 2100 so as to maintain the upper bumper 2100 within the upper bumper pocket 2150.

Figure 52:
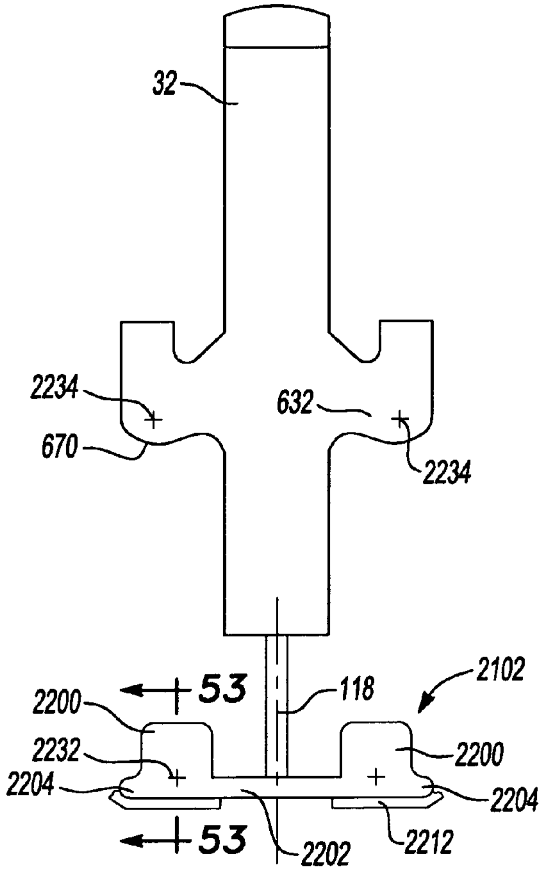
FIG. 52 is a front view of a portion of the fastening tool of FIG. 1 illustrating the driver in conjunction with the lower bumper and the backbone.
Figure 66:
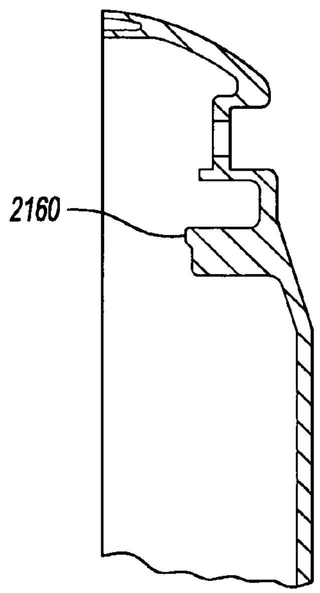
FIG. 66 is a partial section view taken along the line 66—66 of FIG. 65.

In FIGS. 30 and 52, the lower bumper 2102 may be coupled to the backbone 14 in any desired manner and may be configured to contact a portion of the driver 32, such as the contact surfaces 670 of the bumper tabs 632, to prevent the driver 32 from directly contacting the backbone 14 at the end of the stroke of the driver 32. The lower bumper 2102 may be configured of any suitable material and may have any desired configuration, but in the example provide a pair of lower bumper members 2200 that are disposed in-line with a respective one of the bumper tabs 632 on the driver 32. In the particular example provided, the bumper members 2200 are interconnected by a pair of ribs 2202 and include locking tabs 2204 that extend from a side opposite the other bumper member 2200. The lower bumper 2102 may be configured to be slidably engaged to the backbone 14 such that the locking tabs 2204 and one of the ribs 2202 are disposed in a mating recess 2210 that is formed in the backbone 14 and the bumper members 2102 abut a flange 2212 that extends generally perpendicular to the axis 118. With brief additional reference to FIGS. 65 and 66, the backbone cover 16 may be configured with one or more mating tabs 2216 that cooperate with the backbone 14 to capture the other rib 2202 to thereby immobilize the lower bumper 2102.

Figure 53:
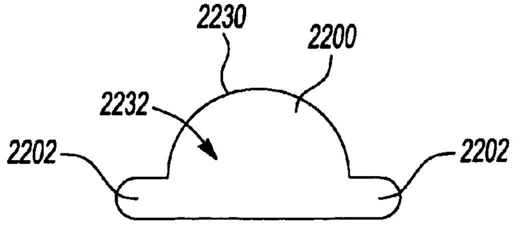
FIG. 53 is a sectional view taken along the line 53—53 of FIG. 52.

Returning to FIGS. 52 and 53, the lower bumper members 2200 may have a cylindrical upper surface 2230 that may be aligned about an axis 2232, which may be generally perpendicular to both the axis 118 and the axes 2234 about which the contact surfaces 670 may be formed. Configuration in this manner permits the lower bumper members 2200 to loaded in a consistent manner without the need to precisely guide the driver 32 onto the lower bumper members 2200 and without transmitting a significant shear load to the lower bumper members 2200.

As another example, each lower bumper member 2200 may be formed with a channel 2270 that extends about the lower bumper member 2200 inwardly of the perimeter of the lower bumper member 2200 as shown in FIGS. 54 through 57. The channel 2270 may be formed in a lower surface of the lower bumper member 2200 so as to be open at the bottom of the lower bumper member 2200 (as shown), or may be a closed cavity that is disposed within the lower bumper member 2200 (not shown). While the lower bumper member 2200 and the channel 2270 are illustrated to have a generally rectangular shape, those of ordinary skill in the art should appreciate from this disclosure that the lower bumper member 2200 and the channel 2270 may be otherwise formed. For example, the lower bumper member 2200 may be generally cylindrically shaped, and/or the channel 2270 may be annular in shape. The area at which the driver 32 contacts the lower bumper members 2200 is subject to relatively high stresses that are mitigated to a large degree by the channels 2270.

Control Unit

Figure 58:
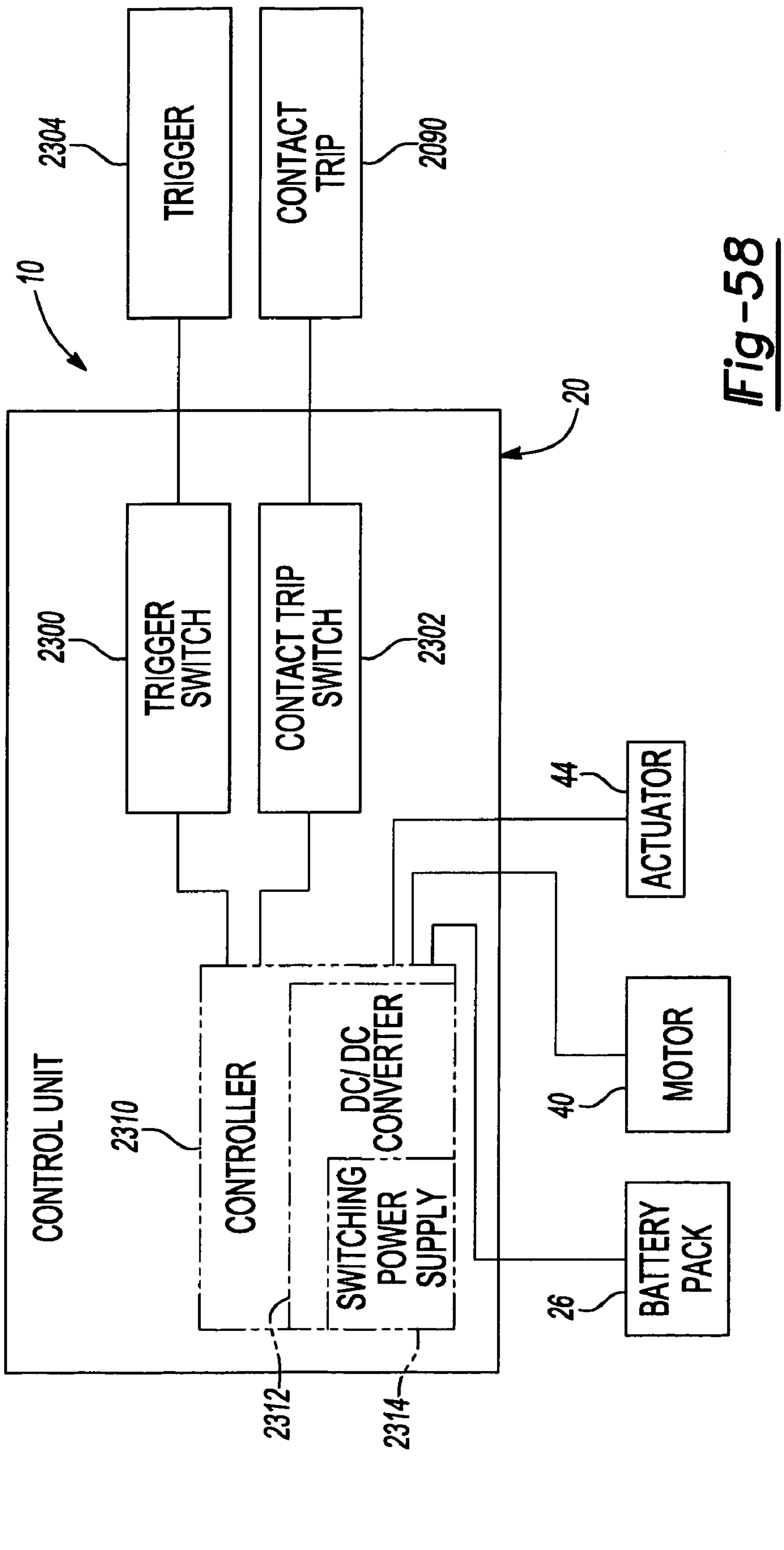
FIG. 58 is a schematic illustration of a portion of the fastening tool of FIG. 1, illustrating the control unit in greater detail.

With reference to FIG. 58, the control unit 20 may include various sensors (e.g., a trigger switch 2300 and contact trip switch 2302) for sensing the state of various components, e.g., the trigger 2304 (FIG. 1) and the contact trip mechanism 2090 (FIG. 1), respectively, and generating signals in response thereto. The control unit 20 may further include a controller 2310 for receiving the various sensor signals and controlling the fastening tool 10 (FIG. 1) in response thereto. The control unit 20 may further include a DC/DC converter 2312 with a switching power supply 2314 for pulse-modulating the electrical power that is provided by the battery pack 26 and supplied to the motor 40. More specifically, the switching power supply 2314 switches (i.e., turns on and off) to control its output to the motor 40 to thereby apply power of a desired voltage to the motor 40. Consequently, electrical power of a substantially constant overall voltage may be provided to the motor 40 regardless of the voltage of the battery pack 26 by adjusting the length of time at which the switching power supply 2314 has been turned off and/or on.

With additional reference to FIG. 2, the control unit 20 may include one or more circuit boards 2320 onto which the electrical components and circuitry, including the switches, may be mounted. A wire harness 2322 may extend from the circuit board 2320 and may include terminals for electrically coupling the circuit board 2320 to the battery pack 26 and the motor 40.

Housing Assembly, Backbone Cover & Trigger

Figure 59:
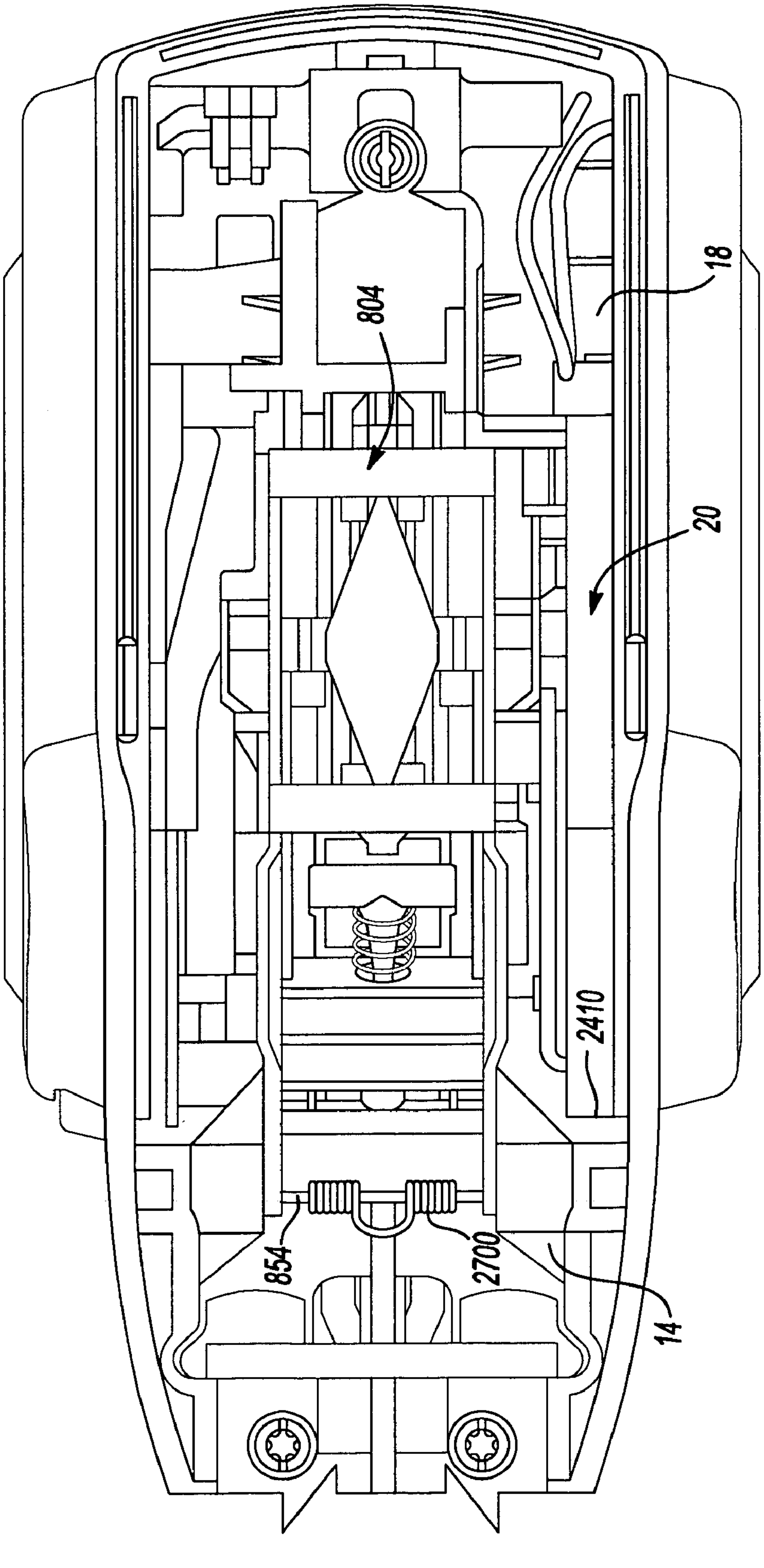
FIG. 59 is a front view of a portion of the fastening tool of FIG. 1.
Figure 60:
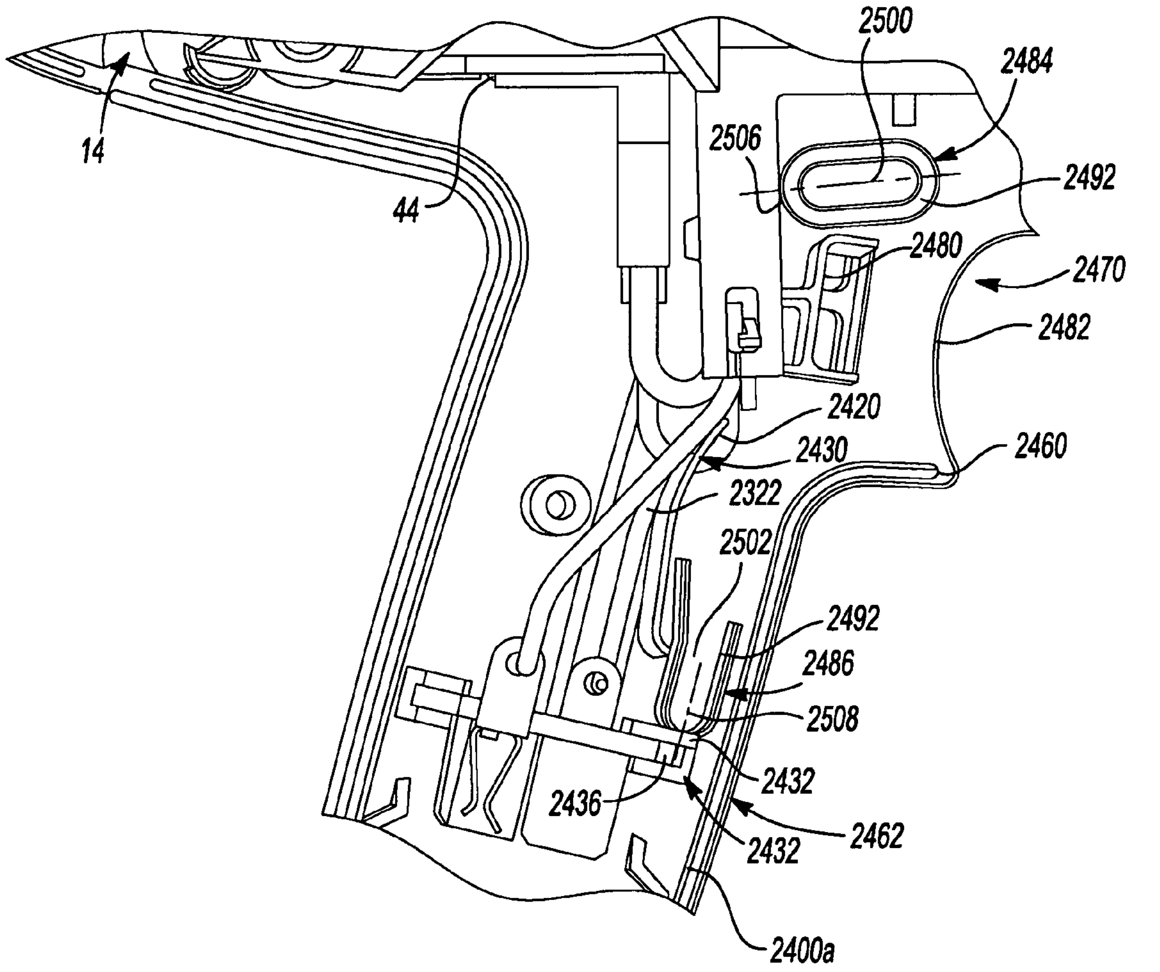
FIG. 60 is a right side view of a portion of the fastening tool of FIG. 1 illustrating the backbone and the drive motor assembly as received into a left housing shell.

With reference to FIGS. 1, 59 and 60, the housing assembly 12 may include discrete housing shells **2400*a* and 2400*b* that may be formed from a thermoplastic material and which cooperate to define a body portion 2402 and a handle portion 2404. The body portion 2402 may define a housing cavity 2410 that is sized to receive the backbone 14, the drive motor assembly 18 and the control unit 20 therein. The handle portion 2404 may extend from the body portion 2402 and may be configured in a manner that permits an operator to manipulate the fastening tool 10 in a convenient manner. Optionally, the handle portion 2404 may include a mount 2418 to which the battery pack 26 may be releasably received, and/or a wire harness guard 2420 that confines the wire harness 2322 to a predetermined area within the handle portion 2404. The mount 2418 may include a recess 2422 that is configured to be engaged by a latch 2424 on the battery pack 26 so that the battery pack 26 may be fixedly but removably coupled to the handle portion 2404. The wire harness guard 2420 may include a plate member 2430 that extends inwardly from the housing shell 2400*a* and a plurality of ribs 2432 that cooperate to form a cavity into which a tool terminal block 2436 may be received. The tool terminal block 2436 includes electrical terminals that engage corresponding terminals that are formed on the battery pack 26**.

Optionally, portions of the housing assembly 12 may be overmolded to create areas on the exterior of and/or within the housing assembly 12 that enhance the capability of the housing assembly 12 to be gripped by an operator, provide vibration damping, and/or form one or more seals. Such techniques are described in more detail in commonly assigned U.S. Pat. No. 6,431,289 entitled "Multispeed Power Tool Transmission" and copending U.S. patent application Ser. No. 09/963,905 entitled "Housing With Functional Overmold", both of which are hereby incorporated by reference as if fully set forth herein.

Figure 61:
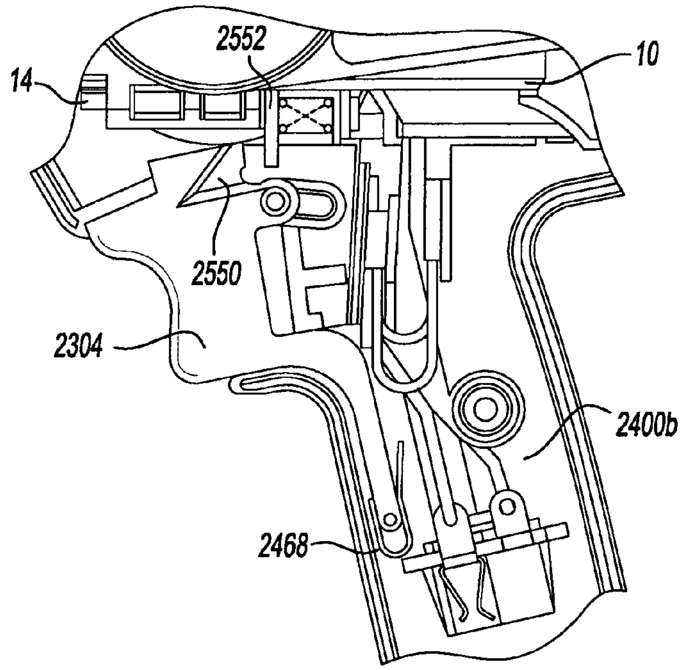
FIG. 61 is a left side view of a portion of the fastening tool of FIG. 1 illustrating the backbone, the drive motor assembly, the control unit and the trigger as received into a right housing shell.
Figure 62:
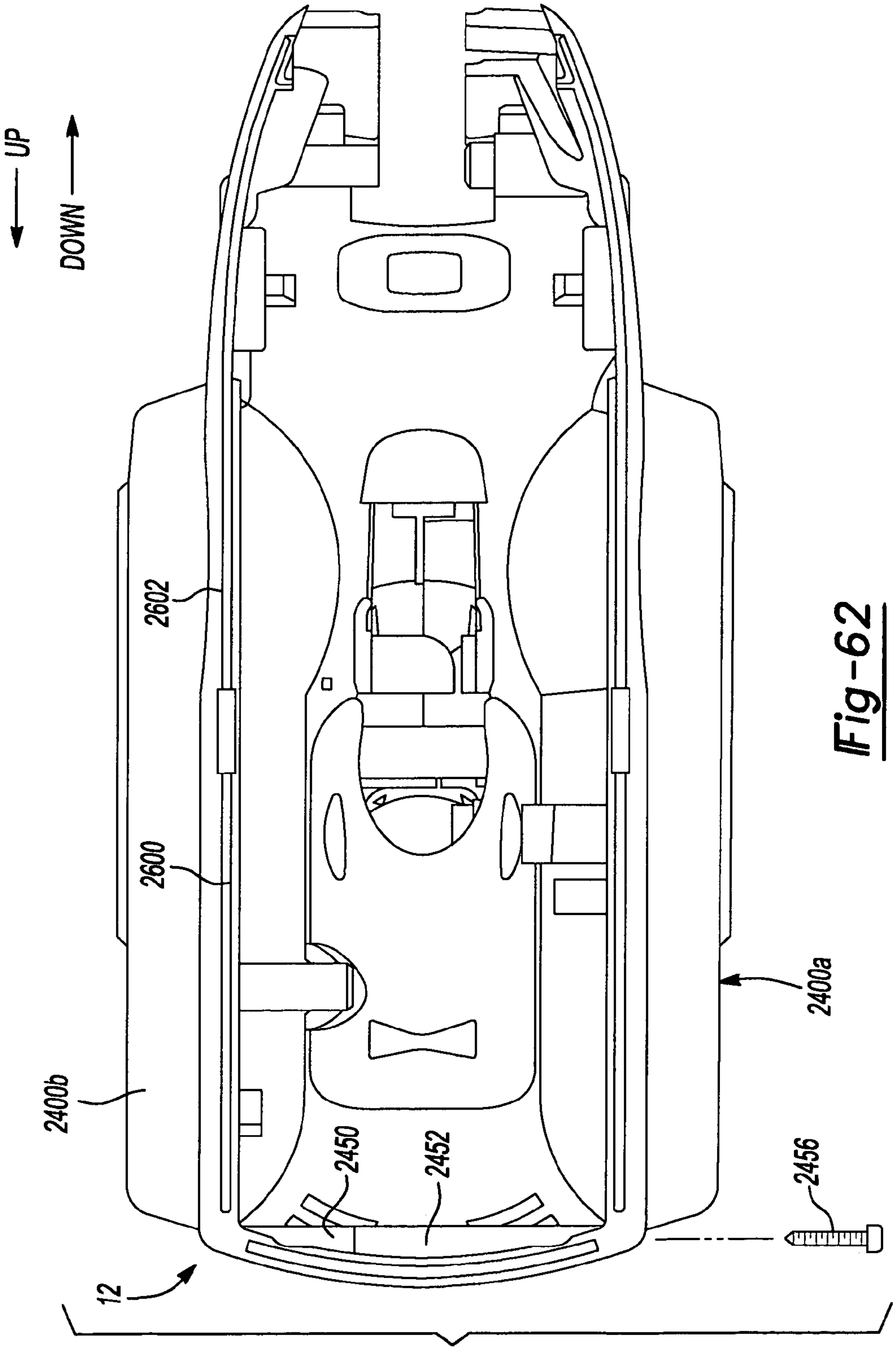
FIG. 62 is a front view of the housing.

With reference to FIGS. 60 through 62, the housing shells 2400*a* and 2400*b* may employ a plurality of locating features to locate the housing shells 2400*a* and 2400*b* to one another as well as to the backbone 14. In the example provided, the housing shells 2400*a* and 2400*b* are located to one another with several sets of bosses and a rib-and-groove feature. Each set of bosses includes a first boss 2450 and a second boss 2542 into which the first boss 2450 is received. The set of bosses may be configured to receive a threaded fastener 2456 therein to secure the housing shells 2400*a* and 2400*b* to one another. The rib-and-groove feature may include a rib member 2460, which extends from a first one of the housing shells, e.g., housing shell 2400*a*, about selected portions of the surface 2462 that abuts the other housing shell, and a mating groove 2468 that is formed in the other housing shell, e.g., housing shell 2400*b*.

The housing assembly 12 may also include a trigger mount 2470 and a belt clip mount, which is discussed in greater detail below. The trigger mount 2470 may be configured in an appropriate manner to as to accept a desired trigger, including a rotary actuated trigger or a linearly actuated trigger. In the example provided, the trigger 2304 has characteristics of both a rotational actuated trigger and a linearly actuated trigger and as such, the trigger mount may include a backplate 2480, a trigger opening 2482, a pair of first trigger retainers 2484, and a pair of second trigger retainers 2486. The backplate 2480 may be formed on one or both of the housing shells 2400*a* and/or 2400*b* and includes an abutting surface 2490 that extends generally perpendicular to the trigger opening 2482. Each of the first and second trigger retainers 2484 and 2486 may be defined by one or more wall members 2492 that extends from an associated housing shell (e.g., housing shell 2400*a*) and defines first and second cams 2500 and 2502, respectively. In the particular example provided, the handle angle is positive and as such, the first cam 2500 is aligned about a first axis 2506, while the second cam 2502 is aligned about a second axis 2508 that is skewed (i.e., angled) to the first axis 2506 such that the angle therebetween is obtuse. In instances where the handle angle is negative, the angle between the first and second axes 2506 and 2508 may be 90 degrees or less. Those of ordinary skill in the art will appreciate in view of this disclosure that the cams 2500 and 2502 may have any configuration, provided that they define the axes 2506 and 2508, respectively, along which corresponding portions of the trigger 2304 travel. In this regard, each end of the first and second trigger retainers 2484 and 2486 may be open or closed and as such, need not limit the travel of the trigger 2304 along a respective axis.

Figure 63:
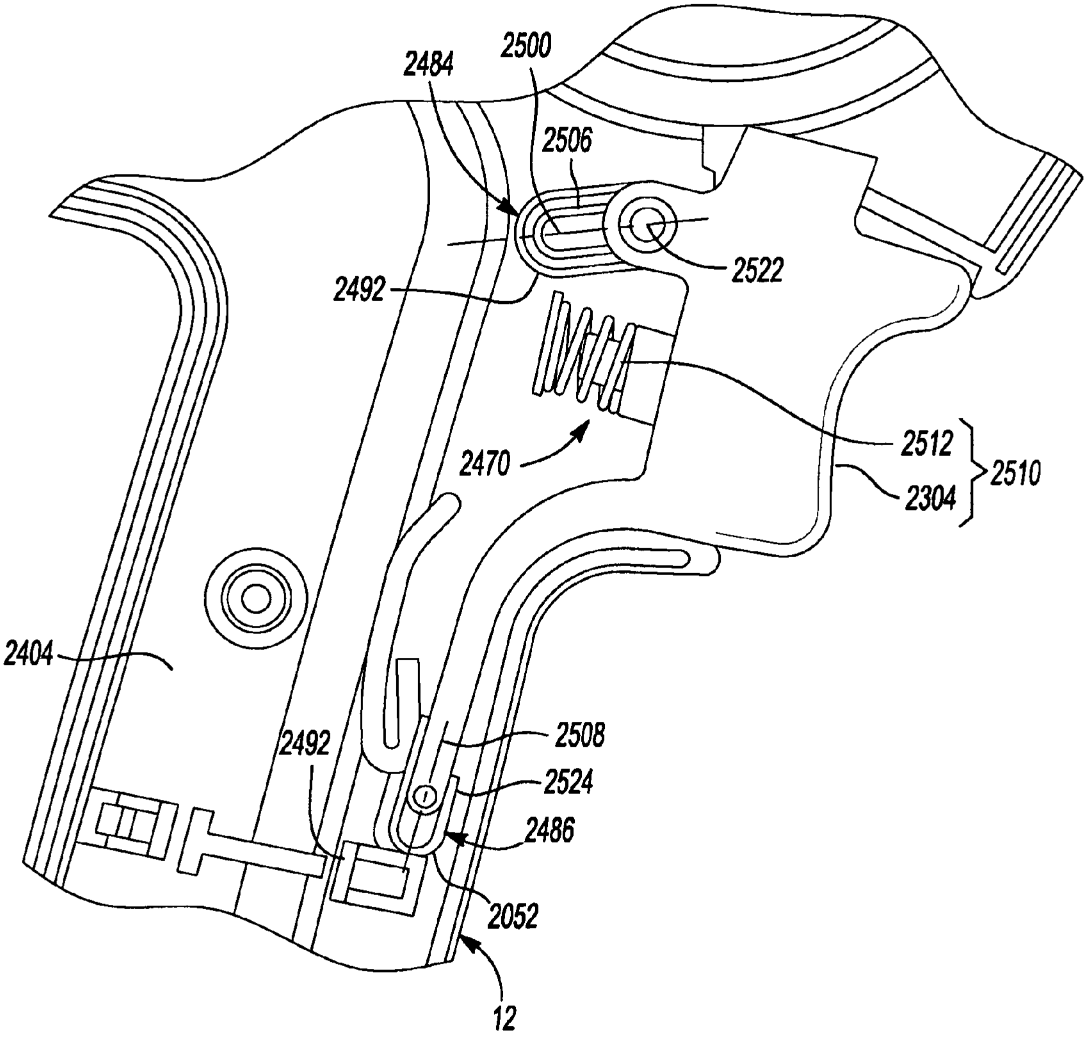
FIG. 63 is a view of a portion of the housing with the trigger installed thereto.
Figure 64:
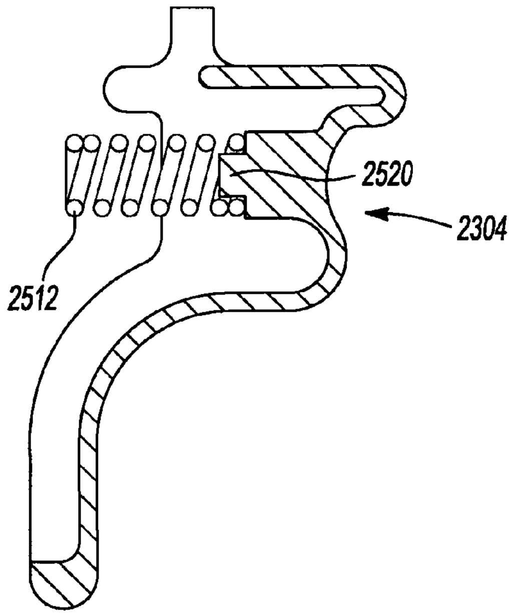
FIG. 64 is a sectional view of the trigger.

With reference to FIGS. 63 and 64, a trigger assembly 2510 may include the trigger 2304 and a trigger spring 2512, which may be a conventional compression spring. Except as noted below, the trigger 2304 may be substantially symmetrical about its longitudinal centerline and may include a spring mount 2520, a first pair of pins 2522 and a second set of pins 2524. The spring mount 2520 may be configured to receive the trigger spring 2512 thereon and may serve as a guide for the trigger spring 2512 when it is compressed. The first and second sets of pins 2522 and 2524 extend from the opposite lateral sides of the trigger 2304 and are configured to be disposed in the first and second cams 2500 and 2502, respectively, that are formed in the housing assembly 12.

The wall members 2492 of the first and second trigger retainers 2484 and 2486 operatively restrict the movement of the first and second sets of pins 2522 and 2524, respectively, to thereby dictate the manner in which the trigger 2304 may be moved within the trigger mount 2470. More specifically, when the trigger 2304 is urged into a retracted position by the finger of an operator, the wall members 2492 of the first trigger retainers 2484 guide the first pins 2522 along the first axis 2506 so that they move along a vector having two directional components—one that is toward the centerline of the handle portion 2404 (i.e., toward a side of the handle portion 2404 opposite the trigger 2304) and another that is parallel the centerline of the handle portion 2404 (i.e., toward the battery pack 26 (FIG. 1)). Simultaneously, the wall members 2492 of the second trigger retainers 2486 guide the second pins 2524 along the second axis 2508. As thus constructed, the trigger 2304 has a "feel" that is similar to a linearly actuated trigger, but is relatively robust in design like a rotationally actuated trigger.

From the foregoing, those of ordinary skill in the art will appreciate that force is transmitted through the trigger 2304 at a location that is off-center to the trigger 2304 and its linkage. If a purely linear trigger were to be loaded in this manner, wracking would result as such triggers and linkages always act more smoothly when the loads are applied in a direction that is in-line with bearing surfaces. If a purely rotational trigger were to be loaded in this manner, it would function smoothly as they are generally tolerant of off-axis loads, but would be relatively less comfortable for a user to operate.

Those of ordinary skill in the art will also appreciate from this disclosure that the shape and angle of the cams 2500 and 2502 are a function of the path over which the user's finger travels. In other words, the cam 2502 may be generally parallel to or in-line with the center of the handle portion 2404. To determine the shape of the cam 2500, the trigger 2304 may be translated from an initial position (i.e., an unactuated position) into the handle portion 2404 to an end position (i.e., an actuated position). Movement of the trigger 2304 from the initial position to the end position is controlled at a first point by the cam 2502 (i.e., the trigger 2304 moves along the cam 2502). Movement of the trigger 2304 at a second point is controlled by a finger contact point (i.e., the point at which the user's finger contacts the trigger 2304). The finger contact point on the trigger 2304 is translated in a direction that is generally perpendicular to the handle portion 2404 when the trigger 2304 is moved between the initial position and the end position. The cam 2500 is constructed to confine the movement of the second point of the trigger 2304 along the perpendicular line along which the finger contact point translates.

Figure 61A:
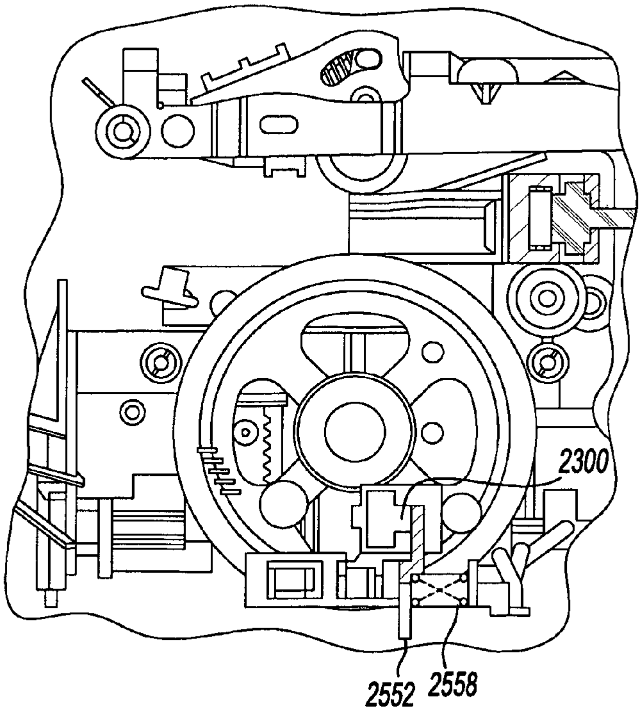
FIG. 61A is an enlarged partially broken away portion of FIG. 61.

Returning to FIGS. 61 and 61A, the trigger 2304 may further include a switch arm 2550 that is configured to engage an actuator 2552 of a trigger switch 2300 that is employed in part to actuate the fastening tool 10. In the example provided, the trigger switch 2300 is a microswitch and the actuator 2552 is a spring-biased plunger that is slidably mounted to the backbone 14. The switch arm 2550 is configured to contact and move the actuator 2552 when the trigger 2304 is depressed so as to change the state of the microswitch.

To prevent the trigger switch 2300 from being damaged as a result of over-traveling the actuator 2552, the trigger switch 2300 is configured such that the actuator 2552 is biased into contact with the microswitch and the trigger 2304 is employed to push the actuator 2552 away from the microswitch. Accordingly, the only force that is applied to the microswitch is the force of the spring 2558 that biases the actuator 2552 into contact with the trigger switch 2300; no forces are applied to the microswitch when the trigger 2304 is depressed, regardless of how far the actuator 2552 is over-traveled.

With reference to FIG. 1, the backbone cover 16 may be employed to cover the top of the backbone 14 and may attach to both the housing assembly 12 and the backbone 14. In this regard, the housing assembly 12 and the backbone cover 16 may employ a rib-and-groove feature, which is similar to that which is described above, to locate the backbone cover 16 relative to the housing assembly 12. In the example provided and with additional reference to FIGS. 62 and 65, the housing assembly 12 includes a rib member 2600 that extends from selected portions of the surface 2602 that abuts the backbone cover 16, and a mating groove 2602 that is formed in the backbone cover 16. Bosses 2604 may be formed into the backbone cover 16 to receive threaded fasteners (not shown) therethrough to permit the backbone cover 16 to be fixedly but removably secured to the backbone 14. Configuration of the fastening tool 10 in this manner provides a means by which an operator may readily gain access to the drive motor assembly 18 to inspect and/or service components, such as the flywheel 42 (FIG. 2), the driver 32 (FIG. 2) and the return mechanism 36 (FIG. 2), as well as provides a structural element that is relatively strong and durable and which may extend over the upper end and/or lower end of the housing assembly 12. Alternatively, the housing assembly 12 may be configured to cover the top of the backbone 14.

Tool Operation

In the particular example provided and with reference to FIG. 58, the control unit 20 may activate the motor 40 upon the occurrence of a predetermined condition, such as a change in the state of the contact trip switch 2302 that indicates that the contact trip mechanism 2090 has been abutted against a workpiece, and thereafter activate the actuator 44 upon the occurrence of a second predetermined condition, such as a change in the state of the trigger switch 2300 that indicates that the trigger 2304 has been depressed by the operator. As there is typically a short delay between the activation of the contact trip switch 2302 and the trigger switch 2300, configuration in this manner permits the flywheel 42 (FIG. 2) to be rotated prior to the time at which the operator has called for the fastening tool 10 to install a fastener F (FIG. 1) (e.g., the time at which the operator depressed the trigger 2304 in the example provided). Accordingly, the overall time between the point at which the operator has called for the fastening tool 10 to install a fastener F (FIG. 1) and the point at which the fastening tool 10 installs the fastener F (FIG. 1) may thereby be shortened relative to the activation times of other known cordless nailers.

Figure 67:
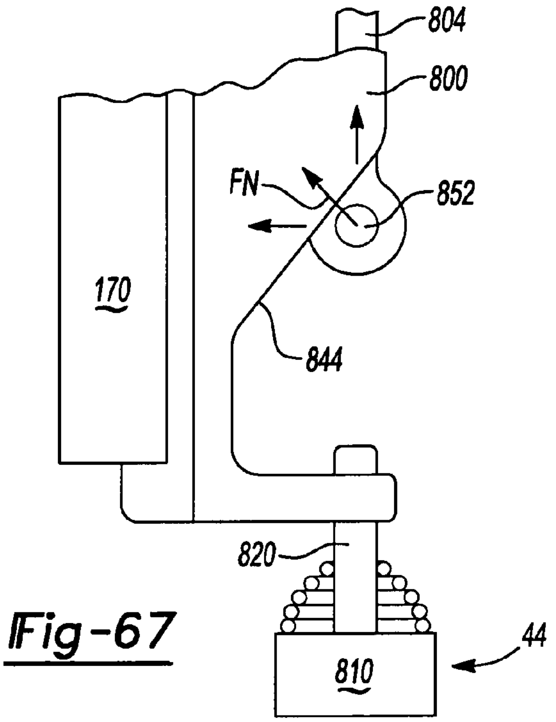
FIG. 67 is a right side view of a portion of the drive motor assembly illustrating the clutch, the cam and the actuator in greater detail.
Figure 68:
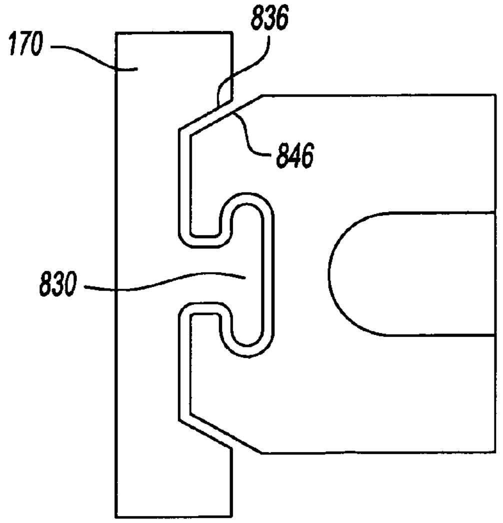
FIG. 68 is a rear view of the clutch and the cam.

With reference to FIGS. 1, 2 and 4, when the fastening tool 10 is actuated, the control unit 20 cooperates to activate the drive motor assembly 18 to cause the motor 40 to drive the flywheel 42 and thereafter to cause the actuator 44 to move the follower 50 so that the follower 50 contacts the driver 32 such that the driver profile 520 (FIG. 16) of the driver 32 is engaged to the exterior surface 350 (FIG. 16) of the flywheel 42 (FIG. 16) with sufficient clamping force so as to permit the flywheel 42 (FIG. 16) to accelerate the driver 32 to a speed that is within a desired speed range. In the particular example provided and with additional reference to FIGS. 67 and 68, activation of the actuator 44 causes the plunger 820 of the solenoid 810 to travel away from the driver 32. As the plunger 820 and the clutch 800 are coupled to one another, movement of the plunger 820 causes corresponding translation of the clutch 800 along the ways 830. The follower 852, which is engaged to the cam surface 844, follows the cam surface 844 as the clutch 800 translates, which causes the activation arm assembly 804 to pivot relative to the backbone 14 about the arm pivot pin 854, which in turn rotates the follower 50 about the arm pivot pin 854 into engagement with the first cam portion 560 (FIG. 23) of the cam profile 522 (FIG. 23). Engagement of the follower 50 to the first cam portion 560 (FIG. 23) translates the driver 32 into contact with the rotating flywheel 42 so that the flywheel 42 may transmit kinetic energy to the driver 32 to accelerate the driver 32 along the axis 118. The spring 858 of the activation arm 806 provides a degree of compliance between the activation arm 806 and the roller assembly 808 that permits the follower 50 to pivot away from the driver 32 to thereby inhibit the activation arm assembly 804 from overloading the driver 32 and/or the flywheel assembly 250.

The first cam portion 560 (FIG. 23) of the cam profile 522 (FIG. 23) may be configured such that the clamping force that is exerted by the follower 50 onto the driver 32 is ramped up quickly, but not so quickly as to concentrate wear at a single location on the cam profile 522 (FIG. 23). Rather, the ramp-up in clamping force may be distributed over a predetermined length of the cam profile 522 (FIG. 23) to thereby distribute corresponding wear over an appropriately sized area so as to increase the longevity of the driver 32. Note, too, that the ramp-up in clamping force cannot be distributed over too long a length of the cam profile 522 (FIG. 23), as this may result in the transfer of an insufficient amount of energy from the flywheel 42 to the driver 32. In the example provided, the first cam portion 560 (FIG. 23) of the cam profile 522 (FIG. 23) may have an angle of about 4 degrees to about 5 degrees relative to the rails 564 (FIG. 23) of the cam profile 522 (FIG. 23).

While the solenoid 810, clutch 800 and activation arm assembly 804 cooperate to apply a force to the driver 32 that initiates the transfer of energy from the flywheel 42 to the driver 32, it should be appreciated that this force, in and of itself, may be insufficient (e.g., due to considerations for the size and weight of the actuator 44) to clamp the driver 32 to the flywheel 42 so that a sufficient amount of energy may be transferred to the driver 32 to drive a fastener F into a workpiece. In such situations, the reaction force that is applied to the follower 50 will tend to pivot the activation arm assembly 804 about the arm pivot pin 854 so that the cam follower 852 is urged against the sloped cam surface 844, which tends to urges the clutch 800 in a direction away from the solenoid 810, as well as toward the ground plate 170 such that the engagement surfaces 846 engage the engagement surfaces 836 and lock the clutch 800 to the ground plate 170. In this regard, the ground plate 170 operates as a one-way clutch to inhibit the translation of the clutch 800 along the ways 830 in a direction away from the solenoid 810. Accordingly, the clamping force that is exerted by the follower 50 onto the cam profile 522 (FIG. 23) of the driver 32 increases to a maximum level wherein the follower 50 is disposed on the rails 564 (FIG. 23) of the cam profile 522 (FIG. 23). The maximum level of clamping force is highly dependent upon numerous factors, including the type of fastener that is to be driven, the configuration of the interface between the driver 32 and the flywheel 42, etc. In the particular example provided, the clamping force may range from about 150 lbf. to about 210 lbf.

Those of ordinary skill in the art will appreciate from this disclosure that the consistency of the interface between the ground plate 170 and the clutch 800 is an important factor in the operation of the fastening tool 10 and that variances in this consistency may prevent the clutch 800 from properly engaging or disengaging the ground plate 170. As such, the ground plate 170 and the clutch 800 may be shrouded by one or more components from other components, such as the flywheel 42 that tend to generate dust and debris due to wear. In the particular example provided, the clutch 800 and the ground plate 170 are disposed within cavities in the backbone 14 so that a portion of the backbone 14 extends between the flywheel 42 and the interface between the clutch 800 and the ground plate 170 as is best shown in FIG. 4. Alternatively, a discrete component may be coupled to the backbone 14 upwardly of the flywheel 42 to shroud the interface in an appropriate manner.

The energy that is transferred from the flywheel 42 to the driver 32 may be of a magnitude that is sufficient to drive a fastener F of a predetermined maximum length into a workpiece that is formed of a relatively hard material, such as oak. In such conditions, the driving of the fastener F may consume substantially all of the energy that has been stored in the flywheel 34 and the armature of the motor 40. In situations where the fastener F has a length that is smaller than the maximum length and/or is driven into a workpiece that is formed of a relatively softer material, such as pine, the flywheel 34 et al. may have a significant amount of energy after the fastener F has been driven into the workpiece. In this latter case, the residual energy may cause the driver 32 to bounce upwardly away from the nosepiece assembly 22, as the lower bumper 2102 (FIG. 30) may tend to reflect rather than absorb the energy of the impact with the driver 32. This residual energy may tend to drive the driver 32 into the follower 50, which may in turn apply a force to the activation arm assembly 804 that pivots it about the arm pivot pin 854 in a direction that would tend to cause the clutch 800 to lock against the ground plate 170.

With brief additional reference to FIGS. 32 and 35, the magnitude of the force with which the driver 32 may impact the follower 50 may be reduced in such situations through the pivoting of the eccentrics 922 about the axle stubs 974 such that the stop members 976 travel toward or are disposed in an end of the range limit slots 942 opposite the end into which they are normally biased. Rotation of the eccentrics 922 pivots the follower 50 away from the driver 32 when the driver 32 bounces off the lower bumper 2102. To accelerate the process by which the follower 50 is pivoted away from the driver 32, the second cam portion 562 (FIG. 23) is provided on the cam profile 522 (FIG. 23) of the driver 32. The second cam portion 562 (FIG. 23) is configured to permit the spring 858 to unload to thereby permit the clutch 800 to disengage and permit the activation arm assembly 804 to return to it's "home" position when the driver 32 is starting to stall (i.e., is proximate the lowest point in its stroke), which permits the eccentrics 922 to pivot about the axle stubs 974 and rotate the follower 50 upwardly and away from the cam profile 522 (FIG. 23) such that the clamp force exerted by the follower 50 actually decreases. In the particular example provided, the follower 50 does not disengage the cam profile 522 (FIG. 23) of the driver 32.

Figure 69:
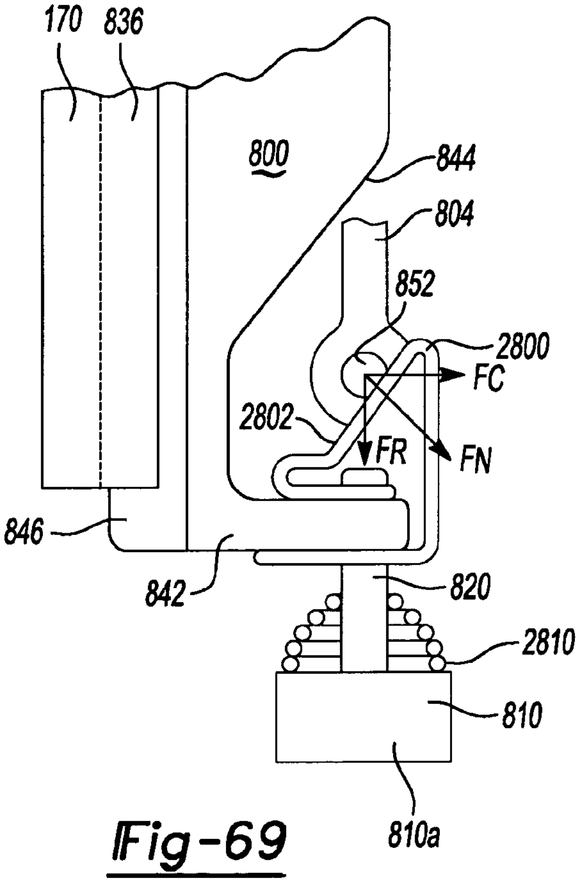
FIG. 69 is a view similar to that of FIG. 67 but including a spacer that is configured to resist lock-up of the cam to the clutch when the driver is moving toward a returned position.
Figure 70:
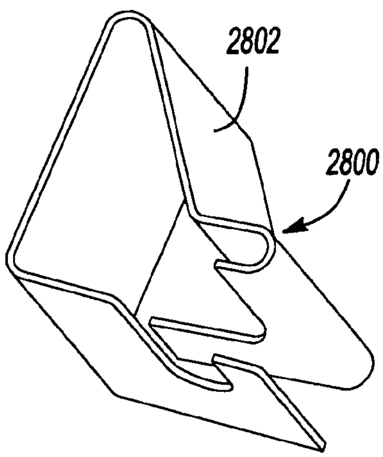
FIG. 70 is a perspective view of the spacer.

A spring 2700 (FIG. 59) may be employed to apply a force to the activation arm assembly 804 that causes it to rotate about the arm pivot pin 854 away from the flywheel 42 to thereby ensure that the stop mechanism 2050 will engage the activation arm assembly 804. Alternatively, as is shown in FIGS. 69 and 70, a spacer 2800 may be disposed between the cam follower 852 and the yoke 842 that is formed on the clutch 800. The spacer 2800 may include a sloped counter cam surface 2802 that may be generally parallel to the cam surface 844 when the spacer 2800 is operatively installed. In the particular example provided, the spacer 2800 is a sheet metal fabrication (e.g., clip) that engages the neck 826 (FIG. 41) of the plunger 820.

When the solenoid 810 is de-energized, a spring 2810 may be employed to urge the plunger 820 away from the body 810*a* of the solenoid 810 (i.e., extend the plunger 820 in the example provided). As the plunger 820 is coupled to the clutch 800 (via the yoke 842), the clutch 800 may likewise be urged away from the body 810*a* of the solenoid 810. The residual energy in the driver 32 (FIG. 2) may cause the driver 32 (FIG. 2) to bounce into contact with the follower 50 (FIG. 2), which may thereby urge the activation arm assembly 804 to rotate about the arm pivot pin 854 (FIG. 2), which may initiate contact between the cam follower 852 and the sloped cam surface 844 that tends to lock the clutch 800 to the ground plate 170. To guard against this condition, the second cam portion 562 (FIG. 23) of the cam profile 522 (FIG. 23) on the driver 32 (FIG. 2) may be configured such that the activation arm assembly 804 pivots about the arm pivot pin 854 (FIG. 2) in a direction that brings the cam follower 852 into contact with the counter cam surface 2802 on the spacer 2800 when the driver 32 (FIG. 2) is proximate the bottom of its stroke. Contact between the cam follower 852 and the counter cam surface 2802 permits force to be transmitted along a vector FN that is generally normal to the counter cam surface 2802; this vector FN, however, includes a component FC that is generally normal to the path of the clutch 800. When FC is transmitted to the clutch 800, the clutch 800 separates from the ground plate 170 such that the engagement surfaces 846 are disengaged from the engagement surfaces 836 on the ground plate 170 to thereby inhibit lock-up of the clutch 800 to the ground plate 170. The remaining force vector FR will cause the clutch 800 to translate to thereby rotate the activation arm assembly 804.

With reference to FIGS. 1, 2 and 62, the configuration of the drive motor assembly 18 that is illustrated is advantageous in that the center of gravity CG of the fastening tool 10 is laterally centered to the handle portion 2404, as well as vertically positioned so as to lie in an area of the handle portion 2404 proximate the trigger 2304 to thereby provide the fastening tool 10 with a balanced feeling that is relatively comfortable for an operator. Furthermore, the positioning of the various components of the fastening tool 10, such that the relatively large sized components including the motor 40, the solenoid 810 and the flywheel 42, are in locations toward the upper end of the fastening tool 10 permits the fastening tool 10 to be configured with a shape that corresponds to an upwardly extending wedge, as is shown in FIG. 62, wherein a lower end of the housing assembly 12 is relatively smaller than an upper end of the housing assembly 12. The wedge shape of the fastening tool 10 improves the ability with which the operator may view the placement of the nosepiece assembly 22 as well as improves the capability of the fastening tool 10 to be used in relatively tight workspace areas (so that the nosepiece assembly 22 may reach an area on a workpiece prior to a point where another portion of the fastening tool 10, such as the housing assembly 12, contacts the workpiece).

Drive Motor Assembly: Solenoid Adjustment

From the foregoing, those of ordinary skill in the art will appreciate that the drive motor assembly 18 include some means for adjusting the amount of clearance between the follower 50 and the cam profile 522 (FIG. 23) so as to compensate for issues such as normal manufacturing variation of the various components and wear. Provided that the clearance between the follower 50 and the cam profile 522 is sufficient to permit the activation arm assembly 804 to return to the "home" position, the ability of the fastening tool 10 to tolerate wear (i.e., the capability of the fastening tool 10 to fire with full energy) improves as the clearance between the follower 50 and the cam profile 522 decreases. In this regard, the capability of the activation arm assembly 804 to apply full pinch force to the driver 32 is lost when the various components of the fastening tool 10 (e.g., flywheel 42, driver 32) have worn to the point where the plunger 820 of the solenoid 810 is out of stroke before the follower 50 contacts the driver 32. With reference to FIGS. 2, 4, 41 and 71, this adjustability may be provided, for example, by moving the solenoid 810 to change the position of the activation arm assembly 804 about the arm pivot pin 854. In this regard, the arms 812 of the solenoid 810 may be telescopically received into the channels 152 that are formed in the actuator mount 62 in the backbone 14.

The position of the solenoid 810 within the bore 150 may be adjusted by positioning the follower 50 onto a predetermined portion of the cam profile 522 (FIG. 23), e.g., on the rails 564 (FIG. 23), pulling the solenoid 810 in the bore 150 in a direction away from the cam follower 852 (FIG. 32) until the occurrence of a first condition, pushing the solenoid 810 in the bore 150 in an opposite direction, i.e., toward the cam follower 852 (FIG. 32), until the occurrence of a second condition, and securing the solenoid 810 to the backbone 14, as by tightening the fasteners 814. The first condition may be position-based (e.g., where each pair of elements contacts one another: the cam profile 522 (FIG. 23) and the exterior surface 350 of the flywheel 42, the cam follower 852 (FIG. 32) and the cam surface 844, the engagement surfaces 836 and 846 (FIG. 16), and the yoke 842 and the head 828 of the plunger 820) or may be based on an amount of force that is applied to the body **810*a* of the solenoid 810 to push the solenoid 810 in the first direction. The second condition may be a displacement of the body 810*a* of the solenoid 810** in the second direction from a given reference point, such as the location where the first condition is satisfied.

Figure 72:
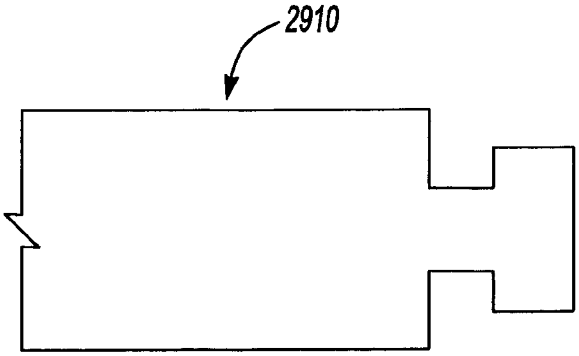
FIG. 72 is a side view of an exemplary tool for adjusting a position of the solenoid relative to the backbone.
Figure 73:
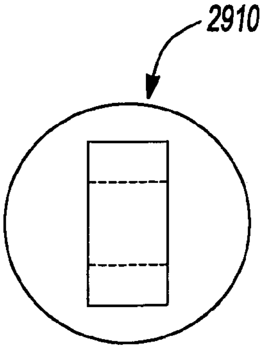
FIG. 73 is an end view of the tool of FIG. 72.
Figure 71:
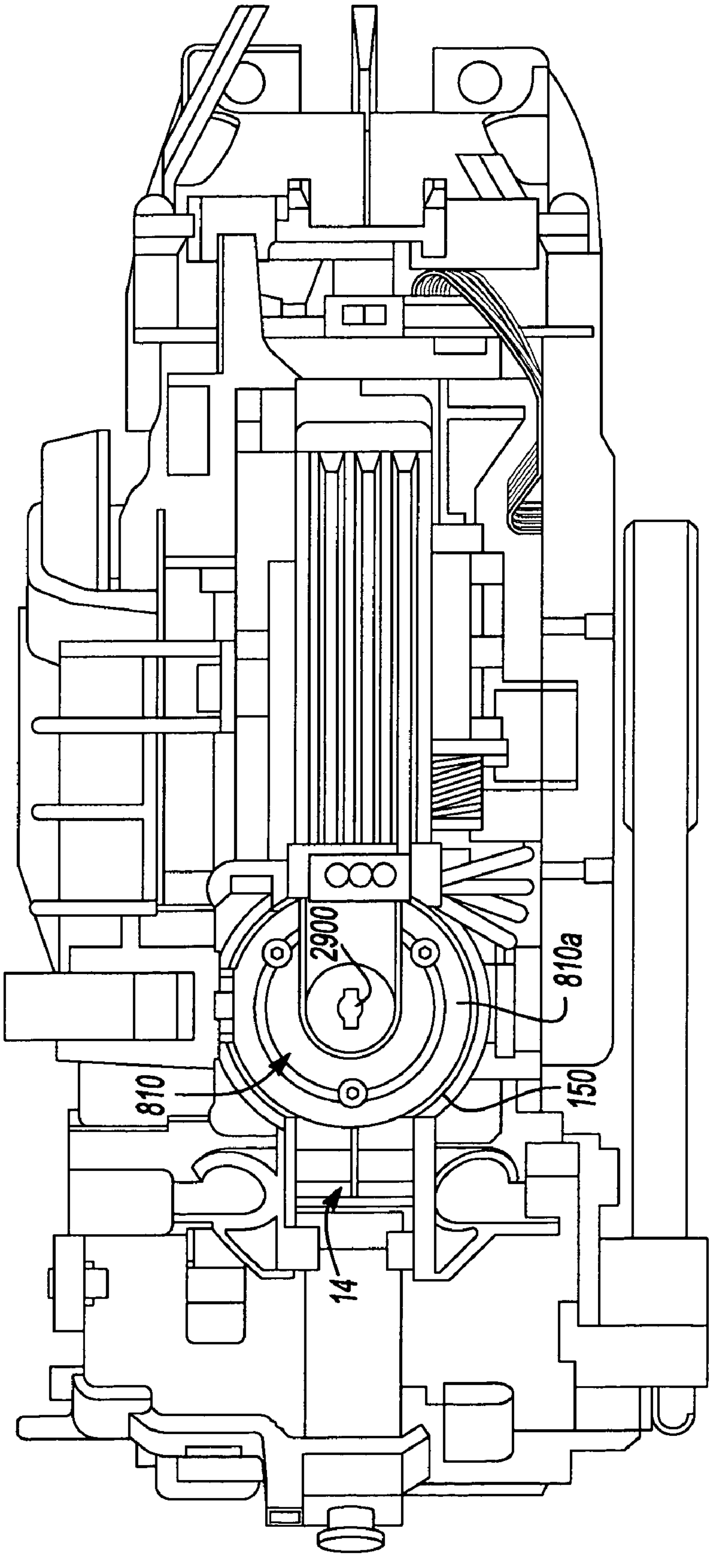
FIG. 71 is a back view of a portion of the fastening tool of FIG. 1 illustrating the actuator in greater detail.

In the particular example provided and with additional reference to FIGS. 72 and 73, the body **810*a* of the solenoid 810 includes a key-hole shaped aperture 2900 that is configured to be engaged by a correspondingly shaped tool 2910. The tool 2910 is inserted into the key-hole shaped aperture 2900 and rotated such that the tool 2910 may not be withdrawn from the body 810*a* of the solenoid 810. The tool 2910 is pulled in the first direction, carrying with it the body 810*a* of the solenoid 810, until a force of a predetermined magnitude has been applied to the body 810*a* of the solenoid 810. The body 810*a* of the solenoid 810 is thereafter translated in the second direction by a predetermined distance and the fasteners 814 are tightened against the backbone 14 to fix the solenoid 810 to the backbone 14 in this desired position. The tool 2910 is thereafter rotated into alignment with the key-hole shaped aperture 2900 and withdrawn from the body 810*a* of the solenoid 810**. As one of ordinary skill in the art will appreciate from this disclosure, this process may be automated through the use of a piece of equipment that employs force and displacement transducers.

Alternatively, a shim or spacer may be employed to set the location of the solenoid 810 relative to the backbone 14. For example, with the stop mechanism 2050 in a disengaged condition, a shim or spacer of a predetermined thickness may be inserted between the cam profile 522 (FIG. 23) on the driver 32 and the follower 50 when the driver 32 is in a predetermined condition, e.g., in the fully returned position so that the shim or spacer is abutted against the first cam portion 560 (FIG. 23) of the cam profile 522 (FIG. 23), the solenoid 810 is pulled in the first direction (as described in the immediately preceding paragraphs) so that no "slop" or clearance is present between the follower 50 and the shim or spacer, between the shim or spacer and the driver 32, and between the driver 32 and the flywheel 42.

Motor Sizing

Figure 74:
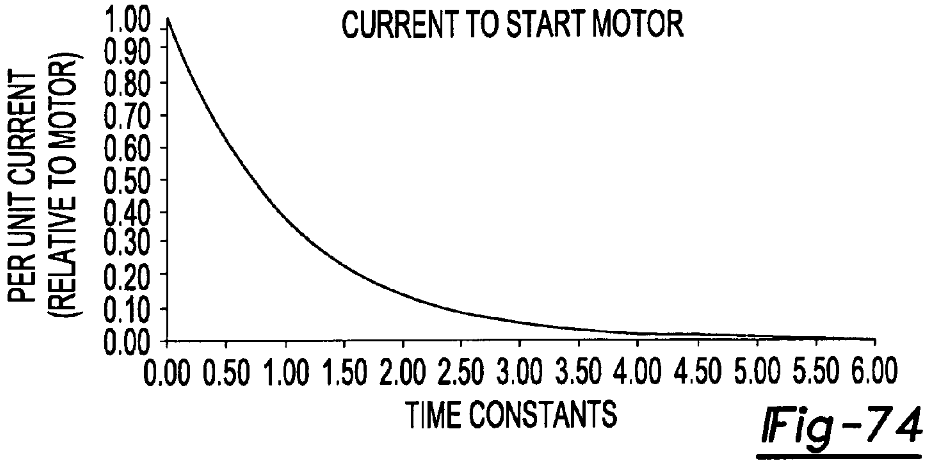
FIG. 74 is a plot that illustrates the relationship between electrical current and the amount of time constants that are required to bring a given motor to a given speed.
Figure 75:
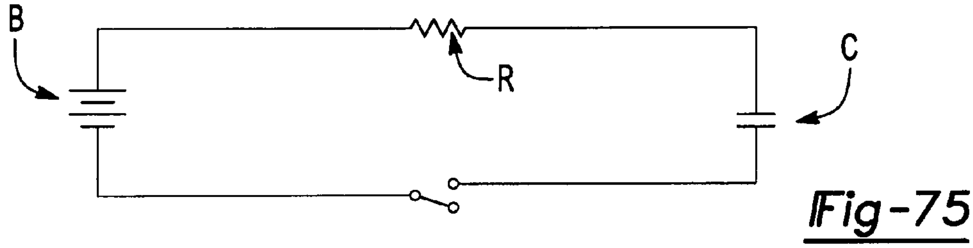
FIG. 75 is a schematic of an electrical circuit that is analogous to a mechanical motor-driven system having a given inertia.

FIG. 74 is a plot that illustrates a typical relationship between current and time is illustrated for a given arrangement having a predefined motor, inertia and battery arrangement where power is applied to the motor at time =0 and the motor is initially at rest. The mechanical inertia and motor combination, together with the battery/source may be simplified with reference to FIG. 75. The power source be a battery B with a no-load voltage (V), while the total resistance (R) is equal to the sum of the battery/source resistance and the motor resistance. The capacitor (C) represents the mechanical inertia of the combined motor and system inertia, together with the energy conversion process from electrical to mechanical energy, which is typically quantified as a back-emf value in the electrical circuit. The value of (C) relates to a given DC motor with a back emf constant (ke) and the system inertia (J) as follows: $C=J\div(ke)^2$ and the time constant of the electrical analogy is equal to $R\times C$.

As the mechanical inertia and the required speed of the inertia are predefined for a given application, the energy stored may also be considered to be known or predefined. For a mechanical system, the energy stored is equal to $0.5\times J\times\omega^2$, where ω is the angular speed of the inertia. For the above electrical analogy, the mechanical/electrical stored energy is $0.5\times C\times v^2$, where v is the instantaneous voltage across the capacitor (C). By definition, these two relationships must be equal (i.e., $0.5\times J\times\omega^2=0.5\times C\times v^2$) and thus $ke=v\div\omega$. Assuming that the total resistance (R) and the voltage of the power source (V) are constant, the only way to reduce the time to attain a given speed (or voltage across the capacitor) is to modify the value of ke and/or J.

Figure 76:
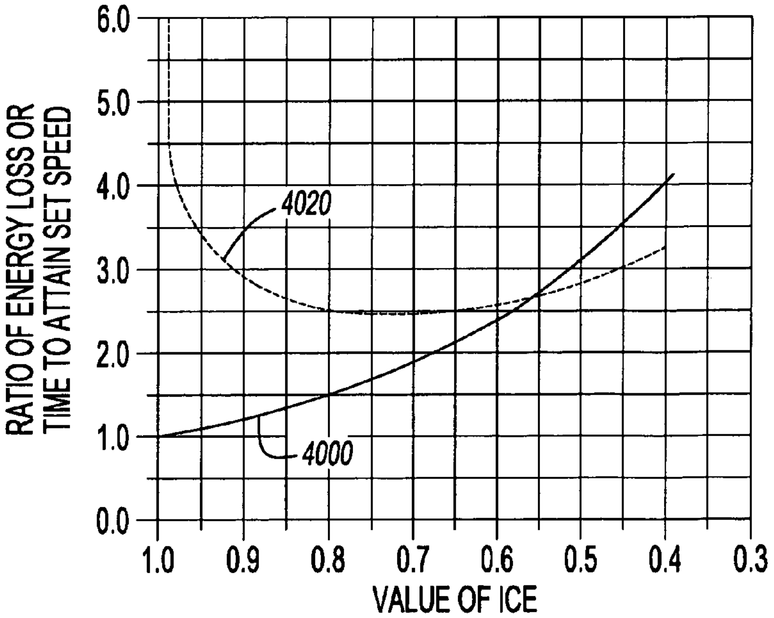
FIG. 76 is a plot that illustrate the relationships of a motor (ke) value to energy losses and the amount of time needed to bring the motor to a given speed.

If ke is reduced, the value of C increases and as such, the magnitude of each time constant increases as well. However, to attain a given speed, and thus a given speed/mechanical stored energy, the number of time constants is actually less as is shown in the plot of FIG. 76. The plot illustrates energy loss as a function of the value of ke, which is depicted by the line 4000, and time to attain a desired speed as a function of the value of ke, which is depicted by the line 4020. As is shown in the particular example provided, energy losses associated with bringing the mechanical inertia to the required rotational speed are minimized by utilizing a motor with a value of ke that approaches 1.0. However, the time that is needed to bring the mechanical inertia to the required rotational speed is relatively long. In contrast, if motor has a value of ke that is about 0.85 to about 0.55, and preferably about 0.80 to about 0.65 and more preferably about 0.75 to about 0.70, the amount of time that is needed to bring the mechanical inertia to the required rotational speed is minimized. Sizing of the motor 40 (FIG. 2) in this manner is advantageous in that it can significantly reduce the amount of time that an operator of the fastening tool 10 (FIG. 1) will need to wait after actuating a trigger 2304 (FIG. 1) and/or the contact trip mechanism 2090 (FIG. 1) to installing a fastener into a workpiece.

Belt Hook

Figure 77:
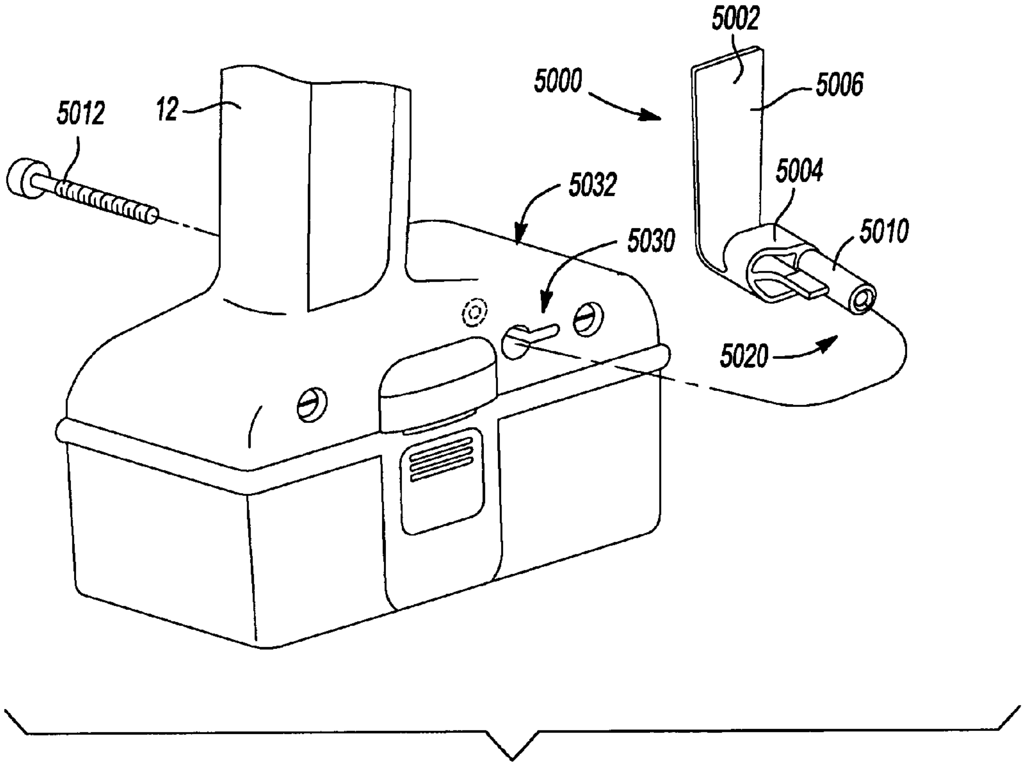
FIG. 77 is an exploded perspective view of a portion of the fastening tool of FIG. 1 illustrating a belt hook constructed in accordance with the teachings of the present invention.
Figure 78:
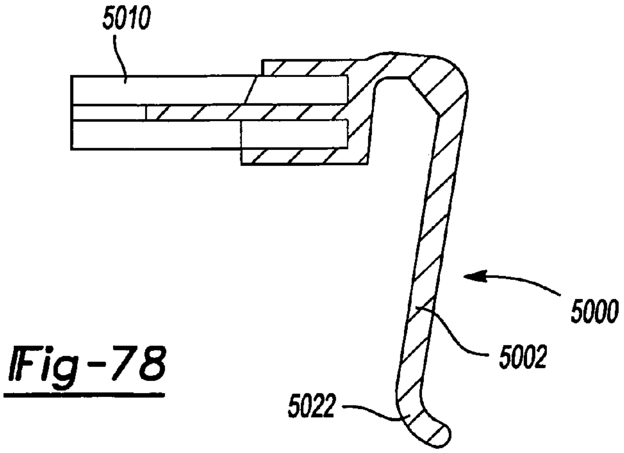
FIG. 78 is a sectional view of the belt hook of FIG. 77.

With reference to FIGS. 77 and 78, the belt hook 5000 may include a clip structure 5002 that may be keyed to the housing assembly 12. The clip structure 5002 may be generally L-shaped, having a base 5004 and an arm 5006. The base 5004 may include a boss 5010 for receiving a fastener 5012, and a keying feature 5020 that is coupled to the boss 5010. The arm 5006 may include a portion that extends in a direction that is generally transverse to the base 5004 and may include an arcuate end portion 5022 at its distal end.

The housing assembly 12 may be configured with an aperture 5030 that is configured to receive the boss 5010 and the keying feature 5020 therein and a second aperture 5032 that is configured to receive the fastener 5012. Preferably, the aperture 5030 and the second aperture 5032 are mirror images of one another so that the clip structure 5002 may be selectively positioned on one or the other side of the fastening tool 10. In the example provided, the fastener 5012 is inserted into the second aperture 5032 and threadably engaged to the boss 5010 to thereby fixedly but removably couple the clip structure 5002 to the housing assembly 12.

Figure 79:
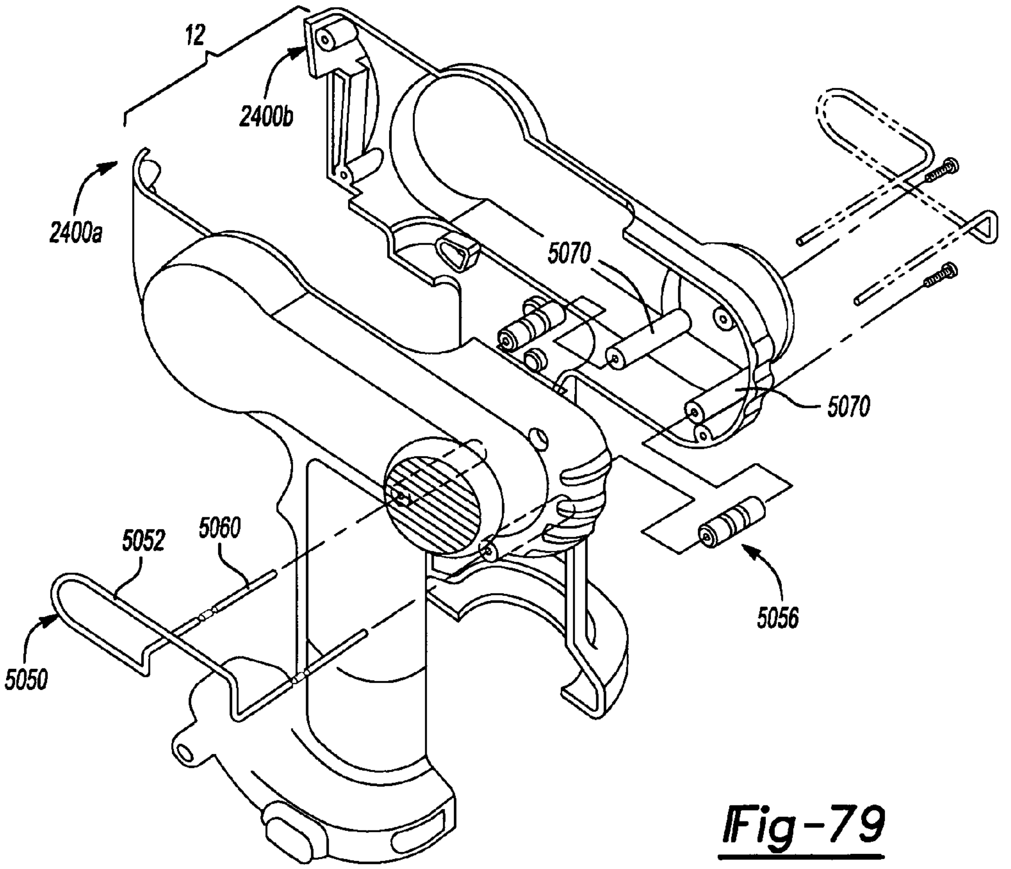
FIG. 79 is an exploded perspective view of a portion of a fastening tool similar to that of FIG. 1 but illustrating a second belt hook constructed in accordance with the teachings of the present invention.
Figure 80:
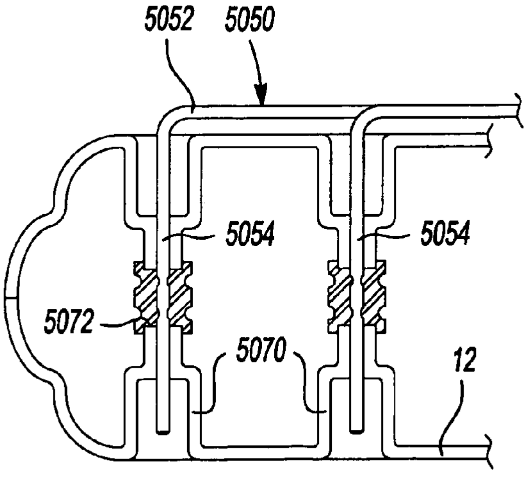
FIG. 80 is a sectional view of the fastening tool of FIG. 79 illustrating the second belt hook in greater detail.
Figure 81:
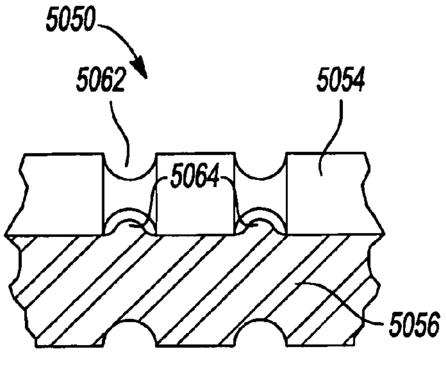
FIG. 81 is a sectional view of a portion of the belt hook of FIG. 79 illustrating the leg member as engaged to the fastener.

With reference to FIGS. 79 through 81, a belt hook constructed in accordance with the teachings of the present invention is generally indicated by reference numeral 5050. The belt hook 5050 may have a body 5052, one or more legs 5054, and one or more fasteners 5056 that are employed to secure the legs 5054 to the housing assembly 12. The body 5052 may extend downwardly along a side of the housing assembly 12 and may terminate in a shape which may be rounded to an appropriate degree.

The legs 5054 may extend outwardly from the body 5052 and may include features 5060 that are configured to engage the fasteners 5056. In the example provided, the features 5060 include at least one non-uniformity, such as axially spaced apart recesses 5062 that are configured to be engaged by annular protrusions 5064 that are formed on the fasteners 5056. In the example illustrated, the body 5052 and the legs 5054 are unitarily formed from a suitable heavy-gauge wire, but those of ordinary skill in the art will appreciate that the body 5052 and legs 5054 may be formed otherwise.

The fasteners 5056 may be disposed within the housing assembly 12, as for example between the housing shells 2400*a* and 2400*b*. More specifically, the housing shells 2400*a* and 2400*b* may include leg bosses 5070 that may be configured to receive the legs 5054 therethrough. The inward end 5072 of each leg boss 5070 is configured to abut an associated end of one of the fasteners 5056. In the example provided, a counterbore is formed in each end of the fasteners 5056, with the counterbore being sized to receive the inward end of a leg boss 5070. Threaded fasteners 5056 may be employed to secure the housing shells 2400*a* and 2400*b* to one another to thereby secure the fasteners 5056 within the housing assembly 12. In the particular example provided, the legs 5054 are forcibly inserted to the fasteners 5056 to align the recesses 5062 with the protrusions 5064. Engagement of the recesses 5062 and the protrusions 5064 inhibits movement of the legs 5054 relative to the fasteners 5056 to thereby secure the belt hook 5050 to the housing assembly 12.

Figure 82:
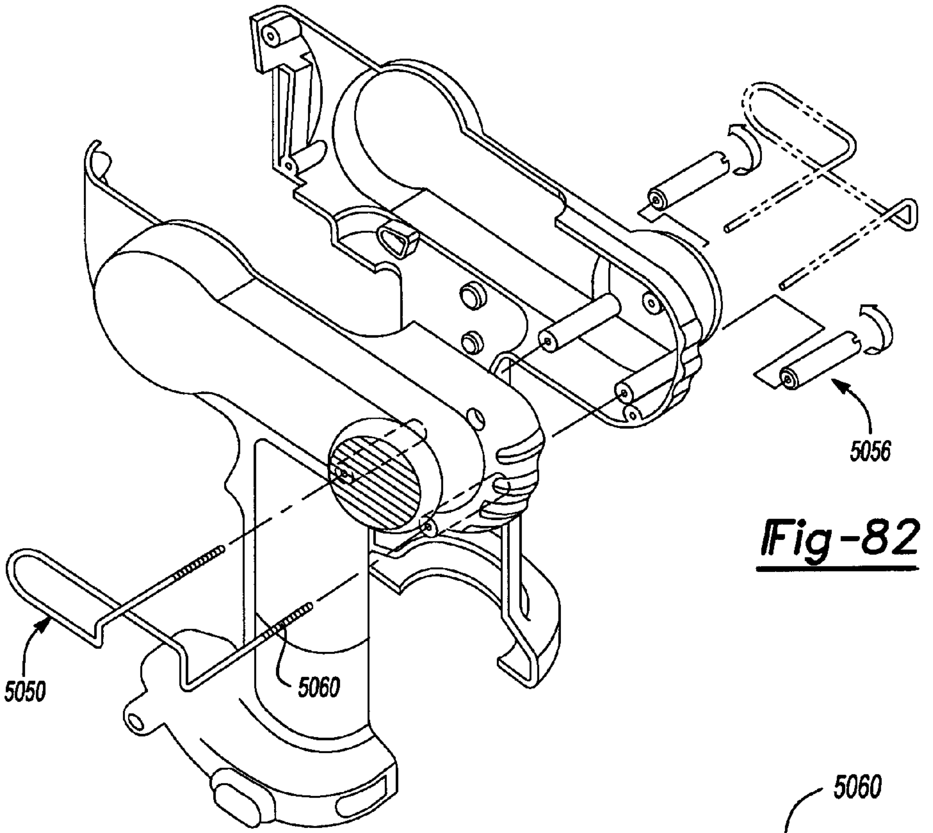
FIG. 82 is an exploded perspective view of a portion of another fastening tool similar to that of FIG. 1 but illustrating a third belt hook constructed in accordance with the teachings of the present invention.
Figure 83:
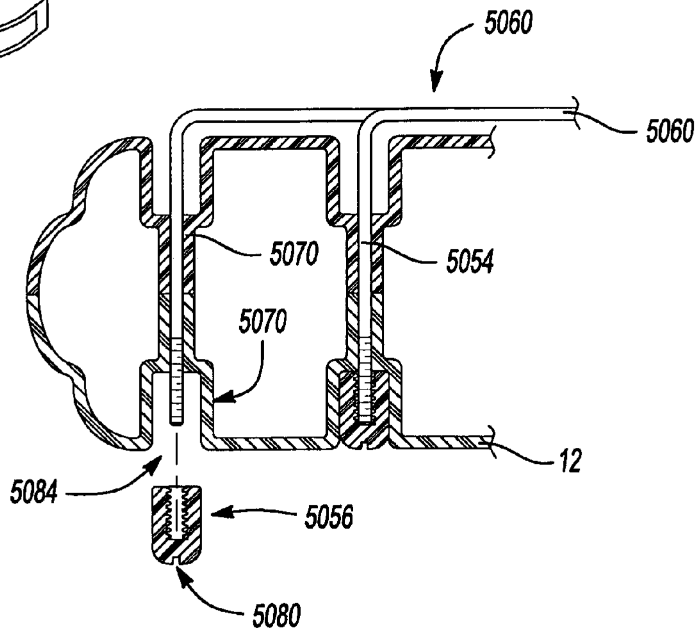
FIG. 83 is a sectional view of a portion of the fastening tool of FIG. 82 illustrating the third belt hook in greater detail.

The example of FIGS. 82 and 83 is generally similar to the example of FIGS. 79 through 81 described above, except for the configuration of the legs 5054, the fasteners 5056 and the leg bosses 5070. In this example, the features 5060 on the legs 5054 include male threads, whereas the fasteners 5056 are sleeve-like elements having an internal threadform, which is configured to threadably engage the male threads on the legs 5054, and a driving end 5080. The leg bosses 5070 may abut an opposite leg boss 5070 at their inward end and may include a counterbored section 5084 that is configured to receive an associated one of the fasteners 5056. To secure the belt hook 5050 to the housing assembly 12, the legs 5054 are inserted into the leg bosses 5070 and the fasteners 5056 are threadably engaged to the male threads on the legs 5054. The driving end 5080, if included, may be employed to rotate the fastener 5056 so that it does not extend above the outer surface of the housing assembly 12. In the particular example provided, the driving end 5080 includes a slot, which may be engaged by a conventional slotted-tip screwdriver. Those of ordinary skill in the art will appreciate, however, that the driving end 5080 may be configured differently and may have a configuration, for example, that permits the user to rotate the fastener 5056 with a Phillips screwdriver, an Allen wrench, a Torx® driver, etc.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for assembling an activation arm assembly for use in a power tool with a flywheel and a driver, the method comprising:

providing a first arm, a second arm and a third arm, each of the first and second arms having a pair of laterally spaced apart arm members, the third arm including a first eccentric and a second eccentric, each of the first and second eccentrics including a pin portion;

coupling a follower to the first eccentric;

providing a yoke with a cross-bar portion;

coupling the cross-bar portion to the pin portion of the first eccentric such that the yoke is rotatable about the pin portion of the first eccentric;

coupling the second eccentric to the cross-bar portion and the follower to form a subassembly;

pivotally coupling the subassembly to the second arm;

placing a spring proximate the yoke;

engaging a spacer to the arm members of the second arm, the spacer abutting and compressing the spring such that the spring biases the cross-bar portion away from the spacer;

installing a pivot pin through the first and second arms;

loading a second spring to the first arm; and rotating the second arm about the pivot pin to load the second spring.

2. The method of claim 1, wherein coupling the follower to the first eccentric includes:

providing an axle;

fitting the follower over the axle; and coupling the axle to the first eccentric.

3. The method of claim 2, wherein the axle includes a non-circular end that is received into a correspondingly shaped aperture formed in the first eccentric.

4. The method of claim 1, wherein each of the first and second eccentrics includes a stop member and the arm members of the second arm include range limit slots and wherein each stop member is disposed in a respective one of the range limit slots when the subassembly is pivotally coupled to the second arm.

5. The method of claim 1, wherein the arm members of the second arm include opposite edges and wherein the spacer includes a pair of flange members, the opposite edges and the flange members cooperating to guide the spacer as the spacer is engaged to the second arm.

6. The method of claim 5, wherein the opposite edges are tapered.

7. The method of claim 5, wherein at least one of the arm members of the second arm includes a notch and the spacer includes a corresponding locking element that engages the notch to thereby engage the spacer to the second arm.

8. The method of claim 5, wherein one of the spacer and the second arm includes a plurality of notches and the other one of the spacer and the second arm includes a plurality of locking elements, the locking elements engaging the notches to thereby engage the spacer to the second arm.

9. The method of claim 1, wherein the yoke includes a member that is generally transverse to the cross-bar portion and wherein placing the spring proximate the yoke comprises disposing the spring over the transverse member.

10. The method of claim 9, wherein as the spacer is engaged to the second arm, the spring and the transverse member are at least partially received into an aperture that is formed in the spacer.

11. The method of claim 1, wherein the first and second arms are locked to one another when the second spring is loaded.

12. The method of claim 11, wherein the first arm includes a rotational stop that is received into a stop aperture that is formed in the second arm and wherein location of the rotational stop in the stop aperture locks the first and second arms to one another.

13. The method of claim 1, wherein the second spring is a leaf spring.

14. The method of claim 1, further comprising installing a cam follower to the arm members of the first arm.

15. A method for assembling an activation arm assembly for use in a power tool with a flywheel and a driver, the method comprising:

providing a first arm, a second arm and a third arm, each of the first and second arms having a pair of laterally spaced apart arm members, each of the arm members including a rotational stop, each of the arm members of the second arm including a range limit slot, an axle stub aperture, an assembly notch and a stop aperture, the third arm including a first eccentric and a second eccentric, each of the first and second eccentrics including a pin portion, an axle aperture, an axle stub and a stop member;

assembling a follower to an axle;

installing the axle to the axle aperture of the first eccentric;

providing a yoke with a cross-bar portion and a member that extends from the cross-bar portion;

coupling the cross-bar portion to the pin portion of the first eccentric such that the yoke is rotatable about the pin portion of the first eccentric;

coupling the second eccentric to the axle and the yoke such that the axle is received in the axle aperture that is formed in the second eccentric and the cross-bar portion of the yoke is pivotally coupled to the pin portion of the second eccentric, the first and second eccentrics, the axle, the follower and the yoke forming at least a portion of a subassembly;

pivotally coupling the subassembly to the second arm such that each of the axle stubs are received into the stub apertures and the stop members are received into the range limit slots;

installing a spring over the member of the yoke;

providing a spacer with a pair of flanges, an aperture and at least one locking element;

engaging the flanges to opposite sides of the arm members of the second arm;

sliding the spacer along the second arm such that the flanges cooperate with opposite edges of the arm members of the second arm to guide the spacer into a position where the at least one locking element locks into the assembly notches, wherein the spring and the member are at least partially received into the aperture and the spring biases the subassembly in a predetermined rotational direction when the at least one locking element is locked into the assembly notches;

installing a pivot pin through the first and second arms;

loading a second spring to the first arm; and rotating the second arm about the pivot pin to load the second spring and position the rotational stops within the stop apertures.

* * * * *